United States Patent [19]
Farris et al.

[11] Patent Number: 6,167,253
[45] Date of Patent: *Dec. 26, 2000

[54] MOBILE DATA/MESSAGE/ELECTRONIC MAIL DOWNLOAD SYSTEM UTILIZING NETWORK-CENTRIC PROTOCOL SUCH AS JAVA

[75] Inventors: Robert D. Farris, Sterling, Va.; Stephen J. Flaherty, Upper Marlboro, Md.; William D. Goodman, Collegeville, Pa.

[73] Assignee: Bell Atlantic Network Services, Inc., Arlington, Va.

[ * ] Notice: This patent is subject to a terminal disclaimer.

[21] Appl. No.: 08/998,020

[22] Filed: Dec. 24, 1997

Related U.S. Application Data

[63] Continuation-in-part of application No. 08/923,122, Sep. 4, 1997, which is a continuation-in-part of application No. 08/725,385, Oct. 3, 1996, Pat. No. 5,694,455, which is a continuation of application No. 08/371,902, Jan. 12, 1995, Pat. No. 5,594,779.

[51] Int. Cl.$^7$ .................................................. H04M 11/10
[52] U.S. Cl. ...................... 455/412; 455/413; 455/414
[58] Field of Search .................................. 455/413, 412, 455/414, 418, 419, 466, 557, 4.1, 4.2, 6.3; 370/328, 352; 709/246, 227, 228, 230, 236

[56] References Cited

U.S. PATENT DOCUMENTS

| | | |
|---|---|---|
| 4,124,773 | 11/1978 | Elkins . |
| 4,481,382 | 11/1984 | Villa-Real . |
| 4,577,067 | 3/1986 | Levy et al. . |
| 4,599,490 | 7/1986 | Cornell et al. . |
| 4,750,198 | 6/1988 | Harper . |

(List continued on next page.)

FOREIGN PATENT DOCUMENTS 2216319  10/1989  United Kingdom .

OTHER PUBLICATIONS

"Wireless Web browsing: How long will deployment take?", by Arielle Emmett (Dec. 15, 1996), *Wireless Web Browsing*, pp. 1–5.

"Tomorrow's Internet is Here Today", Smith B., Computer, Apr. 1997, pp. 22 and 23.

"Communications", Bell & Riezenman, IEEE Spectrum, Jan. 1997, pp. 27–37.

"Java and Beyond: Executable Content", K. Srinivas et al., Computer, Jun. 1997, pp. 49–52.

"Café: The right place for Java", D. Krishna, Computer, Jul. 1996, pp. 104–108.

"Java, the Web, and Software Development", E. Yourdon, Computer, Aug. 1996, pp. 25–30.

"The Case for Java as a Programming Language", A. van Hoff, IEEE Internet Computing, Jan./Feb. 1997, pp. 51–56.

"Software Engineering", Comerford, IEEE Spectrum, Jan. 1997, pp. 65–69.

(List continued on next page.)

*Primary Examiner*—William G. Trost
*Assistant Examiner*—Joy Redmon
*Attorney, Agent, or Firm*—McDermott, Will & Emery

[57] ABSTRACT

In an information distribution system having mobile users, a method of distributing communication channels to mobile users includes transmitting information signals including at least one of Web related information and Internet related information received via one ore more of the Internet, ADSL, another mobile, a land-based user, and the at least one information service provider. The method also includes receiving the information signals from one or more of the Internet, ADSL, another mobile, a land-based user, and the information service provider in the receiver of the mobile terminal, and storing the information signals in its entirety in the mobile terminal prior to broadcasting and/or displaying same to the mobile user. The method also formats, broadcasts and/or displays the information signals after being stored in the mobile terminal.

47 Claims, 37 Drawing Sheets

U.S. PATENT DOCUMENTS

| | | |
|---|---|---|
| 4,754,495 | 6/1988 | Kawano et al. . |
| 4,799,253 | 1/1989 | Stern et al. . |
| 4,812,843 | 3/1989 | Champion, III et al. . |
| 4,849,811 | 7/1989 | Kleinerman . |
| 4,893,327 | 1/1990 | Stern et al. . |
| 4,905,301 | 2/1990 | Krolopp et al. . |
| 4,922,518 | 5/1990 | Gordon et al. . |
| 4,932,046 | 6/1990 | Katz et al. . |
| 4,954,958 | 9/1990 | Savage et al. . |
| 4,972,455 | 11/1990 | Phillips et al. . |
| 5,008,925 | 4/1991 | Pireh . |
| 5,010,399 | 4/1991 | Goodman . |
| 5,020,091 | 5/1991 | Krolopp et al. . |
| 5,020,092 | 5/1991 | Phillips et al. . |
| 5,020,093 | 5/1991 | Pireh . |
| 5,105,197 | 4/1992 | Claggett . |
| 5,111,534 | 5/1992 | Benner . |
| 5,119,397 | 6/1992 | Dahlin et al. . |
| 5,119,502 | 6/1992 | Kallin et al. . |
| 5,121,126 | 6/1992 | Clagett ..................................... 342/419 |
| 5,131,020 | 7/1992 | Liebesny et al. ........................ 455/413 |
| 5,148,471 | 9/1992 | Metroka et al. . |
| 5,177,780 | 1/1993 | Kasper et al. . |
| 5,206,641 | 4/1993 | Grant et al. ............................. 340/905 |
| 5,218,629 | 6/1993 | Dumond, Jr. et al. . |
| 5,222,120 | 6/1993 | McLeod et al. . |
| 5,243,640 | 9/1993 | Hadley et al. . |
| 5,247,347 | 9/1993 | Litteral et al. ............................... 348/7 |
| 5,247,698 | 9/1993 | Sawyer et al. . |
| 5,251,249 | 10/1993 | Allen et al. . |
| 5,257,400 | 10/1993 | Yoshida . |
| 5,307,400 | 4/1994 | Sawyer et al. . |
| 5,313,515 | 5/1994 | Allen et al. . |
| 5,319,641 | 6/1994 | Fridrich et al. . |
| 5,329,578 | 7/1994 | Brennan et al. . |
| 5,353,287 | 10/1994 | Kuddes et al. . |
| 5,353,331 | 10/1994 | Emery et al. . |
| 5,353,352 | 10/1994 | Dent et al. . |
| 5,369,681 | 11/1994 | Boudreau et al. . |
| 5,371,898 | 12/1994 | Grube et al. . |
| 5,418,784 | 5/1995 | Ramakrishnan et al. . |
| 5,436,960 | 7/1995 | Campana, Jr. et al. ................. 455/412 |
| 5,440,336 | 8/1995 | Buhro et al. .............................. 348/13 |
| 5,444,768 | 8/1995 | Lemaire et al. .......................... 379/68 |
| 5,457,732 | 10/1995 | Goldberg . |
| 5,487,101 | 1/1996 | Fletcher ................................... 455/435 |
| 5,506,887 | 4/1996 | Emery et al. . |
| 5,559,860 | 9/1996 | Mizikovsky . |
| 5,594,779 | 1/1997 | Goodman ................................ 455/413 |
| 5,692,032 | 11/1997 | Seppanen et al. ...................... 455/466 |
| 5,694,455 | 12/1997 | Goodman ................................ 455/413 |
| 5,727,159 | 3/1998 | Kikinis .................................... 709/246 |
| 5,745,551 | 4/1998 | Strauch et al. .......................... 455/412 |
| 5,802,299 | 11/1998 | Logan et al. ............................ 709/218 |
| 5,841,979 | 11/1998 | Shulhof et al. ......................... 709/237 |

OTHER PUBLICATIONS

"Java and the Shift to Net–Centric Computing", M. Hamilton, Computer, Aug. 1996, pp. 31–39.

"Enterprise Computing: The Java Factor", P. Ram et al., Computer, Jun. 1997, pp. 83–87.

"Java– and CORBA–Based Network Management", M. Leppinen et al., Computer, Jun. 1997, pp. 83–87.

"The Feel of Java", J. Gosling, Computer, Jun. 1997, pp. 53–57.

"If Java Is the Answer, What Was the Question?", T. Lewis, Computer, Mar. 1997, pp. 136, 133–135.

MOBILE DATA/MESSAGE/ELECTRONIC MAIL DOWNLOAD SYSTEM UTILIZING NETWORK-CENTRIC PROTOCOL SUCH AS JAVA

RELATED APPLICATIONS

This application is a continuation-in-part application from copending U.S. patent application Ser. No. 08/9114,234 filed on Nov. 4, 1997, from copending U.S. patent application Ser. No. 08/923,122 filed on Sep. 4, 1997, which is a continuation-in-part application from copending U.S. patent application Ser. No. 08/725,385 filed on Oct. 3, 1996, now U.S. Pat. No. 5,694,455 which is a continuation of copending U.S. patent application Ser. No. 08/371,902 filed on Jan. 12, 1995, now U.S. Pat. No. 5,594,779, all of which are hereby incorporated by reference.

BACKGROUND OF THE INVENTION

1. Technical Field

The present invention relates to a mobile data/message/electronic mail download system utilizing network-centric protocol such as Java, and more particularly, to a data/message/electronic mail download system architecture for receiving data/message/electronic mail messages using a network-centric protocol such as Java from external systems, e.g., information service providers, using a mobile, wireless, digital and/or cellular telephone or transceiver system.

2. Background Art

Distribution of audio information or data has evolved from early radio broadcasting to meet viewer demand. Initially, radio receivers were bulky and essentially non-movable units which were located in the living room of a home, as a permanent fixture. The radio receiver has been significantly improved over the years to become more portable and convenient. For example, today most vehicles include radio receivers which broadcast prescheduled audio programming to the passengers of the vehicle. In addition, the radio receiver has been reduced to such a small size that many people keep such a portable device on their person while walking or exercising to enhance activities which were commonly performed without the convenience or entertainment of the radio receiver.

However, audio programming was, at best, prescheduled and typically randomized, with the listener having to tune to the designated station or frequency at the appointed time to listen to a particular audio program. Thus, audio listeners were subjected to the selection chosen by the particular broadcast station.

Technological advances resulted in the proliferation of Audio Cassette Recorders (ACR) and Video Cassette Recorders (VCR), establishing a second option for audio and video programming distribution. Pre-recorded audio and video programs are now available for sale and rental to ACR and VCR owners. Using an ACR or VCR, the viewer selects from among many titles available for sale and rental, and listens and perhaps views the program when convenient. The ACR or VCR owner further has the capability to selectively listen or view the programming using special functions of the ACR or VCR, such as pause, fast forward, reverse, slow motion, etc. The listener or viewer can thus manipulate and replay portions of the program at will.

The penalty for this convenience, however, is in the necessity to travel to the local rental/sales store, if necessary wait for a popular program tape to become available, and once the program is purchased or rented to return home to listen to the program. If the tape is rented, the listener then revisits the video store to return the tape.

Much research has been conducted in the unrelated arena of cable television network programming. For example, cable television systems have developed and distributed "premium" channels viewable only by subscribers having appropriate descramblers. The descramblers are tuned to receive these premium channels, descramble the video and audio information and supply a signal capable of reception on a standard television set.

Pay-per-view programs, which evolved later, include recently released movies, live concerts and popular sporting events. Subscribers wishing to view a pay-per-view program place an order with the cable operator. At the designated time, the subscriber's descrambler is activated to permit viewing of the pay-per-view programming. However, the subscriber is restricted to viewing the programming at the scheduled time. There is no capability of delivering programming, video or audio, to a subscriber on demand, that is, immediately or at a subscriber-specified time and date. Further, these cable television systems provide the requested pay-per-view program at a stationary television with a stationary converter descrambler using stationary land lines.

Telephone lines have been suggested as an alternative means of video distribution in Goodman et al., U.S. Pat. No. 5,010,319 and Kleinerman, U.S. Pat. No. 4,849,811. However, systems using the public switched telephone network (PSTN) are often bandwidth limited, providing only still frame or video conferencing capabilities. Because telephone system carriers for the most part use the PSTN only for connectivity between subscribers, there is no capability for dynamic routing of digitized video without dedicated leased, wide bandwidth circuits. Telephone line based systems also fail to provide acceptable VCR type functional control of the programming.

U.S. Pat. No. 5,247,347, to Litteral et al., incorporated herein by reference, describes a so-called Video-on-Demand service that provides video programming to subscribers over the PSTN. A video information provider (VIP) transmits coded digital video data over wideband PSTN supplied connectivity to a central office. The video data may be buffered at the central office for transmission over a POTS line to the subscriber. A subscriber may use either a standard telephone instrument over the PSTN or a dedicated control device over an ISDN packet network to order the video programming. Such a device is located at a television set of the subscriber and permits a display of the program menu on the television screen.

Connectivity between the central office and the subscriber for transmission of video data is provided by an asymmetrical digital subscriber line (ADSL) system. ADSL interface units perform multiplexing of digital video information with voice information to be transmitted to the subscriber and support transmission on the ISDN packet data network of a reverse control channel from the subscriber to the central office.

However, all these prior art attempts have concentrated on video-on-demand programming which is tied to the public switched telephone network using stationary converted or digital subscriber devices located at a fixed location, such as the home.

U.S. Pat. No. 5,131,020 to Liebensy et al. describes a Method of and System for Providing Continually Updated Traffic or Other Information to Telephonically and Other Communications-Linked Customers. This patent pertains to a method of traffic information and telephone channel communication between a central station and a plurality of callers distributed in different zones throughout a geographical area. All callers are telephonically linked with the central station. The method collects and updates traffic information from a plurality of sources on a real-time and continual basis for all the zones throughout the area. It responds to telephone dialing on the caller's telephone keyboard and enters on such keyboard a code for the particular zone of interest specified by the caller. It telephonically transmits back from the central station to the caller a report of the traffic information requested by the caller in the particular zone specified by the caller. It also responds to subsequent caller keyboard requests for automatic updating of significant changes in the traffic information within such specific zone.

U.S. Pat. No. 5,243,640 to Hadley et al. relates to an Integrated Cellular Telephone and Vehicular Audio System. The patent pertains to interfacing a mobile telephone and an audio system in a vehicle. The patent integrates the two systems in order to share components and thereby eliminate duplication costs and complexity of the system. The system selectively couples program audio signals and phone audio signals to an output transducer depending on the activation of a main program audio system and telephone.

U.S. Pat. No. 5,206,641 to Grant et al. involves a Portable Traffic Congestion Radio. The patent pertains to a portable electronic storage device that receives and stores digitally coded traffic reports for a covered geographical area. The device presents traffic information relevant to a user-specified vehicle trip within the covered area. The device includes a touch-sensitive map that is used to indicate trip origin, destination and routing of interest. The device makes calculations to select and modify the reports and the traffic information from the reports is presented to the user by synthesized or digitized voice sounds.

U.S. Pat. No. 4,812,843 to Champion et al. relates to a Telephone Accessible Information System. The patent describes a communication system for subscribers that is capable of continuously updating information on a variety of subjects. Primarily, the patent deals with the subject of updated traffic information. Each geographic area served by the system is represented by a specially designed map. The map is divided into grid sections and systems to indicate routes. The subscriber, through codes on a DTMF phone selects a particular route. The communications system, from information gathered in a database, provides the subscriber with updated traffic information. This is continually updated for a certain route for a certain period of time.

Heretofore, however, the prior art has not addressed the issue or problem relating to the providing of interactive information, data messages, voice mail and/or electronic mail messages to users which typically receive data/message/electronic mail messages using a network-centric protocol such as Java from external systems, e.g., information service providers, using a mobile, wireless, digital and/or cellular telephone or transceiver system.

In addition, the prior art has not considered or addressed the problem relating to the interactive selection of information, data messages, voice mail and/or electronic mail messages to users which typically receive data/message/electronic mail messages using a network-centric protocol such as Java from external systems where the information and/or messages are to be delivered or transmitted to a portable, moveable telephone-like device.

The prior art has further not addressed the problem providing the user of a portable audio device with an economical means of interactively receiving such information, data, voice mail and/or electronic mail messages.

The prior art has also not addressed the problem of efficiently allocating sufficient resources between the interactive relationship of the optional information provider and the portable audio program listener.

SUMMARY OF THE INVENTION

It is therefore, a feature and advantage of the present invention to provide data, voice mail and/or electronic mail to users which typically receive or listen to in a moveable or transient manner. An integral part of this feature and advantage of the present invention is that we have discovered that portable audio listeners have much different requirements than the typical video-on-demand systems. Accordingly, the present invention incorporates the considerations of the audio listeners in the overall architecture of the mobile audio program selection system of the present invention.

Another feature and advantage of the present invention is to provide the listener with data, voice mail, and/or electronic mail message selection from a voice/electronic mail provider where the audio messages are to be delivered or transmitted to a portable, moveable audio device.

Another feature and advantage of the present invention is to provide the user of a portable audio device with an economical means of receiving the data, voice mail, electronic mail and/or audio programming.

Yet another feature and advantage of the present invention is to efficiently allocate sufficient resources between the data, electronic mail and/or voice mail program provider and the portable audio program listener.

Another feature and advantage of the present invention is in the providing of interactive information, data messages, voice mail and/or electronic mail messages to users which typically receive data/message/electronic mail messages using a network-centric protocol such as Java from external systems, e.g., information service providers, using a mobile, wireless, digital and/or cellular telephone or transceiver system.

Another feature and advantage of the present invention is to provide interactive selection of information, data messages, voice mail and/or electronic mail messages to users which typically receive data/message/electronic mail messages using a network-centric protocol such as Java from external systems, where the information and/or messages are to be delivered or transmitted to a portable, moveable telephone-like device.

Another feature and advantage of the present invention is to provide the user of a portable audio device with an economical means of interactively receiving such information, data, voice mail and/or electronic mail messages.

Another feature and advantage of the present invention is to efficiently allocate sufficient resources between the interactive relationship of the optional information provider and the portable audio program listener.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

To achieve these features and advantages, the present invention provides a mobile audio program selection system. In one of the preferred embodiments, the mobile audio program selection system includes a radio frequency based information distribution system having mobile users. The distribution system includes a mobile switching office selectively connecting the mobile users of the information distribution system, and information service providers, operatively connected to the mobile switching office, at least one of the information service providers receiving user selection signal inputs received by the mobile switching office from a mobile user, and transmitting user selected information to the mobile switching office responsive to the user selection signal inputs. In addition, the distribution system includes at least one mobile terminal. The mobile terminal includes a receiver, operatively coupling the mobile terminal to the mobile switching office, and receiving the user selected information from the at least one of the information service providers via the mobile switching office. The mobile terminal also includes a control processor controlling operations of the at least one mobile terminal, and means for receiving a user selection from the mobile user, for generating user selection signal inputs responsive to the user selection, and for transmitting the user selection signal inputs to the mobile switching office. The mobile terminal further includes signal format means for formatting the user selected information for broadcasting, and for outputting formatted user selected information, and broadcast means for broadcasting the formatted user selected information.

In addition, the present invention also includes an asymmetrical audio program delivery cellular system having mobile users. The asymmetrical system includes a mobile terminal having a receiver receiving user selected program data signals for broadcasting to a mobile user, a control processor controlling operations of the mobile terminal, and means for receiving a user selection from the mobile user, for generating user selection signal inputs responsive to the user selection, and for transmitting the user selection signal inputs. The mobile terminal further includes signal format means for formatting the user selected information for broadcasting, and broadcast means for broadcasting the formatted user selected information. The asymmetrical system also includes a first mobile switching office receiving the formatted user selected information broadcast by the broadcast means using a first communication channel which operates under a first communication speed, and information service providers, operatively connected to the first mobile switching office. One of the information service providers receives user selection signal inputs received by the first mobile switching office from the mobile user, and transmits one user selected program responsive to the user selection signal inputs. The asymmetrical system further includes a second mobile switching office, operatively connected to at least one of the information service providers, receiving at least one user selected program transmitted by at least one of the information service providers using a second communication channel which operates under a second communication speed. The asymmetrical system is designed so that the second communication speed of the second communications channel of the second mobile switching office is substantially greater than the first communication speed of the first communications channel of the second mobile switching office.

In another embodiment of the present invention, an audio program and voice mail download distribution system having mobile users is provided. The download distribution system includes a mobile switching office selectively connecting the mobile users of the audio program and voice mail download system, and information service providers, operatively connected to the mobile switching office. One of the information service providers receives user selection signal inputs received by the mobile switching office from a mobile user, and transmits user selected information to the mobile switching office responsive to the user selection signal inputs. The download distribution system also includes at least one mobile terminal. The mobile terminal includes a receiver, operatively coupling the at least one mobile terminal to the mobile switching office, receiving the user selected information from the at least one of the information service providers via the mobile switching office, and a control processor controlling operations of the at least one mobile terminal. The mobile terminal also includes means for receiving a user selection from the mobile user, for generating user selection signal inputs responsive to the user selection, and for transmitting the user selection signal inputs to the mobile switching office, and signal format means for formatting the user selected information for broadcasting, and for outputting formatted user selected information. The mobile terminal further includes broadcast means for broadcasting the formatted user selected information, and a memory operatively connected to the receiver. The user selected information comprises at least one of voice mail messages and audio programs. In addition, the receiver receives the user selected information corresponding to the user selection signal inputs and stores the user selected information entirely in the memory before broadcasting to the mobile user, thereby minimizing connection between the mobile terminal and the mobile switching office.

In another embodiment of the present invention, an advanced intelligent network based information distribution system having mobile users is provided. The network based distribution system includes a central office switching system connected to communication lines including at least one service switching point for selectively providing switched communications between the communication lines. In addition, the network based distribution system also includes a mobility controller, connected to the central office switching system, arranged for selectively providing wireless communications between the central office switching system and mobile terminals by using control data conveyed to at least one service switching point through a service transfer point. A network controller is also provided which is arranged for selectively providing control data to effect land line communications, and arranged separately from the central office switching system and the mobility controller. The network controller is connected to both the mobility controller and the service switching point through at least one service transfer point arranged to convey control data to effect communications. The network controller also stores preprogrammed call processing data associated with subscribers who are associated with one of the communication lines connected to the central office switching system and preprogrammed call processing data associated with subscribers who are associated with one of the mobile terminals. The network based distribution system further includes information service providers, operatively connected to the mobility controller, at least one of the information service providers receiving user selection signal inputs received by the mobility controller from a mobile user, and transmitting user selected information to the mobility controller responsive to the user selection signal inputs. At least one mobile terminal is also provided which includes a receiver, operatively coupling the mobile terminal to the mobility controller, receiving the user selected information from the at least one of the information service providers via the mobility controller, and a control processor controlling operations of the at least one mobile terminal. The mobile terminal also includes means for receiving a user selection from the mobile user, for generating user selection signal inputs responsive to the user selection, and for transmitting the user selection signal inputs to the mobility controller. Further, the mobile terminal includes signal format means for formatting the user selected information for broadcasting, and for outputting formatted user selected information, and broadcast means for broadcasting the formatted user selected information.

In another embodiment of the present invention a method is provided in a radio frequency based information distribution system having mobile users. The radio frequency based information distribution system includes a mobile switching office selectively connecting the mobile users of the information distribution system, information service providers, operatively connected to the mobile switching office, at least one of the information service providers transmitting user selected information to the mobile switching office responsive to user selection signal inputs, and at least one mobile terminal including a receiver, operatively coupling the at least one mobile terminal to the mobile switching office, a control processor controlling operations of the at least one mobile terminal, means for receiving a user selection from the mobile user, signal format means for formatting the user selection for broadcasting, and broadcast means for broadcasting the formatted user selected information. The method of distributing radio frequencies to mobile users, includes the steps of:

(a) selectively connecting the mobile users of the information distribution system;

(b) receiving a user selection from at least one of the mobile users, (c) generating user selection signal inputs responsive to the user selection, (d) transmitting the user selection signal inputs to the mobile switching office;

(e) receiving user selection signal inputs received by the mobile switching office from the at least one of the mobile users, and transmitting user selected information to the mobile switching office responsive to the user selection signal inputs via at least one of the information service providers;

(f) receiving the user selected information from the at least one of the information service providers via the mobile switching office in a receiver of the at least one mobile terminal;

(g) controlling operations of the at least one mobile terminal;

(h) formatting the user selected information for broadcasting; and (i) broadcasting the formatted user selected information to the mobile user of the at least one mobile terminal.

In another embodiment of the invention, a method of distributing communication channels to mobile users includes the steps of receiving information signals including at least one of voice, data, and electronic mail signals broadcast from an external source in the receiver of the at least one mobile terminal, and storing the information signals in its entirety in at least one mobile terminal prior to broadcasting same to a mobile user. The method also includes the steps of controlling operations of the at least one mobile terminal, formatting the information signals for broadcasting after being stored in the at least one mobile terminal, and broadcasting the formatted information signals to the mobile user of the at least one mobile terminal.

In another embodiment of the invention, a message download distribution system having mobile users is provided. The system includes a mobile switching office selectively connecting the mobile users of the message download system, and message service providers, operatively connected to the mobile switching office. At least one of the message service providers transmits at least one message to the mobile switching office. The system also includes at least one mobile terminal, operatively coupled to the mobile switching office, and receiving the message from the at least one of the message service providers via the mobile switching office. The mobile terminal formats the message for broadcasting, and broadcasts the formatted message. The mobile terminal also includes a memory. The message comprises at least one of voice, data, and electronic mail signals received via at least one of internet, ADSL, another mobile, a land-based user, and at least one message service provider for broadcasting to the mobile user. The receiver receives the message and stores the message entirely in the memory before broadcasting to the mobile user, thereby minimizing connection between said at least one mobile terminal and said mobile switching office.

In another embodiment of the invention, a method of distributing communication channels to mobile users, includes the steps of receiving information signals including at least one of voice, data, and electronic mail signals broadcast from an external source in the receiver of the at least one mobile terminal, and storing the information signals in its entirety in at least one mobile terminal prior to broadcasting same to a mobile user. The method also includes the steps of controlling operations of the at least one mobile terminal, and formatting the information signals for broadcasting after being stored in the at least one mobile terminal. The method also includes the steps of receiving supplemental information including destination information and optionally additional information from the mobile user, and associating the formatted information with the supplemental information, the destination information including at least one of internet address, an ADSL address, another mobile, a land-based user, and a message service provider. The method also includes the step of at least one of broadcasting the formatted selected information to the mobile user, and broadcasting the formatted and supplemental information to the at least one of the internet address, the ADSL address, the another mobile, the land-based user, and the message service provider.

In another embodiment of the invention, a method of distributing communication channels to mobile users includes transmitting information signals including at least one of Web related information and Internet related information received via one ore more of the Internet, ADSL, another mobile, a land-based user, and the at least one information service provider. The method also includes receiving the information signals from one or more of the Internet, ADSL, another mobile, a land-based user, and the information service provider in the receiver of the mobile terminal, and storing the information signals in its entirety in the mobile terminal prior to broadcasting and/or displaying same to the mobile user. The method also formats, broadcasts and/or displays the information signals after being stored in the mobile terminal.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

DESCRIPTION OF THE PREFERRED EMBODIMENTS

Figure 1:
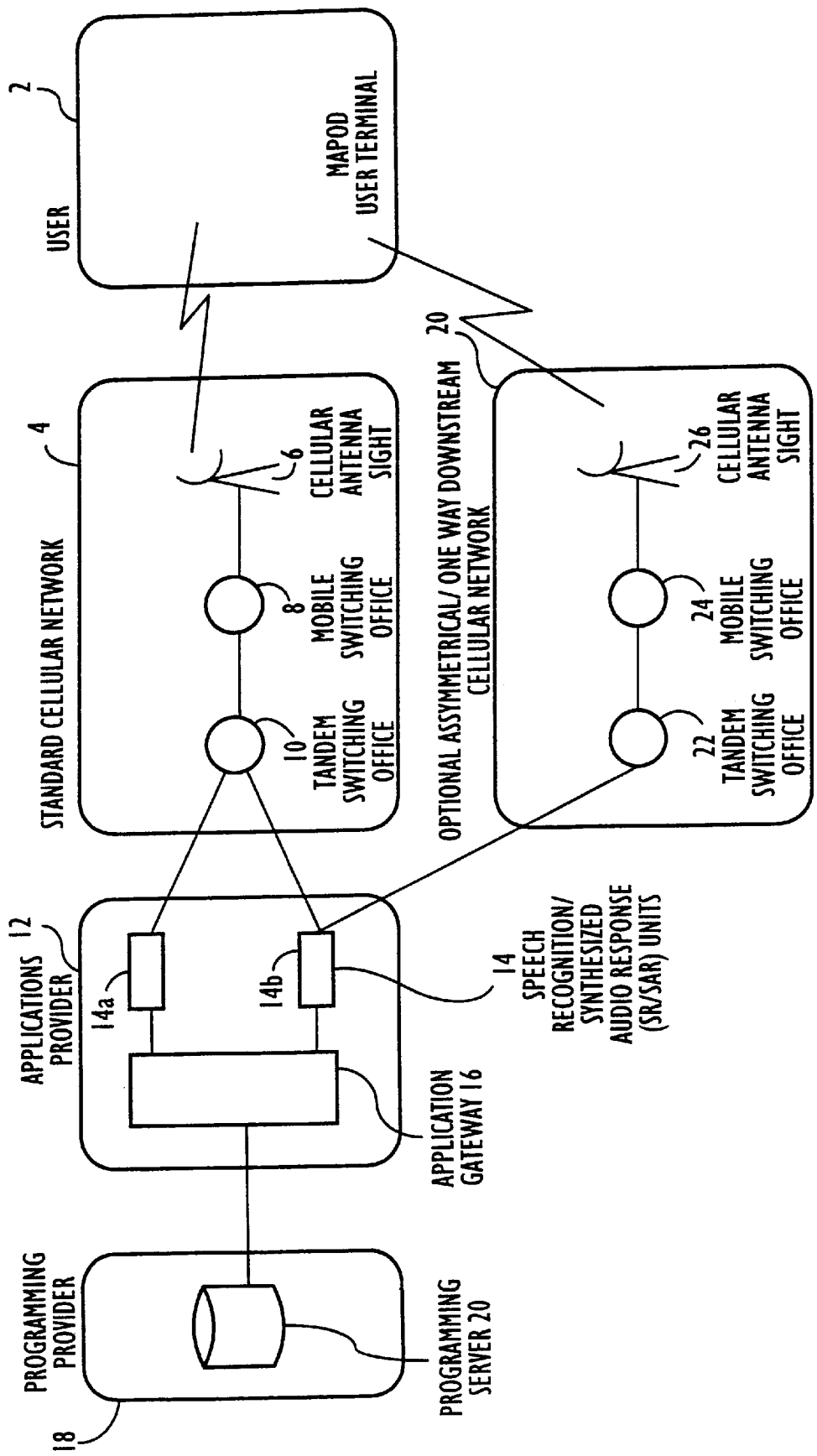
FIG. 1 is a conceptual diagram of the mobile audio program selection system of the present invention.

FIG. 1 is a conceptual diagram of the mobile audio program selection system of the present invention. In FIG. 1, a Mobile Audio Programming Device (MAPOD) 2 is located in close proximity to a user, e.g., in an automobile or strapped around a user's waist. MAPOD 2 will interface with standard cellular network 4 or an optional asymmetrical/one-way downstream network 20.

The standard protocol which MAPOD 2 uses to interface with standard cellular network 4 or asymmetrical/one-way downstream network 20 is preferably the standard protocol used by cellular telephones. This standard protocol is described in detail, for example, in EIA/TIA publications IS-41.1-A, IS-41.2-A, IS-41.3-A, IS-41.4-A, and IS-41.5-A. Other interface protocol and systems are presented in U.S. Pat. Nos.: 5,371,898; 5,369,681; 5,353,352; 5,353,331; 5,307,400; 5,257,400; 5,251,249; 5,247,698; 5,119,502; 5,119,397; 5,111,534; 5,020,093; 5,020,092; 5,020,091; 5,008,925; 4,972,455; 4,905,301; 4,893,327; 4,799,253; 4,754,495; 4,750,198; 4,599,490, all incorporated herein by reference. A brief summary is presented here as the protocol pertains to the interface between MAPOD 2 and cellular networks 4 and 20.

A typical cellular mobile radio telephone system is controlled by at least one mobile switching center (also known as a mobile telephone switching office), at least one base station, and at least one mobile station. The mobile switching center constitutes an interface between the radio system and the public switching telephone network. The base station transmits information between the mobile stations and the mobile switching centers. Calls to and from mobile subscribers are switched by the mobile switching center.

The mobile switching center also provides all signalling functions needed to establish the calls. In order to obtain radio coverage of a geographical area, a number of base stations are normally required. This number may range from, in the exceptional case, one base station, up to one hundred or more base stations in normal systems. The area is divided into cells, where each cell may either be serviced by a base station or may share a base station with a number of other cells.

Currently, cellular radiotelephone service is provided in the 825 to 845 Mhz and 870 to 890 Mhz frequency bands. The higher-frequency band is used for "down-link" transmissions from the "cell site" for reception by the subscriber. The cell site is the location of the transmitter, or, more specifically, the location of the antenna from which transmissions are effected for the cell. The lower frequency band is used for "up-link" transmissions from the subscriber in the cell for reception by the receiving equipment which is also located at the cell site.

Each frequency band assigned to the cellular radiotelephone system is divided into two groups, with one group being reserved for the local telephone company and the other group being franchised to a completing service provider. Each cellular channel has a thirty kilohertz bandwidth, allowing for 666 sequentially numbered channels, with channels 1 through 333 being allocated to one service provider and channels 334 through 666 being allocated to the other service provider.

Communication between the radio base stations within the system and the mobile stations within the system are divided into a plurality of voice or speech channels and at least one access or control channel, which may be either analog or digital and which may have any data rate. An illustrative one of such access or control channel is referred to as the forward control channel (FOCC).

Each mobile station which is operating within a cellular communications system must be locatable when a call is received by the system which is intended for that station. A mobile station is located by broadcasting a paging signal directed to the mobile and requesting it to respond if it receives the page. When the mobile broadcasts its page response signal to the page signal it is then placed on a voice channel by the base station and the call intended for the mobile can be connected to it through that voice channel. Cellular telecommunications systems employ a control channel such as the forward control channel (FOCC) as the means by which paging signals are broadcast into the various cells of the system in order to locate a particular mobile station.

The control channel, such as the FOCC, is typically restricted to a rate on the order of 8–10 K bits per second which is a speed limitation imposed by the technology used in that implementation. The control channel may also be utilized to transmit other messages to the mobile stations, including, for example, voice channel designations, directed retry orders, system ordered rescan signals and system overhead message trains each of which use substantial control channel capacity each time they are transmitted.

Paging provides the ability to locate a mobile station's whereabouts within the exchange in order to set up a call to that mobile station. More specifically, the paging process in mobile cellular radio systems, attempts to identify the specific cell containing that mobile, as described above in connection with the paging process. During the execution of this process, the mobile switching center (MSC) searches for the mobile by sending a sequence of paging messages on the FOCC of the system and awaits a page response. Obviously, the page message muse be transmitted to all of the cell sites covering the entire service area of the system in order to ensure that the mobile is located regardless of where it might be within the system.

In present systems, when a page remains unanswered by the mobile station which is sought, the page must be repeated. This repetition can be either within a location area previously paged or within the entire service area (SA) of the system. The present practice within cellular radio systems is to employ the paging process to handle incoming page requests on a "first come, first served" basis. Depending upon whether the location area (LA) of the requested mobile station is known or not, the amount of paging capacity allocated to serve a particular page request is the same. That is, if the LA of the mobile station is known, then the first page attempt is within the LA. Otherwise, the page attempt is within the service area (SA) which includes all of the LA's within the exchange. If no response is received to the page, the page is repeated either within the LA itself or within the SA.

When attempting to route a call to a mobile station, the MSC must specifically know in which cell the mobile station is located. In accomplishing the task of locating the mobile, the MSC pages the mobile station in the location area where the mobile station last registered. This prevents a global or system-wide page wherein all the cells within an exchange are paged simultaneously. If the mobile station does not answer the page request in the registered location area of its last registration, only then is service area or global paging required in order to locate the mobile.

A known solution to the problem of locating the mobile phone is based on the concept of mobile registration. Mobile registration is the process by which a mobile phone becomes listed as being present in the service area of one of the mobile exchanges in a mobile telephone service network. It should be recognized that one purpose of mobile registration is to permit calls to a mobile phone to be automatically delivered even though the mobile phone may be moving from place to place through a network of cellular systems.

It should also be recognized that mobile phone registration according to EIA Standard IS-3D is effected by means of interactions between the cellular system and the mobile phones operating in its service area. One such interaction is called "autonomous registration" and it is controlled by the cellular system through certain information transmitted to the mobile phones. This information is in the form of an overhead message train (OMT), which is transmitted on paging channels throughout a cellular system service area, normally once each second approximately. The OMT includes a system parameter overhead message including station and registration related messages, and optionally, several other messages of which the registration identification message and the registration increment message relate to the autonomous registration process.

Registration may be enabled or disabled individually for each class of mobile phone, e.g., home or roam (explained below), by means of control bits in the system parameter overhead message. The system parameter overhead message also contains the identification number of the serving cellular system from which the mobile phone determines whether it is a "home" or a "roam" mobile phone. Each mobile phone contains, in its internal memory, an entry indicating the identity of its home cellular system and an entry indicating the cellular systems (which may be the home cellular system) in which it has most recently registered successfully. It also stores a value for the cellular system used to determine when it is scheduled to re-register in that cellular system.

In the mobile telephone systems used in North America, the United Kingdom and in other markets, twenty-one frequencies are allocated for the control channels. A two-bit digital color code (DCC) is used to differentiate control channels using the same frequency. It is thus possible to have up to 84 cells, each cell having a control channel with a unique set of frequency and DCC combinations. In densely populated areas, subscriber demand may require more than 84 cells to provide adequate mobile telephone service.

In FIG. 1, standard cellular network 4 interfaces with MAPOD 2, preferably as described above. In particular, cellular antenna 6 receives signals from MAPOD 2, and transmits signals generated by mobile switching office 8. Mobile switching office 8 permits connection between MAPOD 2 and application provider 12 via tandem switching office 10. Application provider 12 permits and facilitates selection of various audio data by the user of MAPOD 2 via speech recognition/synthesized audio response units 14a, 14b which then convert audio commands issued by the user of MAPOD 2 into an audio request. One example of an intelligent voice recognition system is described in commonly assigned application Ser. No. 08/271,887, filed Jul. 7, 1994, entitled "Intelligent Recognition" (attorney docket no. 680-091A), the disclosure of which is incorporated herein entirely by reference. Application gateway 16 coordinates and supervises the audio data requests issued by MAPOD 2 and transmits the audio request to programming provider 18. Programming provider 18 includes programming server 20 which contains the audio data requested by MAPOD 2 and which transmits the audio data back to application provider 12.

Application provider 12 then transmits the audio data to either standard cellular network 4 or to optional asymmetrical cellular network 20 which may be dedicated for transmitting the audio data from application provider 12 to MAPOD 2. Asymmetrical cellular network 20 includes tandem switching office 22 which receives the audio data from application provider 12 and transmits the audio data to MAPOD switching office 24. MAPOD switching office 24 will then transmit the audio data via cellular antenna 26 to MAPOD 2. Since MAPOD switching office 24 is dedicated to transmission of audio data, MAPOD switching office 24 preferably utilizes a higher bit rate channel, for example, having a larger band width capacity, to transmit the audio data to MAPOD 2. Accordingly, the mobile audio program selection system of the present invention utilizes the public switch telephone network (PSTN) in order to receive the audio request by the user of MAPOD 2, and transmits the audio data to MAPOD 2 via either standard cellular network 4 or asymmetrical cellular network 20.

Figure 1A:
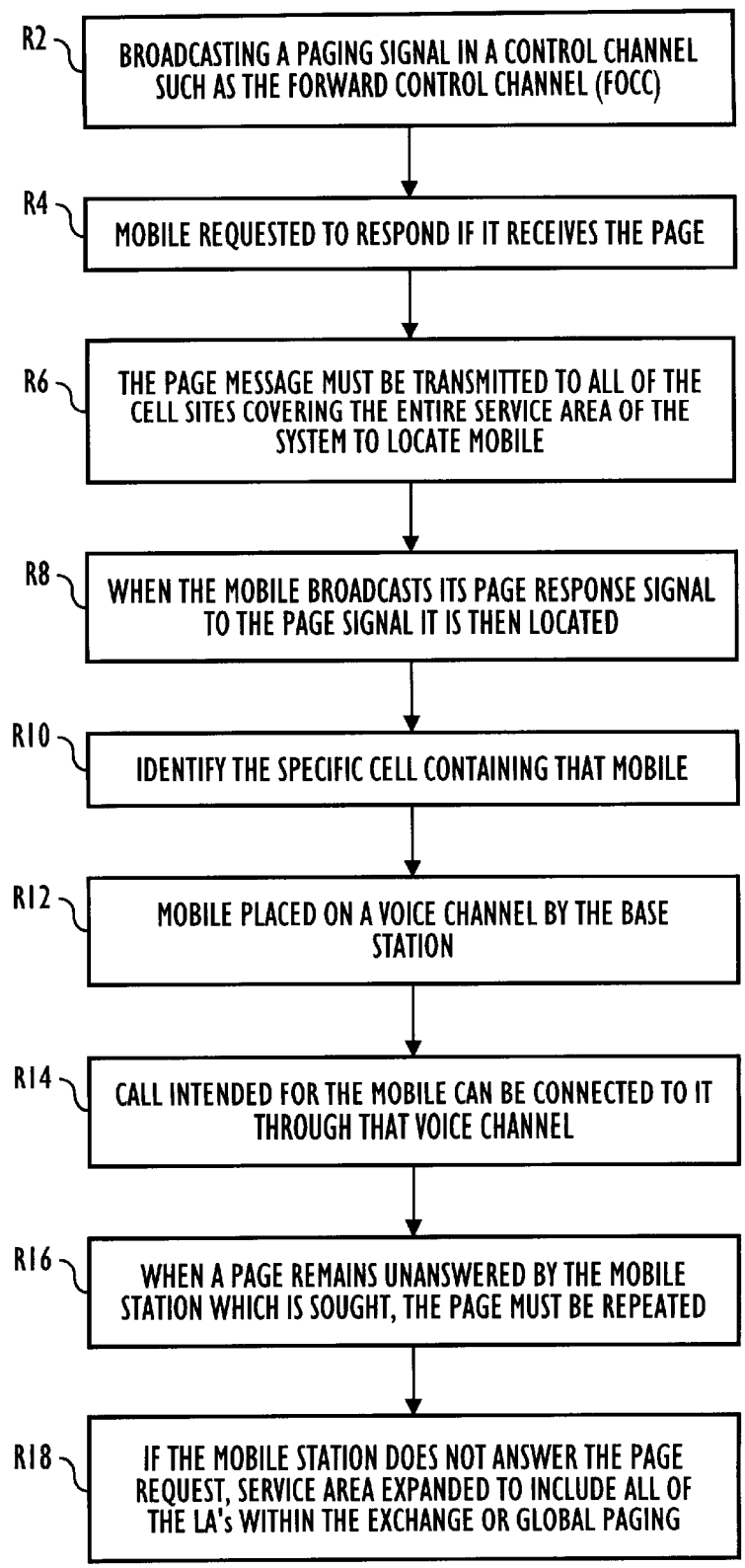
FIGS. 1A–1B are flowcharts of the cellular communication process used in conjunction with MAPOD of the present invention.
Figure 1B:
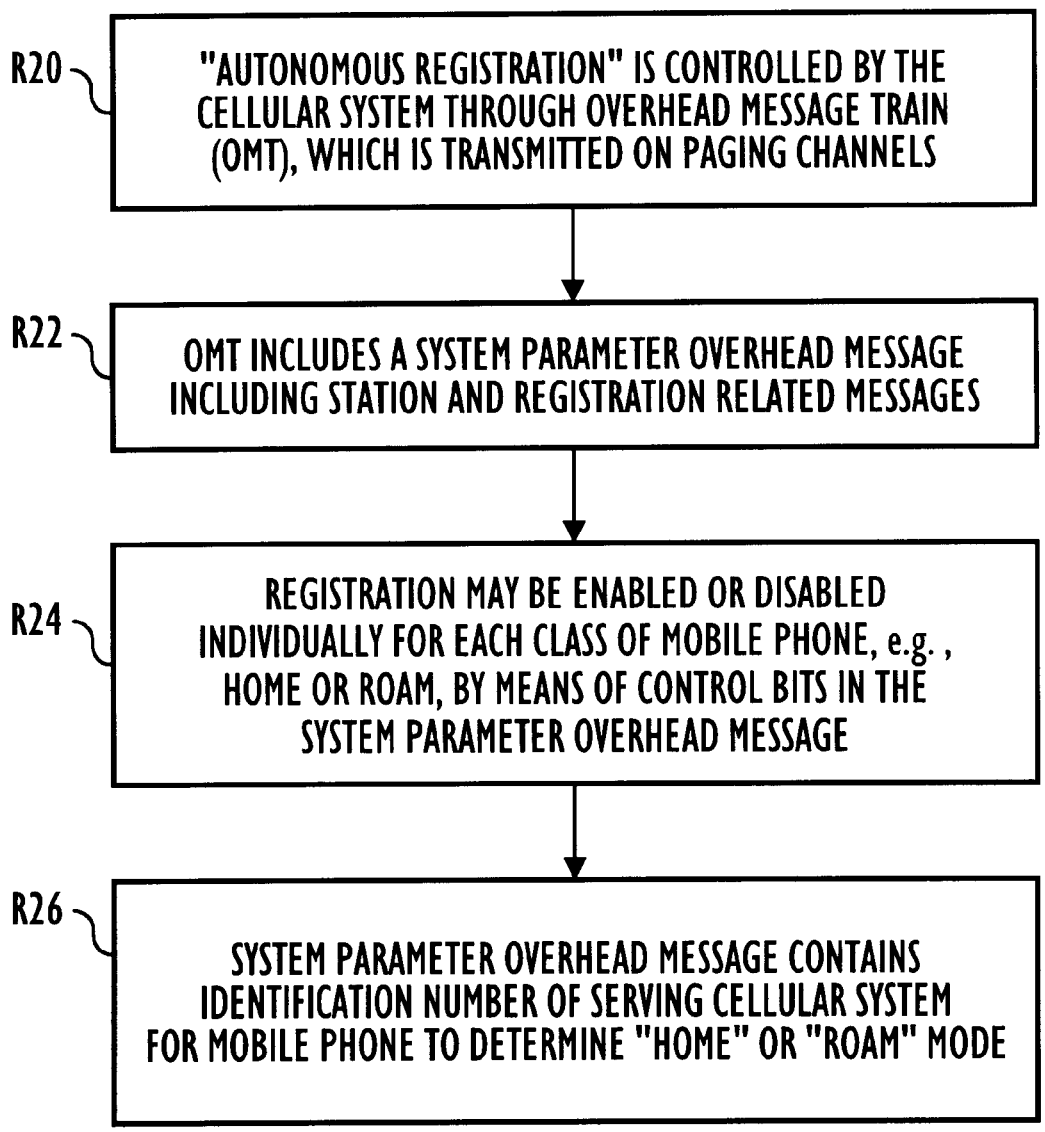

FIGS. 1A–1B are flowcharts of the cellular communication process used in conjunction with MAPOD of the present invention. In FIGS. 1A–1B, each mobile station which is operating within a cellular communications system must be locatable when a call is received by the system which is intended for that station. A mobile station is located by broadcasting a paging signal directed to the mobile in step R2. The mobile is requested to respond if it receives the page in step R4. The page message is transmitted to all of the cell sites covering the entire service area of the system in order to ensure that the mobile is located regardless of where it might be within the system in step R6.

When the mobile broadcasts its page response signal to the page signal it is then located in step R8. In addition, the specific cell where the mobile is located is also identified in step R10. The mobile is placed on a voice channel by the base station in step R12, and the call intended for the mobile can be connected to it through that voice channel in step R14. Cellular telecommunications systems employ a control channel such as the forward control channel (FOCC) as the means by which paging signals are broadcast into the various cells of the system in order to locate a particular mobile station.

Paging provides the ability to locate a mobile station's whereabouts within the exchange in order to set up a call to that mobile station. More specifically, the paging process in mobile cellular radio systems, attempts to identify the specific cell containing that mobile, as described above in connection with the paging process. During the execution of this process, the mobile switching center (MSC) searches for the mobile by sending a sequence of paging messages on the FOCC of the system and awaits a page response.

When a page remains unanswered by the mobile station which is sought in step R16, the page must be repeated. This repetition can be either within a location area previously paged or within the entire service area (SA) of the system. Depending upon whether the location area (LA) of the requested mobile station is known or not, the amount of paging capacity allocated to serve a particular page request is the same. That is, if the LA of the mobile station is known, then the first page attempt is within the LA. Otherwise, the page attempt is within the service area (SA) which includes all of the LA's within the exchange in step R18. If no response is received to the page, the page is repeated either within the LA itself or within the SA.

Mobile registration is the process by which a mobile phone becomes listed as being present in the service area of one of the mobile exchanges in a mobile telephone service network. Mobile phone registration according to EIA Standard IS-3D is effected by means of interactions between the cellular system and the mobile phones operating in its service area. One such interaction is called "autonomous registration" and it is controlled by the cellular system through certain information transmitted to the mobile phones in step R20. This information is in the form of an overhead message train (OMT), which is transmitted on paging channels throughout a cellular system service area, normally once each second approximately.

The OMT includes a system parameter overhead message including station and registration related messages, and optionally, several other messages of which the registration identification message and the registration increment message relate to the autonomous registration process in step R22.

Registration may be enabled or disabled individually for each class of mobile phone, e.g., home or roam (explained below), by means of control bits in the system parameter overhead message in step R24. The system parameter overhead message also contains the identification number of the serving cellular system from which the mobile phone determines whether it is a "home" or a "roam" mobile phone in step R26. Each mobile phone contains, in its internal memory, an entry indicating the identity of its home cellular system and an entry indicating the cellular systems (which may be the home cellular system) in which it has most recently registered successfully. It also stores a value for the cellular system used to determine when it is scheduled to re-register in that cellular system.

Figure 2:
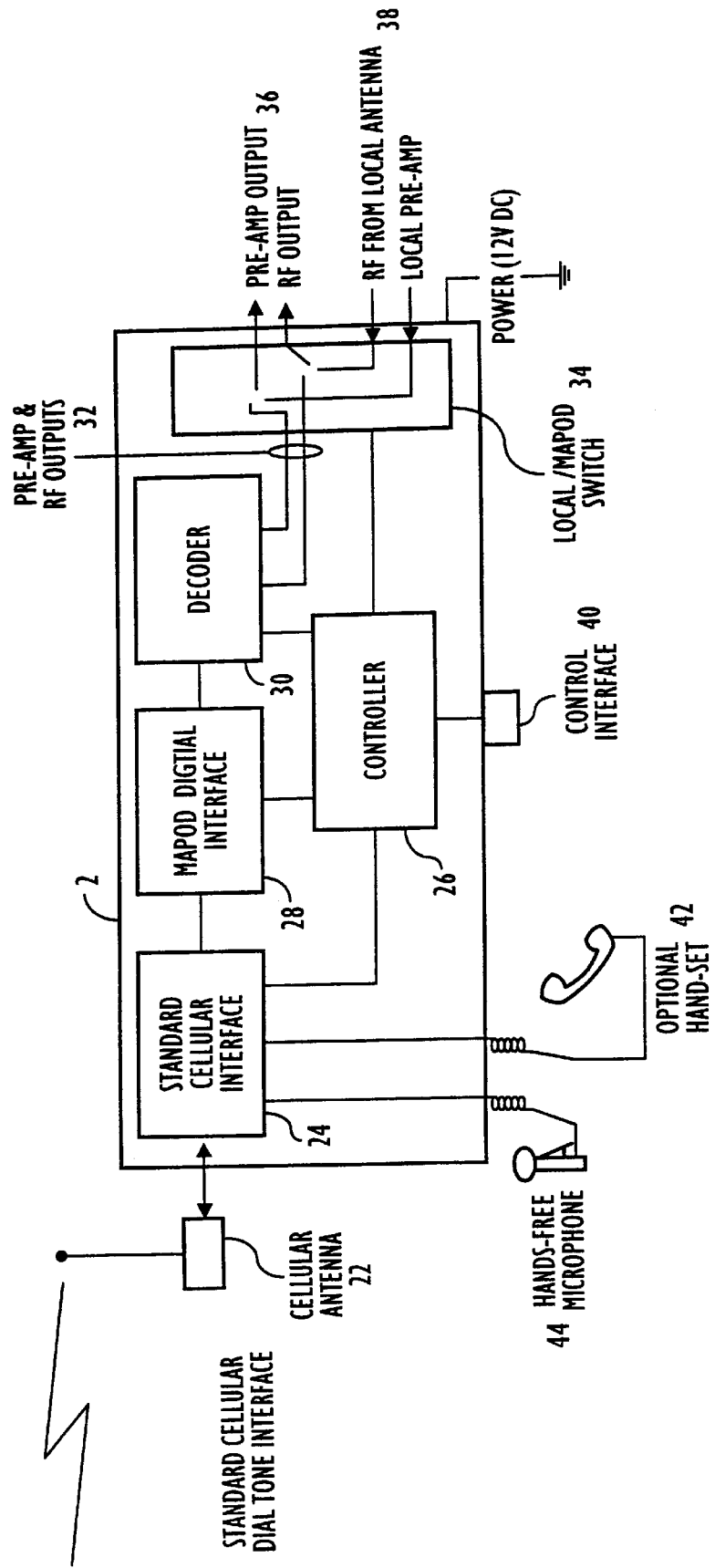
FIG. 2 is a block diagram of the Mobile Audio PrOgram selection Device (MAPOD) of the present invention.

FIG. 2 is a block diagram of the mobile audio program selection device. In FIG. 2, MAPOD 2 receives and transmits signals via cellular antenna 22. Standard cellular interface 24, as described previously, will transmit the audio request via, for example, handset 42 or hands-free microphone 44. In addition, cellular interface 24 receives audio data via cellular antenna 22. Controller 26 coordinates, monitors and controls the broadcasting of audio data received or transmitted via cellular interface 24. Cellular interface 24 then transmits the audio data to MAPOD digital interface 28 which demodulates the data in a standard form for broadcasting to the user. MAPOD digital interface 28 may be, for example, a standard modem which demodulates the received data.

MAPOD digital interface then transmits the demodulated data to decoder 30 which decodes the encoded data in accordance with a predetermined coding scheme. For example, suitable video coding algorithms rely on motion compensated prediction (MCP) and motion compensated interpolation (MCI). Motion compensated predictive/interpolative coding (MCPIC) is described in Wonq et al. "NCPIC: A video coding algorithm for transmission and storing applications", November, 1990 IEEE Communications magazine. While the above coding algorithms relate to video data, they may be also utilized with respect to audio data.

Another compression technique using motion estimation, motion compensation predictive coding and adaptive discrete cosine transform quantization is supported by the International Standards Organization (ISO) moving pictures expert group (MPEG). MPEG-1 specifies a coding algorithm having a data rate of 1.2 MBPS. This digital impression standard may be accommodated by a data channel having the capability of 1.544 MBPS. MPEG programmable decoder/processors, capable of decompressing digital data in real time, have been produced by such companies as C-Cube Microsystems and LSI of San Jose, Calif.

Decoder 30 outputs the audio data via standard preamp and RF output conductors 32 to MAPOD switch 34. MAPOD switch 34 which is controlled by controller 26 then outputs the audio data to amplifiers and/or speakers for example, in an automobile or to auxiliary speakers attached to MAPOD 2. Advantageously, MAPOD switch 34 includes the capability of receiving radio frequencies (RF) from a local antenna, and the capability of receiving local preamplified signals as well. Thus, for example, MAPOD switch 34 may be used to either transmit audio data received from a program provider via a cellular network, or audio data received via, for example, a local radio in an automobile or positioned locally with respect to MAPOD 2. MAPOD 2 also includes control interface 40 for programming or specifying specific instructions for controller 26. For example, controller 26 may be programmed to play the audio data received via a cellular network even when audio data is also received simultaneously via a local radio by MAPOD switch 34. In this situation, controller 26 considers the audio data received from the cellular network of a higher priority.

Figure 3:
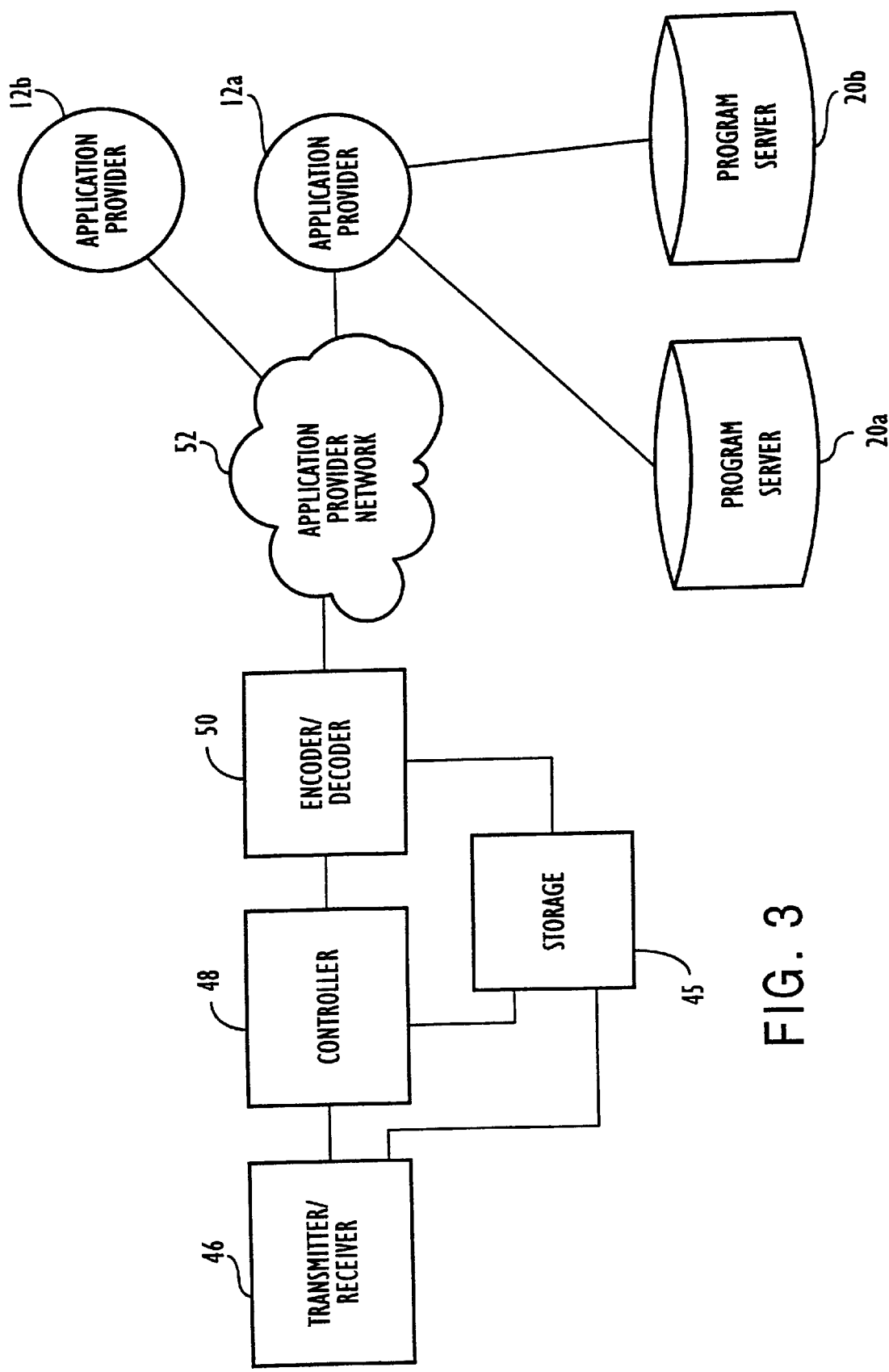
FIG. 3 is a block diagram of the mobile audio program provider of the present invention.

FIG. 3 is a block diagram of the mobile audio program provider system. In FIG. 3, transmitter/receiver (transceiver) 46 is designed to communicate with the transceiver, i.e., standard cellular interface 24, in MAPOD 2. Transmitter/receiver 46 provides connection with the public switch telecommunications network (PSTN) as will be described. Transmitter/receiver 46 is adapted to transmit compressed data to the transceiver in the MAPOD, and to receive compressed digital data transmitted by the MAPOD.

The compressed data received via a receiver section of transmitter/receiver 46 is fed to buffer storage 45 under the control of processor controller 48. The stored signal is then fed to encoder/decoder 50 which decodes the received signal, if needed, into a format which is acceptable for application provider network 52. Application provider network 52 includes switching functions for switching between application providers 12a, 12b. Application provider network 52 preferably includes a conventional message system platform including voice processing functions and storage. Depending upon the address attached by application provider network 52, the audio request may be stored for automatic delivery using conventional call completion services. Once delivered to the appropriate application provider 12a, 12b, an appropriate program server, for example, 20a, 20b is accessed for the requested audio selection. The audio data is then transmitted from the selected program server to the application provider network 52 via the appropriate application provider, and is encoded for transmission to the mobile audio program device 2.

Figure 4:
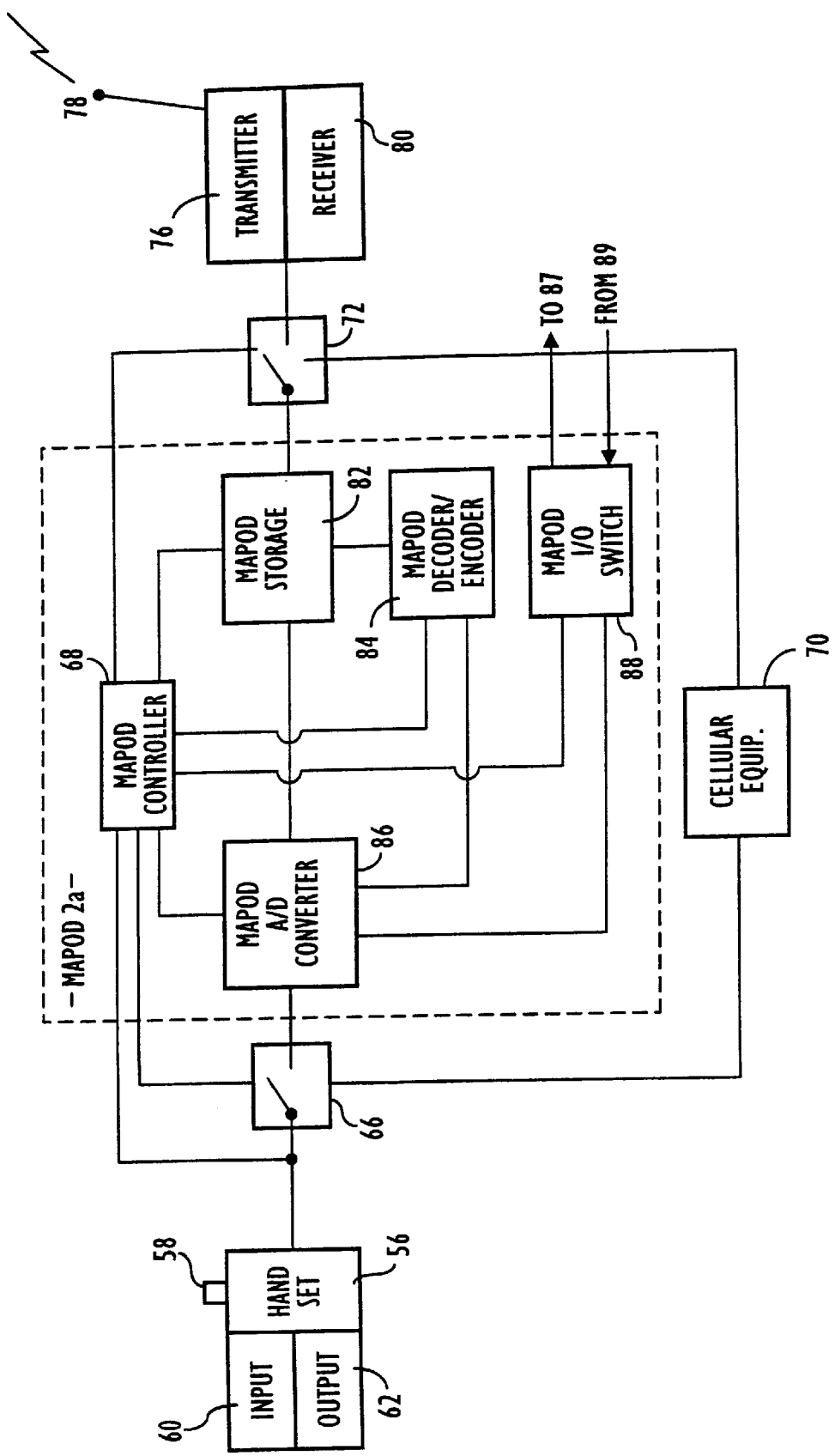
FIG. 4 is a block diagram of another embodiment of the mobile audio program selection device of the present invention.

FIG. 4 is a block diagram of another embodiment of the mobile audio program device which includes standard cellular equipment for voice connections to other parties. In FIG. 4, a portable transceiver device is illustrated which may be installed in an automobile vehicle in a similar manner as a cellular telephone or which may be battery powered and completely portable, as is also common with standard cellular telephones. The portable transceiver device includes hand set 56 which includes a conventional input or a microphone 60, and an output or ear piece 62. Actuation button 58 is provided for a purpose to be described below.

The output of hand set 56 comprises an analog voice signal which is fed to standard cellular equipment 70 via switch 66 under the control of controller 68. The analog voice signal will typically be fed to cellular equipment 70 when controller 68 determines that MAPOD 2a is not being used and a standard cellular telephone call is being performed or when hand set 56 transmits digit data indicating a telephone call is to be initiated by the user. Cellular equipment 70 will then format the analog voice signal or digit data for transmission by transmitter 76 and antenna 78 via switch 72 which is also controlled by controller 68. In this manner, standard cellular telephone calls or telephone calls which are initiated by the user of hand set 56 will be executed by cellular equipment 70.

Receiver 80 will receive a compressed signal either for a standard cellular telephone connection from another party or will receive audio data from an application provider via an application provider network. Switch 72 directs the received information either to standard cellular equipment for standard cellular telephone call or to MAPOD 2a for transmitting of audio data received from an application provider to the MAPOD user. Switch 72 is under the control of controller 68 and may be preset in accordance with, for example, switch activation button 58 of hand set 56, or may be switched in accordance with the content of the signal received by receiver 80 and monitored by controller 68.

When controller 68 determines that the received information is audio data to be formatted and presented to the user of hand set 56, the received information is transmitted to storage 82 and accessed by decoder/encoder 84 for decoding the received compressed data. The decoded data is then transmitted to A/D converter 86 which will convert the decoded data from digital to analog form and transmit the analog converted audio data to either output 62 of hand set 56 or to input/output (I/O) switch 88 which under the control of controller 68. Switch 88 is used to transmit audio data to broadcast devices via output 87, as well as accept radio frequencies from a local antenna at input 89 as discussed previously. When the audio data received from the application provider is a menu listing the various audio selections available to the user, the user may input a selection either by voice via input 60 of hand set 56, or by transmitting digits input via handset 56. This selection information is then transmitted back to the application provider, and based upon the selection, the application provider will arrange to obtain and provide the selected audio data from a program server to the user of MAPOD 2a.

MAPOD 2a advantageously includes the capability of receiving large amounts of data which are downloaded from the application provider for the selected audio program. Specifically, MAPOD 2a may either transmit the audio data received from the application provider in real-time to the MAPOD user, or MAPOD 2a may receive all the audio data via a high data rate channel and store the compressed information in storage 82. The compressed audio data may then be retrieved and decoded by decoder/encoder 84, and transmitted to the MAPOD user at a pre-selected time. Once the audio program is downloaded to MAPOD 2a and stored in storage 82, MAPOD 2a includes the additional feature of severing the connection between MAPOD 2a and the application provider in order to minimize the amount of cellular connection, and the amount of cost which is charged to the user of MAPOD 2a.

Additionally, MAPOD 2a may be located within, for example, a stereo system or radio which will receive the audio data from the application provider directly, and broadcast the audio data on associated speakers with the stereo system. In this instance, hand set 56 would be used to order or select the audio data from the application provider via standard cellular equipment, and the application provider would communicate directly with MAPOD 2a once the selection has been made for the broadcasting of the audio data. Similarly, MAPOD 2a may be used in conjunction with a voice mail system where the user of MAPOD 2a will have their voice messages downloaded from a voice mail system using a high data rate channel, and which are later broadcasted for the user. According to this scenario, the user of MAPOD 2a will minimize the cellular connection with the voice mail system and may have their messages broadcasted at a later time, or repeatedly without incurring substantial cellular telephone connection charges which would otherwise be experienced.

Figure 5:
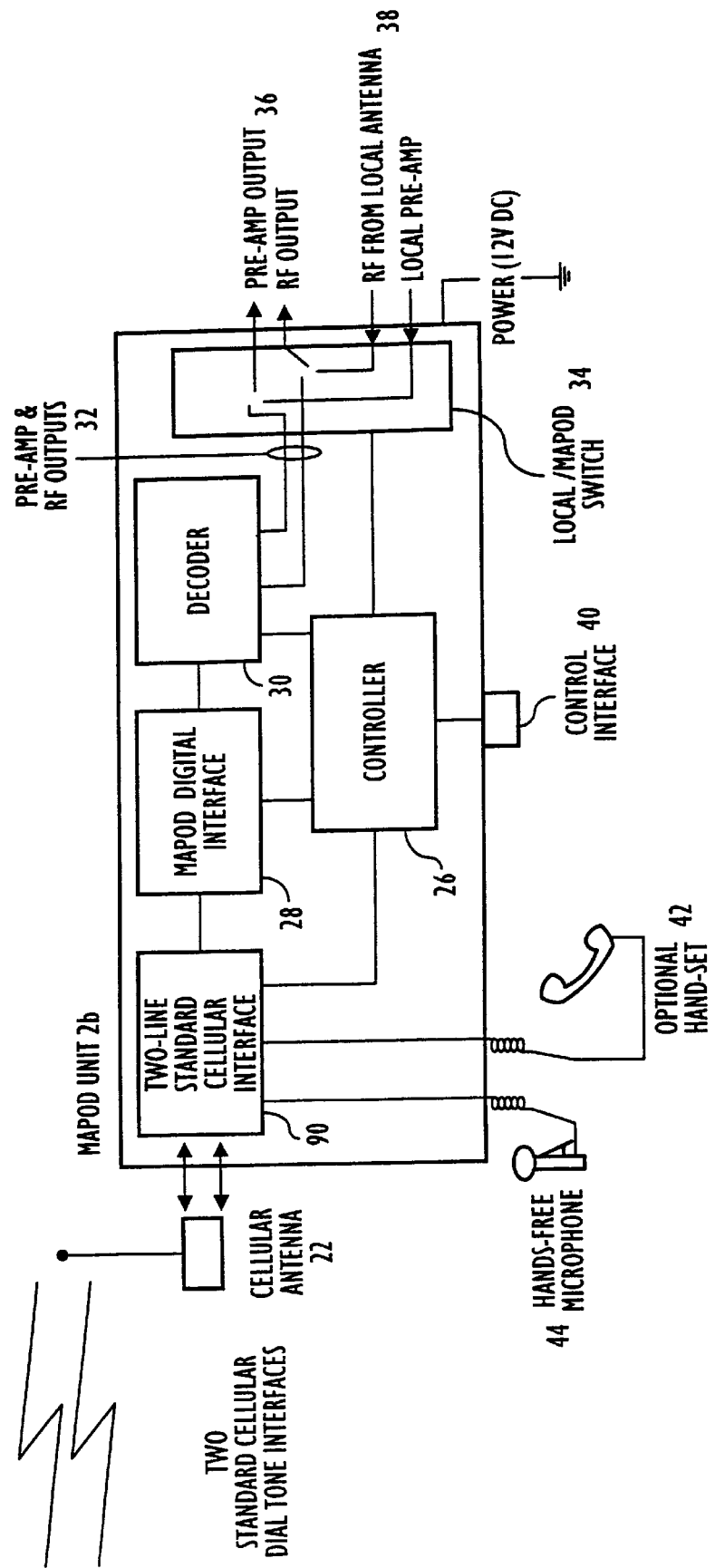
FIG. 5 is a block diagram of another embodiment of the mobile audio program selection device of the present invention.

FIG. 5 is a block diagram of another embodiment of the mobile audio program selection device of the present invention. In FIG. 5, the elements designated by the reference numerals which are identical to FIG. 2 perform the similar function, and therefore, will not be discussed in detail. In FIG. 5, MAPOD unit 2b includes, instead of a standard cellular interface 24, a two line standard cellular interface 90 which permits simultaneous voice connection between the MAPOD user and another party as well as an additional line which would permit the connection between a MAPOD user and the application provider network or another party. Two line cellular interface 90 is standard and will not be discussed here in detail.

Figure 6:
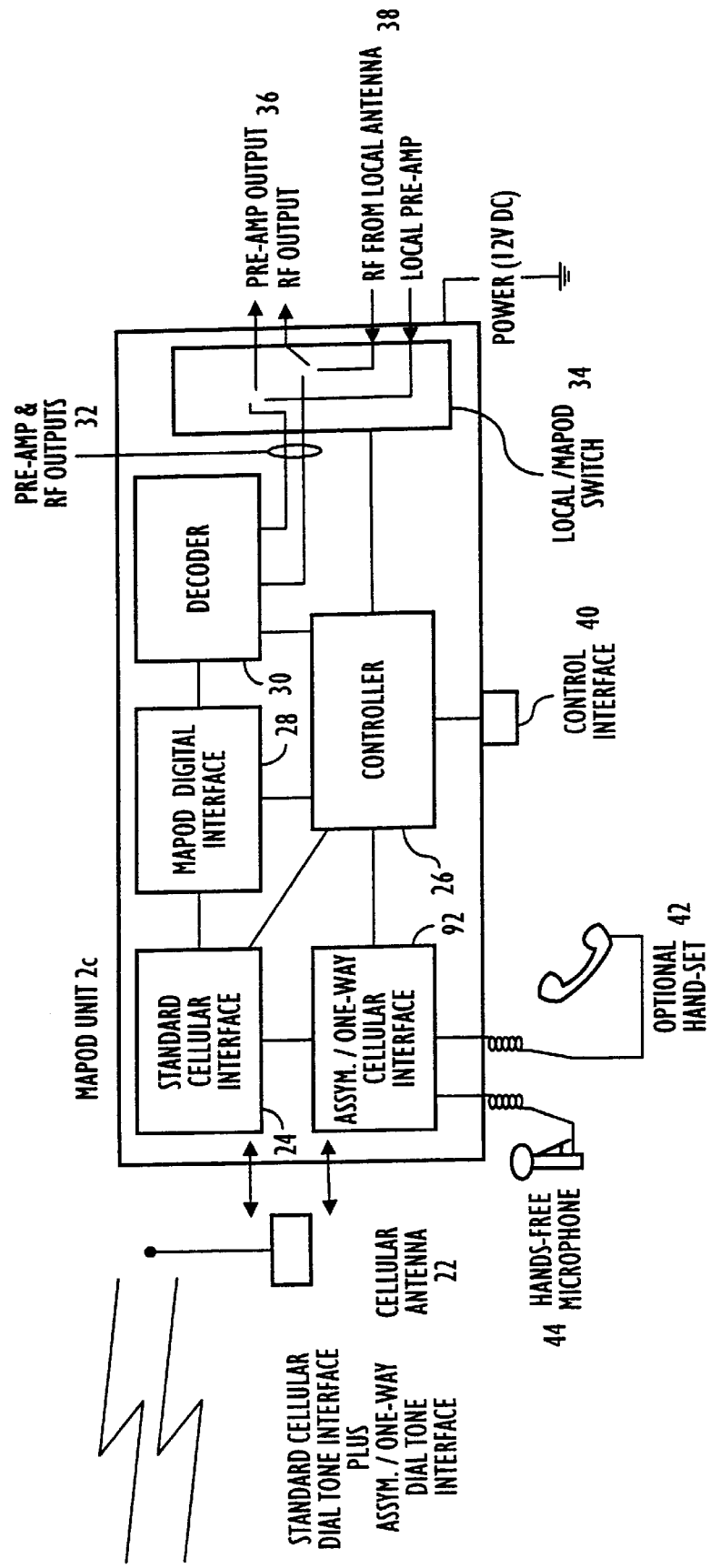
FIG. 6 is a block diagram of another embodiment of the mobile audio program selection device of the present invention.

FIG. 6 is a block diagram of another embodiment of the mobile audio program selection device. In FIG. 6, MAPOD unit 2c is substantially the same as MAPOD 2a illustrated in FIG. 2. However, MAPOD 2c further includes an asymmetrical one-way cellular interface 92 which is used for specifically receiving asymmetrical one way cellular audio data from an asymmetrical cellular network which is dedicated for the transmission of the audio data. In this situation, asymmetrical cellular interface 92 is able to receive the audio data at a much higher speed thereby further minimizing the connection time between MAPOD 2c and the cellular network which is transmitting the audio data. U.S. Pat. No. 5,247,347 is one example of an asymmetric connection between subscriber and application provider using standard asymmetrical digital subscriber line interface units over local lines, which is incorporated herein by reference.

In the previously described environment in connection with FIGS. 2 and 4–6, the MAPOD User Terminal would generally have the following capabilities:

(1) Cellular interface terminal
   (1a) standard (FIGS. 2 and 4), or
   (1b) two-line standard (FIG. 5), or
   (1c) standard plus asymmetrical/one-way downstream (FIG. 6)
(2) MAPOD digital interface to standard or optional one-way/asymmetrical cellular
(3) Compressed audio decoder
(4) Local audio pass-through These capabilities are available to the user within the following operating modes:

(a) Telephone call only: (1a), (1b), or (1c)
(b) MAPOD only: (1a), (1b), or (c); and (2)–(3)
(c) Telephone call and MAPOD: (1b) or (1c); and (2)–(3)
(d) Telephone call and local audio: (1a), (1b), or (1c) and (4)
(e) Off: (4)

The simplest situation involves a user terminal with (1a) type capability. The MAPOD application takes place over a standard cellular call. Operating modes (a), (b), (d) and (e) are possible. To access a MAPOD application, the user places a standard cellular call to the information provider and then negotiates service with the Application Gateway via the Speech Recognition Synthesized Audio Response (SR/SAt) unit. once an application is selected, it is provided over the same call path.

With a type (1b) user terminal, operation is similar to the above except that operating mode (c) is now available due to the presence of a second line.

With a user terminal possessing type (1c) asymmetrical or one-way downstream capability, the application negotiation phase would take place over a standard cellular call. For low- or non-interactive applications, application delivery would take place over a one-way or asymmetrical cellular call (established by the Application Gateway), thus freeing up the standard cellular interface. All operating modes are possible.

A typical MAPOD session could operate as follows from the user's perspective:

1. A user is driving an automobile and has activated the MAPOD device.
2. The MAPOD device initiates a cellular call to the MAPOD server gateway Speech Recognition of Synthesized Audio Response (SR/SAR) unit.
3. The SR/SAR welcomes the user and provides an audio menu (e.g., music, library, etc.). This menu could be standard or pre-customized by the user. Also, the experienced user could interrupt the menu to move more quickly through the process.

4. The user makes a selection by speaking the desired item.
5. The SR/SAR continues to prompt the user with audio menus and interpreting the verbal response until a specific programming selection is made (e.g., Glen Miller medley). The gateway application then prompts the server to provide the requested programming.
6. The user may interpret programming delivery at any time with the appropriate verbal command or by terminating the session (i.e., hanging up). In order to prevent an inadvertent interruption, the user could activate a switch on the MAPOD device to temporarily disable voice command transmission.)

Since the MAPOD delivery system is not limited by economics to programming formats with mass appeal as with broadcast radio, there is the potential to satisfy the needs of many more users who may desire programming alternatives. The proposed system could provide individual users with access to large programming libraries.

Figure 7:
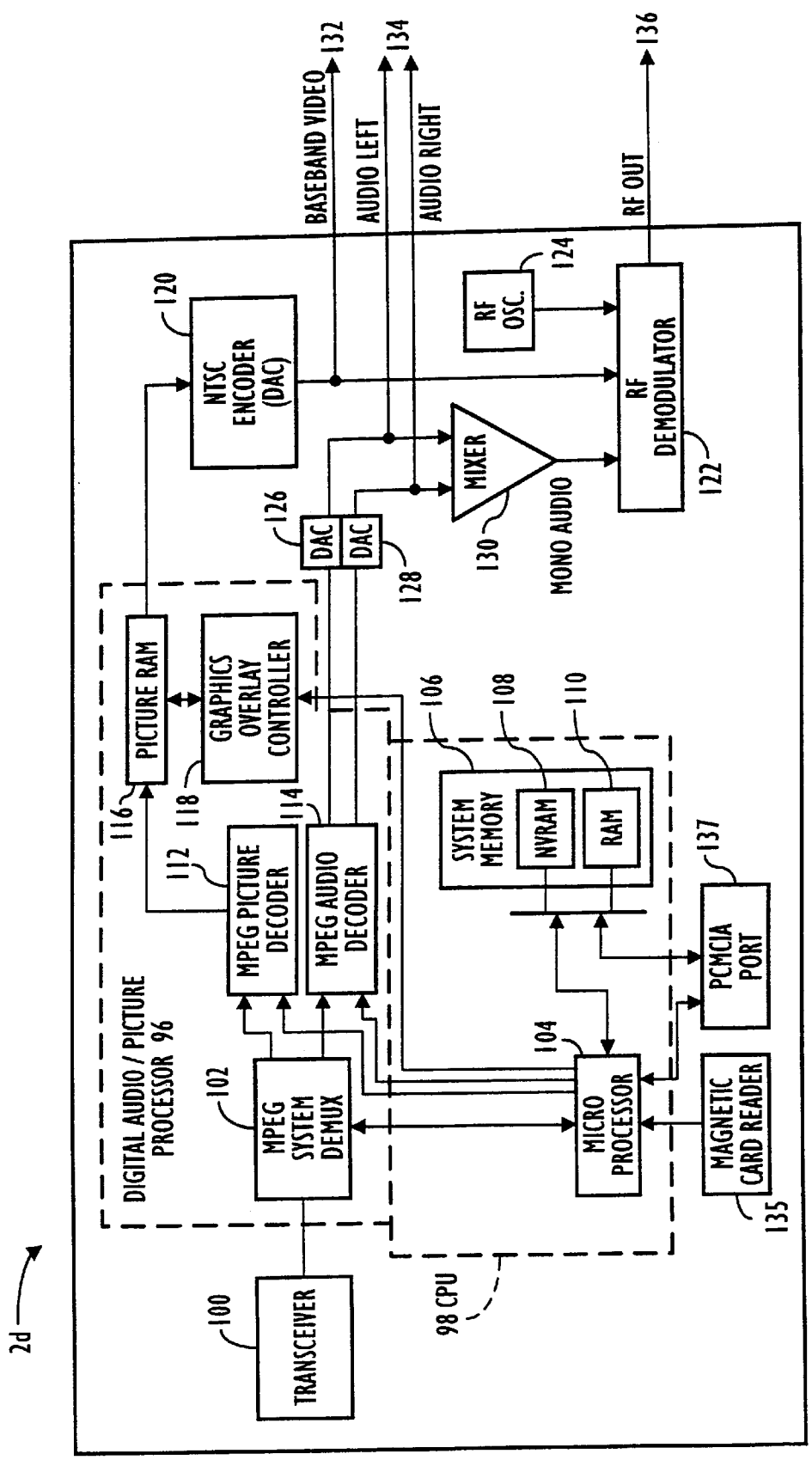
FIG. 7 is a block diagram of another embodiment of the mobile audio program selection device of the present invention.

FIG. 7 is a block diagram of another embodiment of the mobile audio program selection device having the ability to present a limited amount of graphical information to the user. In FIG. 7, MAPOD 2d may connect or interface with a number of different types of application provider networks, such as described in commonly assigned application Ser. No. 08/250,792, filed May 27, 1994, entitled "Full Service Network" (attorney docket no. 680-080), and commonly assigned application Ser. No. 08/250,791, filed May 27, 1994, entitled "Dynamically Programmable Digital Entertainment Terminal" (attorney docket no. 680-083), the disclosures of which are incorporated herein entirely by reference.

For each different type of network, MAPOD 2d includes transceiver 100 providing the actual physical connection to the particular type of network. Transceiver 100 will also perform any format conversion necessary between signal formats utilized by the network and signal formats used within MAPOD 2d. Transceiver 100 also provides two-way signal conversion and formatting, for example, for a control signalling channel and other standard cellular protocol described previously.

In the illustrated embodiment, transceiver 100 presents two connections to the rest of MAPOD 2d, a high bit rate broadband connection and a low bit rate signaling connection. The broadband connection is a one-way downstream only connection, but the low-bit rate signaling connection is a two-way connection.

Transceiver 100 may take the form of a plug in module. In the preferred embodiment, transceiver 100 would be similar to a daughter board or option card which can be plugged into a back plane of a personal computer (PC). In such an embodiment, typically a technician could replace the module in either the field or the shop, to modify transceiver 100 to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the transceiver 100, and input/output connections compatible with all of the digital broadband networks currently available. The downloaded operating system software stored in the system memory of the transceiver would control operations of the digital signal processor to send and receive signals in accord with the particular network the subscriber chooses to connect with transceiver 100.

MAPOD 2d includes CPU 98, comprising, for example, a 386 or 486 microprocessor 104 and associated system memory 106. The system memory 106 preferably includes at least 2 Mbytes of volatile dynamic RAM 110 and 1 Mbyte of non-volatile RAM 108. The microprocessor 104 also includes a small amount of ROM (not shown) storing "loader" programming needed to control "wake-up" after the power is turned "on". An EPROM memory (not shown) also may be added.

A digital audio/picture signal processor 96, controlled by the CPU 98, produces digital uncompressed audio and picture or graphical signals from the audio and picture MPEG encoded packets received from the network through transceiver 100. The audio/picture processor 96 includes an MPEG system demultiplexer 102, an MPEG picture decoder 112, an MPEG audio decoder 114, a graphics overlay controller 118 and at least two frames (e.g. 8 Mbytes) of picture RAM 116.

The MPEG system demultiplexer circuitry 102 recognizes packets in the MPEG data stream received over the broadband channel through transceiver 100, and routes the packets to the appropriate components of MAPOD 2d. For example, the MPEG system demultiplexer 102 circuitry recognizes audio and picture packets in the MPEG data stream and routes those packets to the decoders 114 and 112, respectively.

The MPEG picture decoder 112 decompresses received picture or graphical packet signals to produce a digital signal, and the MPEG audio decoder 114 decompresses received audio packets to produce left and right digitized stereo signals. For at least some functions, the MPEG decoders 112, 114 may be controlled in response to signals from the microprocessor 104. The MPEG picture decoder 112 will internally include at least two frames (e.g. 8 Mbytes) of RAM (not separately shown) for use as a frame reorder buffer during the MPEG decoding process, and the MPEG audio decoder 114 also may include some buffer memory.

The picture RAM 135 is preferably a standard digital data RAM, of appropriate size, which is used in MAPOD 2d to store digitized frames of video data. The RAM within the MPEG picture decoder 112 likewise consists of standard digital data RAM.

The graphics overlay controller 118 produces displays of text and graphics data, such as the initial turn-on selection menu received over the signaling channel, in response to instructions from the CPU 98. The picture RAM 116 sequentially receives each frame of digitized, uncompressed video information, as output from the MPEG picture decoder 112. The picture RAM 116 also receives digital information and read/write control signals from the graphics overlay controller 118 representing the several planes of text and graphics information and combines that information with the frames of decompressed picture to produce composite picture frames.

The graphics overlay controller 118 and the picture RAM 116 cooperate to manipulate, for example, five different planes of video information, four of which may be active at any one time, to produce the composite picture frame output signals. The individual planes comprise the decoded MPEG picture frames, a cursor, two graphics/text image planes manipulated by the microprocessor 104 and a backdrop plane. The backdrop plane would be switched in to replace the plane representing the decoded MPEG picture frames, e.g. to present a blue background instead of the MPEG picture background.

When there are no graphics or text, the composite frames would correspond entirely to the uncompressed received picture frames output by the MPEG picture decoder 112. When no received picture frames are to be output, either when none are received or when they are to be entirely replaced, the information from the graphics overlay controller 118 specifies a background and the active planes of text or graphic information. When received picture frames are combined with text and/or graphics, the composite picture frames include the uncompressed received picture frames with selected pixels thereof replaced with graphics or textual data display pixels specified by the graphics overlay controller 118. In this last situation, the graphics overlay controller 118 would deactivate the backdrop plane.

MAPOD 2d also includes audio and picture digital to analog converters and appropriate drivers to produce output signals compatible with a conventional television set or monitor. Specifically, the converter and driver circuitry of MAPOD 2d includes audio digital to analog converters (DAC) 126, 128, an audio mixer 130, an NTSC encoder 120, and an RF (radio frequency) demodulator 122.

The DAC's 126 and 128 receive the uncompressed left and right digitized audio signals output by the MPEG audio decoder 114. In response, the DAC's 126 and 128 produce baseband analog audio signals for output to individual baseband output terminals. The audio mixer 130 also receives the baseband audio signals from the DAC's 126 and 128. The mixer 130 combines the left and right analog audio signals to produce a monaural audio signal as the audio input to demodulator 122 which is synchronized via RF oscillator 124.

The NTSC encoder 120 also performs a digital to analog converter (DAC) function. In response to the digitized picture signals received from the picture RAM 116, the NTSC encoder 120 produces a baseband analog signal in standard NTSC format. The baseband NTSC signal is supplied to an output terminal 132 of MAPOD 2d. The baseband NTSC video signal is also supplied to the RF demodulator 122. The RF demodulator 122 responds to the mono audio signal, the NTSC signal and an RF signal from a local RF oscillator 124, to produce a standard RF television signal on an available TV channel, typically channel 3 or channel 4.

The type of connection of MAPOD 2d to the television set or monitor depends on the capabilities of the user's television set. If the user has a monitor type television capable of receiving baseband picture and stereo audio inputs, the appropriate terminals of the television would connect directly to the picture and audio output terminals 132 and 134 of MAPOD 2d. If the subscriber does not have such a television monitor, then the RF output of the demodulator 122 would be connected to the cable or antenna input connection of the television, e.g. by coaxial cable via RF output 136. Alternatively, the digitized picture and audio may go to separate output terminals (not shown) for connection to inputs of digital display devices, for example, for high definition television (HDTV) sets.

MAPOD 2d is an open interface device in that it interacts with equipment of a large number of program providers to offer users a wide array of principally audio programming for the mobile user. MAPOD 2d is preferably a programmable device to which different individual program providers can download application software, and at least one program provider can download all or a part of the operating system. In non-volatile memory (ROM and non-volatile RAM), MAPOD 2d will store a loader program and an operating system. The loader program and operating system in the ROM and the non-volatile RAM will include sufficient programming to control initial communications and define interfaces and drivers.

MAPOD 2d also includes a magnetic card reader 135 connected to the microprocessor 104. This reader 135 could be used to scan credit card information encoded on magnetic strips on commonly available credit cards for purchasing audio programming. In a home shopping and purchasing audio service, controlled by the downloaded software, the user would scan their own credit card through the magnetic card reader 135 as part of the payment operations. The reader could also have magnetic write capabilities to perform debit card operations.

MAPOD 2d further includes a personal computer memory-card interface adapter (PCMCIA) port 137. This is a two-way interface for connection to and communication with a flash memory module, such as is now incorporated into advanced "smart card" devices. A user might communicate with an auxiliary database connected via PCMCIA port 137 and a broadband network. For example, the user's personal information could be read from the smart card and subsequently updated on the smart card, through the PCMCIA port 137. Another use of this port might involve communication to another system to download information. Although specified as a "memory" port and mapped by the CPU as part of its system memory space, the devices connected to this port 137 can have other data processing capabilities, e.g. buffering and modem communication capability.

In the current implementation, the PCMCIA port 137 will carry 6 Mbits/s of data, but the port can be designed for higher speeds such as 20 Mbytes/s. Another use of this port would be for connection to an Ethernet card or other Local Area Network (LAN) card to permit data communications between MAPOD 2d and one or more computers. MAPOD 2d would provide the computers with communication services through the broadband network, for example to receive high speed downloads of new or updated software for those computers.

Figure 8:
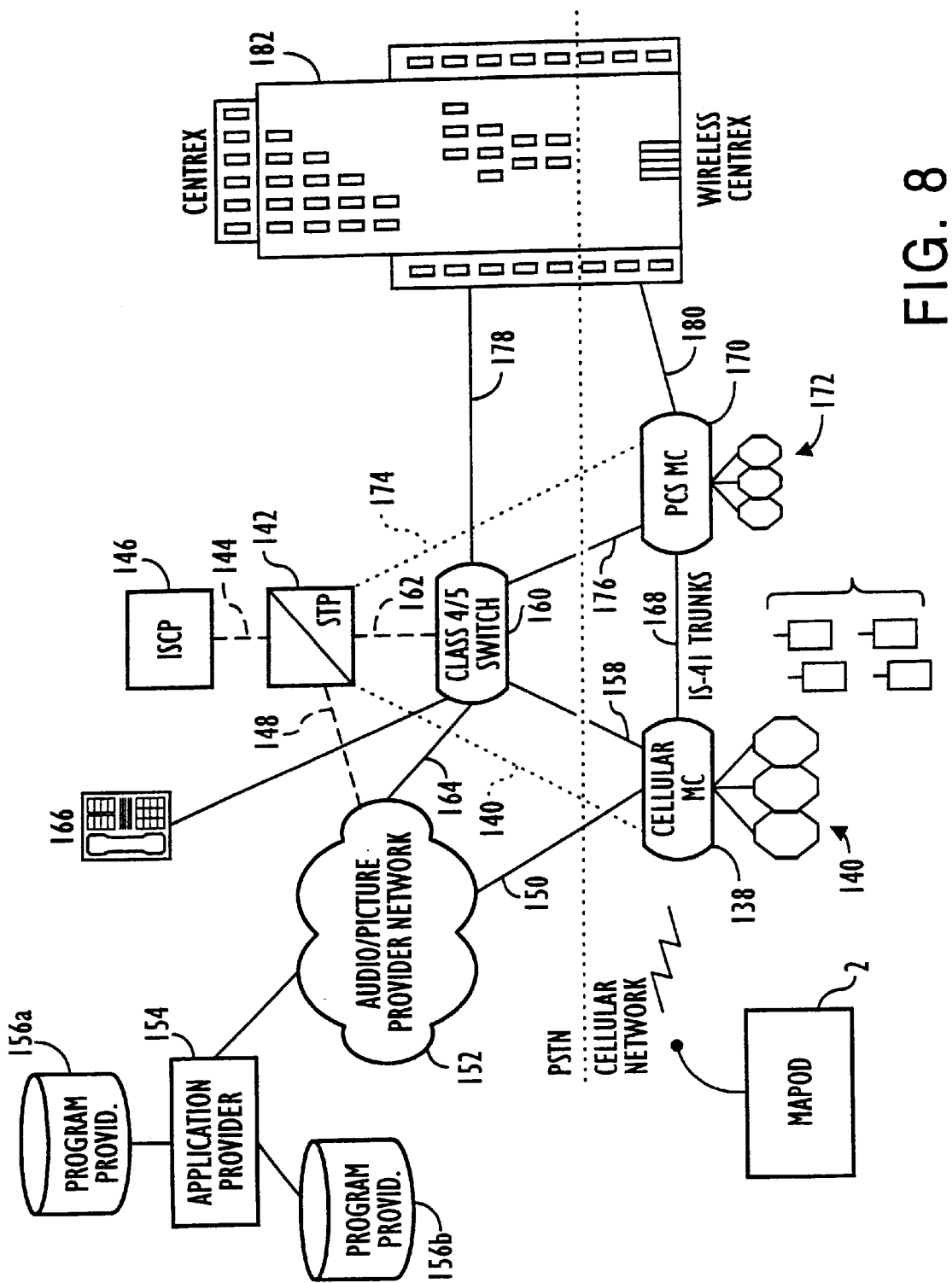
FIG. 8 is a diagram of another embodiment of the mobile audio program selection system of the present invention.

FIG. 8 is a diagram of another embodiment of the mobile audio program selection system used in connection with an Advanced Intelligent Network (AIN) type architecture. In FIG. 8, one or more central office switches, such as the class 4/5 Switch 160, are located throughout a state or region served by a telephone operating company (TELCO). Local telephone lines connect the central office switch 160 to individual telephone terminals in each geographic area, for example to the Plain Old Telephone Service (POTS) phone 166.

Although shown as telephones in FIG. 8, the terminals can comprise any communication device compatible with the line. In addition, wireless communication services are provided via radio links using frequencies assigned to cellular communications networks. Other types of wireless communication, however, could be substituted for the radio communication systems. For example, the invention could use a series of radio relay transponders, an infrared system or a satellite based system to provide one or more of the wireless links.

Switch 160 connects via trunk circuits 158, 176 to one or more Mobility Controllers (MC's), such as the Cellular MC 138 and the Personal Communication Service (PCS) MC 170. Each central office my also connect via trunk circuits to one or more remote central offices. The trunk circuits carry large numbers of telephone calls between central offices and/or between a central office and the mobility controllers. Also, each central office has a Common Channel Inter-office Signalling (CCIS) type data link 125 going to a Signalling Transfer Point (STP) 142. CCIS type data links 140 and 174 provide data communication for PCS and related special service processing between the MC's 138, 170 and the STP 142. Also, a CCIS packet switched data link 144 connects the STP 142 to an Integrated Serves Control Point (ISCP) 146.

Each MC connects to antennas for a number of cell cites to provide wireless communication services to PCS portable handsets and/or other wireless mobile communication devices including MAPOD 2 discussed in detail below. In the example shown, Cellular MC 138 controls communications via a number of macrocells 140. PCS MC 170 controls communications via a number of microcells 172. The MC's 138, 170 are also interconnected with each other by IS-41 data trunks 168, and may be interconnected via voice trunks (not separately shown) essentially running in parallel with the IS-41 trunks 168.

MAPOD 2 interfaces with cellular mobility controllers 138 and 170 for ordering and receiving audio programming from an application provider. Cellular mobility controllers 138 is connected to audio/picture provider network 152 via IS-41 data trunk line 150. In addition, cellular mobility controller 170 is connected to audio/picture provider network 152 via IS-41 data trunk 176, switch 160 and IS-41 data trunk line 164. Alternatively, mobility controller 170 may be directly connected to audio/picture provider network 152. Audio/picture provider network 152 may also be connected to STP 142 via CCIS type data link 148 to permit some limited control exercised by ISCP 146. Audio/picture provider network 152 retrieves the audio selection from the appropriate application provider 154 and program provider 156a, 156b.

Additionally, to provide land line type centrex services for a business customer, the switch 160 provides a land line connection 178 to the customer's premises 182. The land line link would actually include a number of telephone lines connected to various types of conventional telephone terminal devices. To provide wireless centrex services to a particular location, which may be the same customer premises 182, lines 180 connect the PCS MC 170 to macrocell antennae within the customer's building. Although shown as a single building, the integrated Centrex could cover a broader area, for example an entire college campus.

Figure 9:
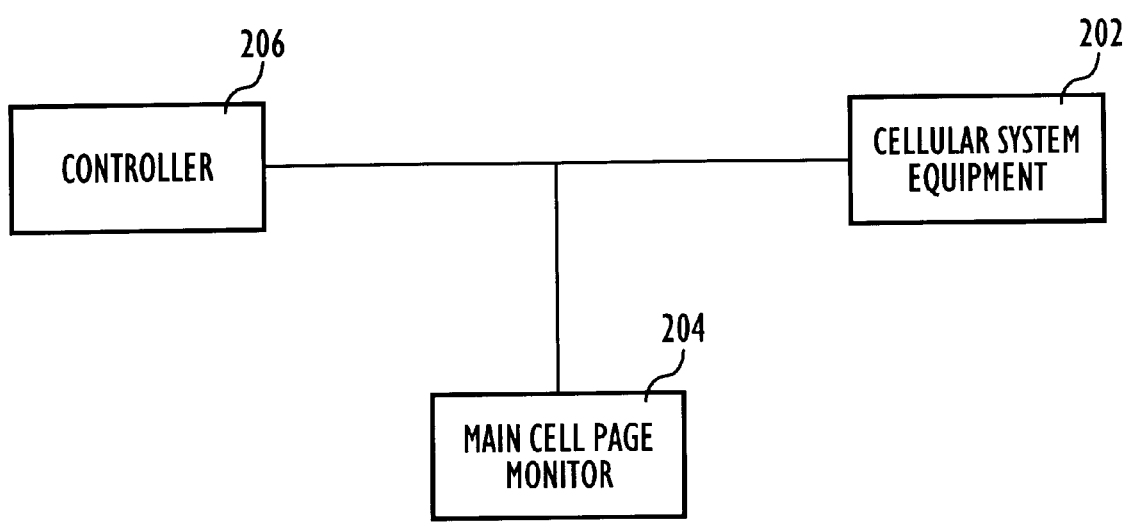
FIG. 9 is a diagram of another embodiment of the mobile audio program selection system of the present invention.

FIG. 9 is a diagram of another embodiment of the mobile audio program selection system of the present invention when used in conjunction with the MAPOD for receiving, for example, broadcast, message, data, voice, audio, and/or image information and storing same thereon as described above in detail. In FIG. 9, cellular system equipment 202 is constructed of conventional cellular equipment which can be purchased from AT&T, for example, and is used to establish cellular service with a mobile telephone by connecting a mobile telephone to, for example, a public switching telephone network. A main cell page monitor 204 monitors the overhead control channels to determine whether the main cellular system has transmitted a page message to a mobile telephone which may be located in the off-load cellular system.

If the main cell page monitor 204 receives a page message from the main cellular system, the main cell page monitor 204 notifies the controller 206 that a page message has been received and transmits the page message to the controller 206. The controller 206 formats the page message to be accepted by cellular system equipment 202 for rebroadcasting within the off-load cellular system. This rebroadcasting of the page message permits a mobile telephone to receive a page message from the main cellular system even while located within the off-load cellular system.

Rebroadcasting the page message is necessary since standard mobile telephones will naturally tune to the frequency or channel having the highest signal strength within a cellular service system or provider. Thus, with this configuration, a mobile telephone located within an off-load cellular system will be able to receive pages, voice, data, image, audio information, and the like, from the main cellular system to permit the main cellular system to access the mobile telephone and to be stored thereon while the off-load cellular system appears transparent to the main cellular system.

In addition to the rebroadcasting of the page message to permit the mobile telephone to receive pages from the main cellular system, controller 206 may also be used to determine whether a mobile telephone which is located in the off-load cellular system should be serviced by the off-load cellular system or whether the mobile telephone should be selectively shed from the off-load cellular system to receive cellular service from the main cellular system.

The mobile telephone's access attempt is shed by broadcasting a message instructing the mobile telephone to tune to the main cellular system. As will be discussed, the message preferably conforms to EIA-553 interface specifications and includes a directed retry message as discussed in these specifications.

Figure 10A:
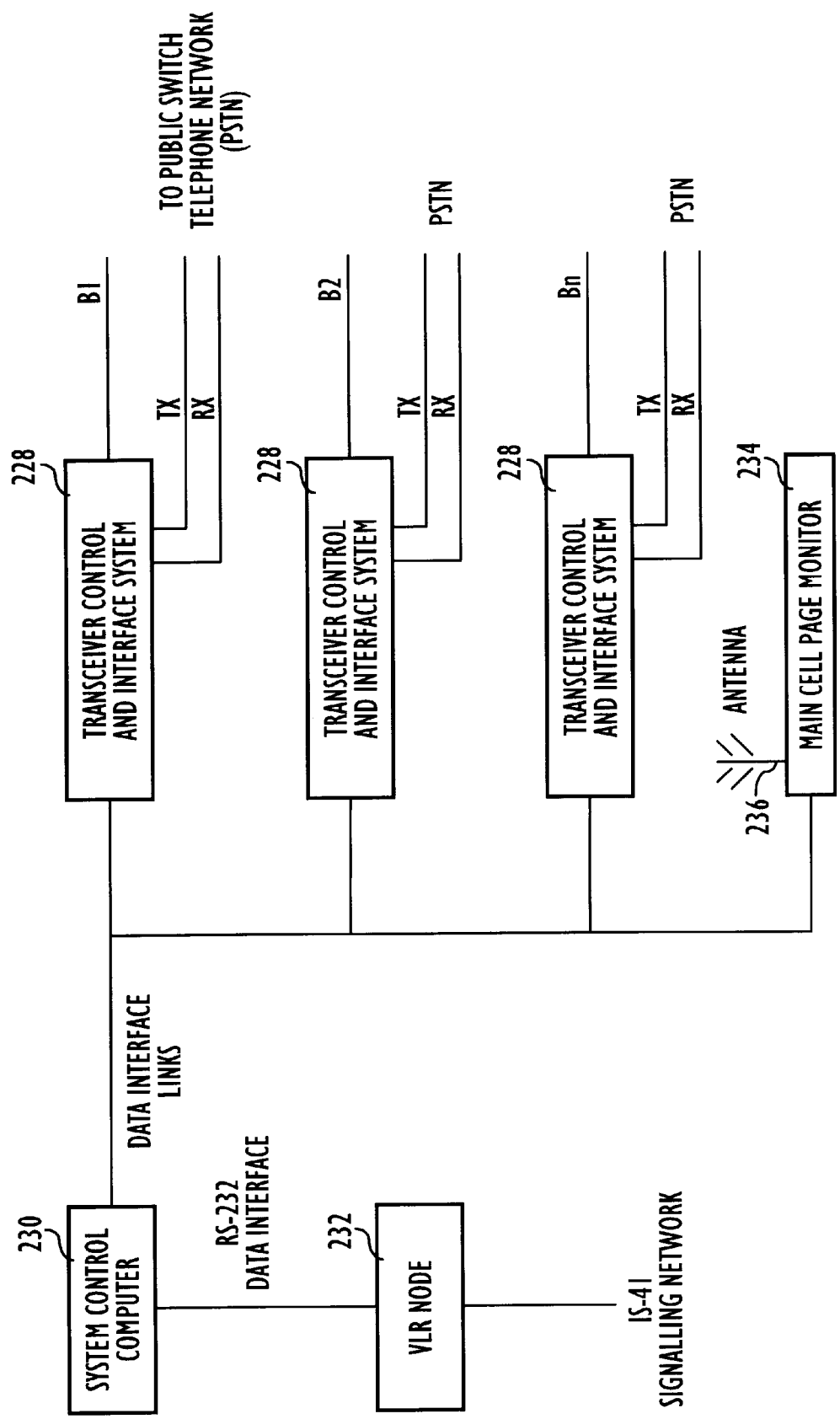
FIGS. 10A–10B together comprise a block diagram of the circuit construction of the present invention according to the embodiment of FIG. 9.
Figure 10B:
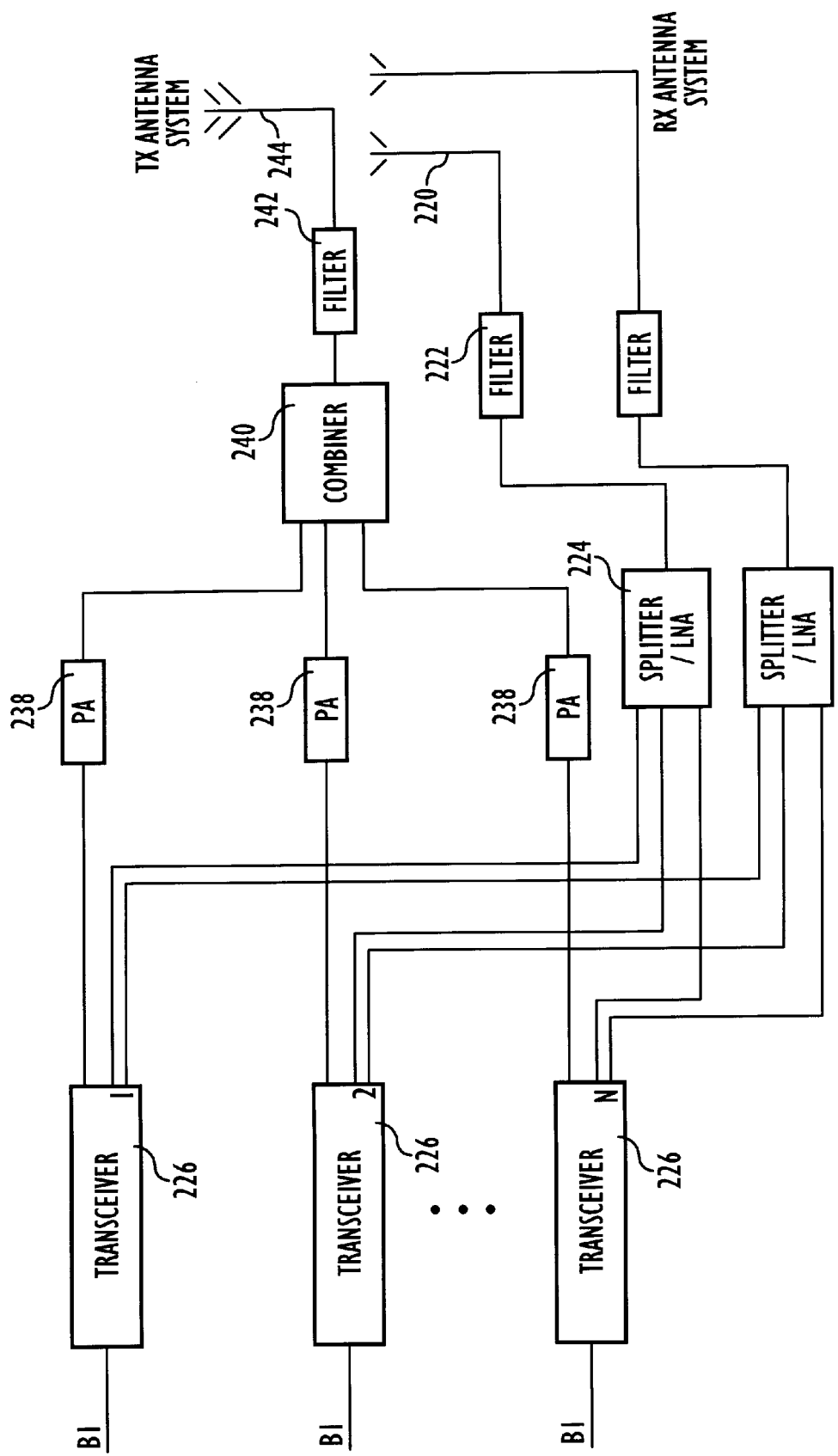

FIGS. 10A and 10B together comprise a block diagram of the present invention according to the first embodiment. In FIGS. 10A and 10B, receive antenna system 220 is used to receive signal transmissions from the mobile telephone. The receive antenna 220 may, for example, simply be a leaky coaxial cable connected to a 3-DB mobile antenna mounted in various floors of an office building. Once the receive antenna system 220 has received a signal from the mobile telephone, the signal is transmitted to conventional filter 222 via, for example, a coaxial cable which may be connected to filter 222 using an N-type connecter.

Filter 222 is preferably a band pass filter which limits the band width of the receive signal of receive antenna system 220. Filter 222, therefore, is used to limit the frequencies of channels which are to be considered by the off-load cellular system, i.e., filter 222 excludes signals which are not of interest to the off-load cellular system but which may be of interest to other systems, such as other cellular systems or marine based systems, etc. Filter 222 then transmits the filtered signal to the low noise amplifier (LNA)/splitter 224 via, for example, a coaxial cable which may be connected to the low noise amplifier/splitter 224 via an N-type connector.

Low noise amplifier/splitter 224 is conventional and amplifies the signal received from filter 222 and splits the signal into various identical signals which are then output to each transceiver 226. The signal is amplified in the low noise amplifier/splitter 224 since there is a great deal of loss in the signal. when the signal is split. The low noise amplifier/splitter 224 is connected to the transceiver 226 via, for example, a coaxial cable using, for example, an N-type coaxial connection.

Conventional transceiver 226 receives the signal from the low noise amplifier 224 which is in the standard interface format used between mobile telephones and cellular systems i.e., Electronic Industries Association (EIA)-553 publication. The transceiver 226 boosts the received signal using a preamplifier and then demodulates the signal into 10 kHz Manchester encoded data. The transceivers 226 may be preprogrammed by the transceiver control and interface system 228 to receive specific channels of interest which are broadcast by the mobile telephone for call registration, call origination or page response messages. The transceiver is connected to the transceiver control and interface system 228 using, for example, a 25 conductor cable assembly with a D-sub connector.

The transceiver control and interface system 228 receives the Manchester encoded data from the transceiver 226, decodes the Manchester encoded data received from transceiver 226 and extracts information received from the mobile telephone such as mobile identifier, electronic serial number, telephone number, etc. The transceiver control and interface system 228 then sends the decoded data to the system control computer 230 using, for example, a conventional RS-232 interface cable connection. The protocol used between the transceiver control and interface system 228 and the system control computer 230 can be any standard protocol such as an asynchronous 8 bit transmission protocol. The data which is received by the system control computer 230 initially transmitted from the mobile telephone is typically either a mobile telephone registration, origination or page response message.

Figure 11:
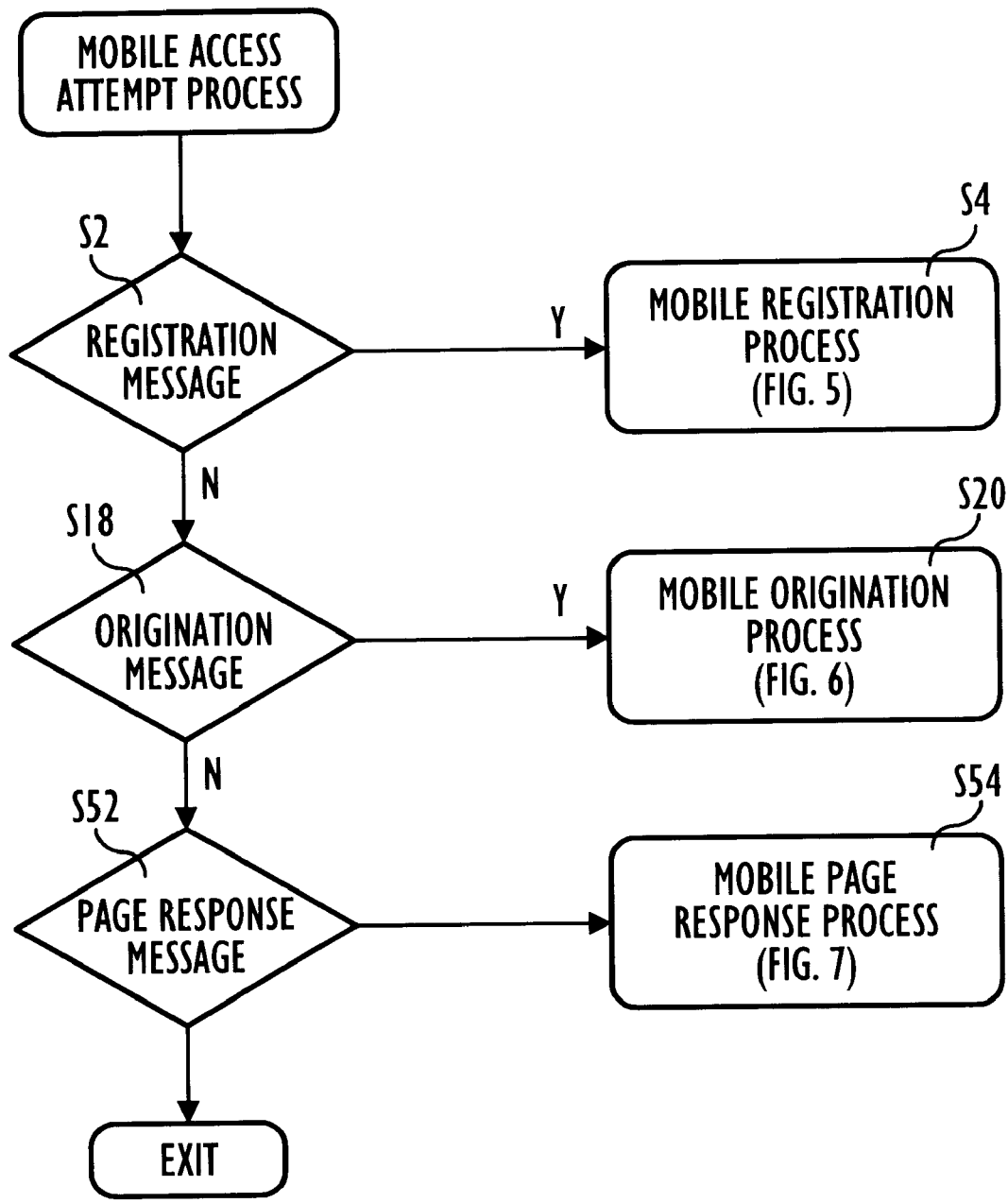
FIG. 11 is a flowchart describing the mobile access attempt process of the present invention.
Figure 12:
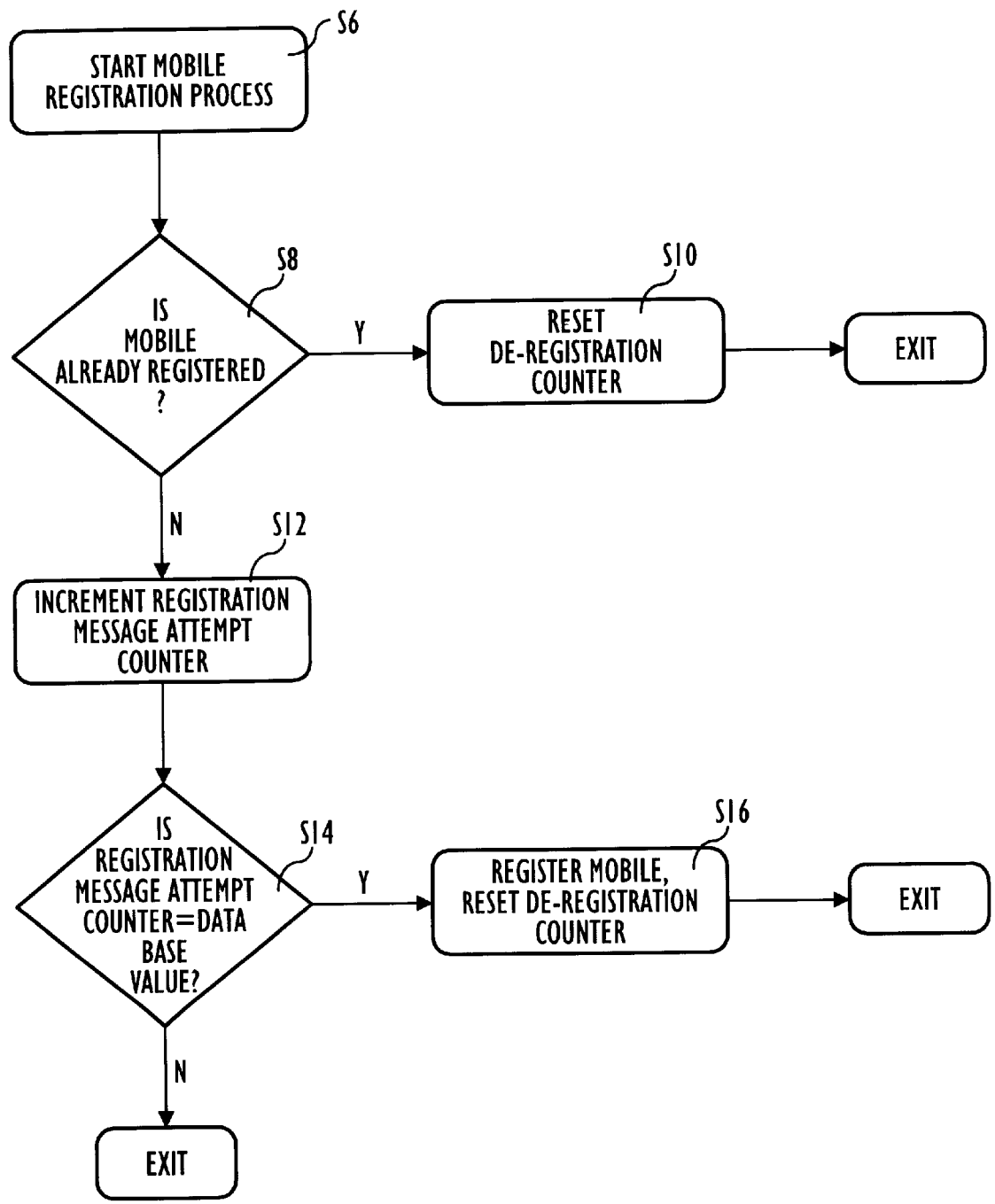
FIG. 12 is a flowchart describing the mobile registration message process of the present invention.

The operations which are performed by the system control computer 230 for the various messages are shown in FIGS. 11–16. When the mobile access attempt from the mobile telephone is a registration message, the system control computer 230 in step S2 of the FIG. 11 determines that the mobile registration process should be performed in step S4 which is shown in FIG. 12. The mobile registration process is then started in step S6 of FIG. 12 by the system control computer 230. The off-load cellular system will permit mobile registration, when the off-load cellular system is configured for autonomous registration, in the system control computer 230.

Autonomous registration is typically used in cellular systems to permit the cellular system to verify that a mobile telephone user may be provided with cellular service before the mobile telephone user has dialed a calling number and pressed a send key on the mobile telephone. Thus, autonomous registration permits the mobile telephone to be immediately connected with the calling party when dialing a calling number since the mobile telephone has been previously validated. When autonomous registration is not used, the mobile telephone placing the call must be validated, which requires additional time before the mobile telephone is connected with the calling party.

The registration process of the present invention utilizes the conventional registration process which detects the presence of mobile telephones prior to a call attempt and which is described in the cellular radio telecommunications system operations interface specification EIA-553. In order for the mobile telephone to perform autonomous registration, the system control computer 230 pre-programs the transceiver control and interface system 228 to transmit to the mobile telephone the standard interface message including registration bits which are set to indicate to the mobile telephone upon examination of the registration bits to perform autonomous registration according to the interface specifications EIA-553.

In addition, a mobile telephone may be validated, for example, for credit worthiness, using a conventional visitor location register (VLR) 232 which would be connected to the system control computer 230 via an RS-232 data interface; the visitor location register 232 may then interface with a conventional home location register (HLR) service using an IS-41 cellular signalling network or alternatively, the visitor location register 232 could access directly via, for example, a dial-up modem, a clearing house, such as GTE Telecommunication Services, which can validate the mobile telephone for the off-load cellular system.

Figure 16:
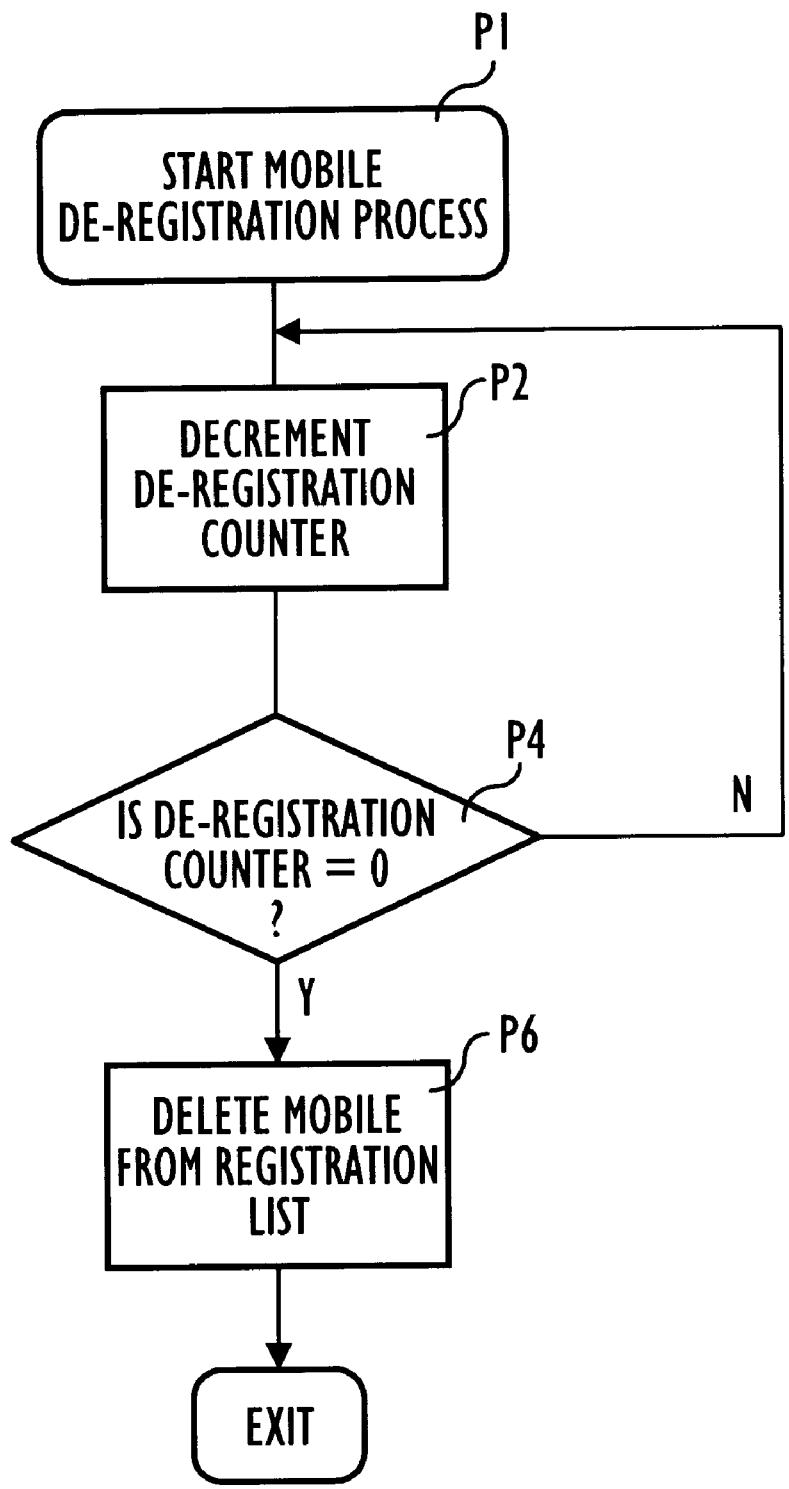
FIG. 16 is a flowchart of the mobile de-registration process of the present invention.

As shown in FIG. 12, the system control computer 230 determines whether the mobile telephone (or "mobile") is already registered in step S8, and if the mobile telephone is already registered, the system control computer 230 resets the de-registration counter of the de-registration process in step S10. The de-registration process constantly monitors whether the mobile telephone is attempting to register with the off-load cellular system. As shown in FIG. 16, the system control computer 230 decrements the de-registration counter in step P2 based upon a predetermined time interval. In step P4, the system control computer 230 determines whether the de-registration counter is equal to 0, indicating that the mobile telephone has failed to register again within the prescribed amount of time. If the de-registration counter in step P4 is not 0, then control is directed back to step P2 for decrementing the de-registration counter at the next specified time interval. If, however, the de-registration counter is 0, then the system control computer 230 deletes the mobile telephone from a registration customer list maintained by the system control computer 230 thus indicating that the mobile telephone is now no longer registered with the off-load cellular system. From step S10 in FIG. 12, the mobile registration process and the mobile access attempt process are then exited until the system control computer 230 receives another access attempt from the transceiver control and interface system 228.

If the system control computer 230 determines in step S8 of FIG. 12 that the mobile telephone is not already registered, then the system control computer 230 increments the registration message attempt counter in step S12 and determines whether the registration message attempt counter is equal to a preset data base value in step S14. If the registration message attempt counter is equal to the database value, then the mobile telephone has attempted to register several times indicating that the mobile telephone is a suitable off-load cellular system user and, therefore, the system control computer 230 in step S16 registers the mobile telephone, and resets the de-registration counter. The mobile registration process is then exited until the next access attempt is received by the system control computer 230.

Figure 13:
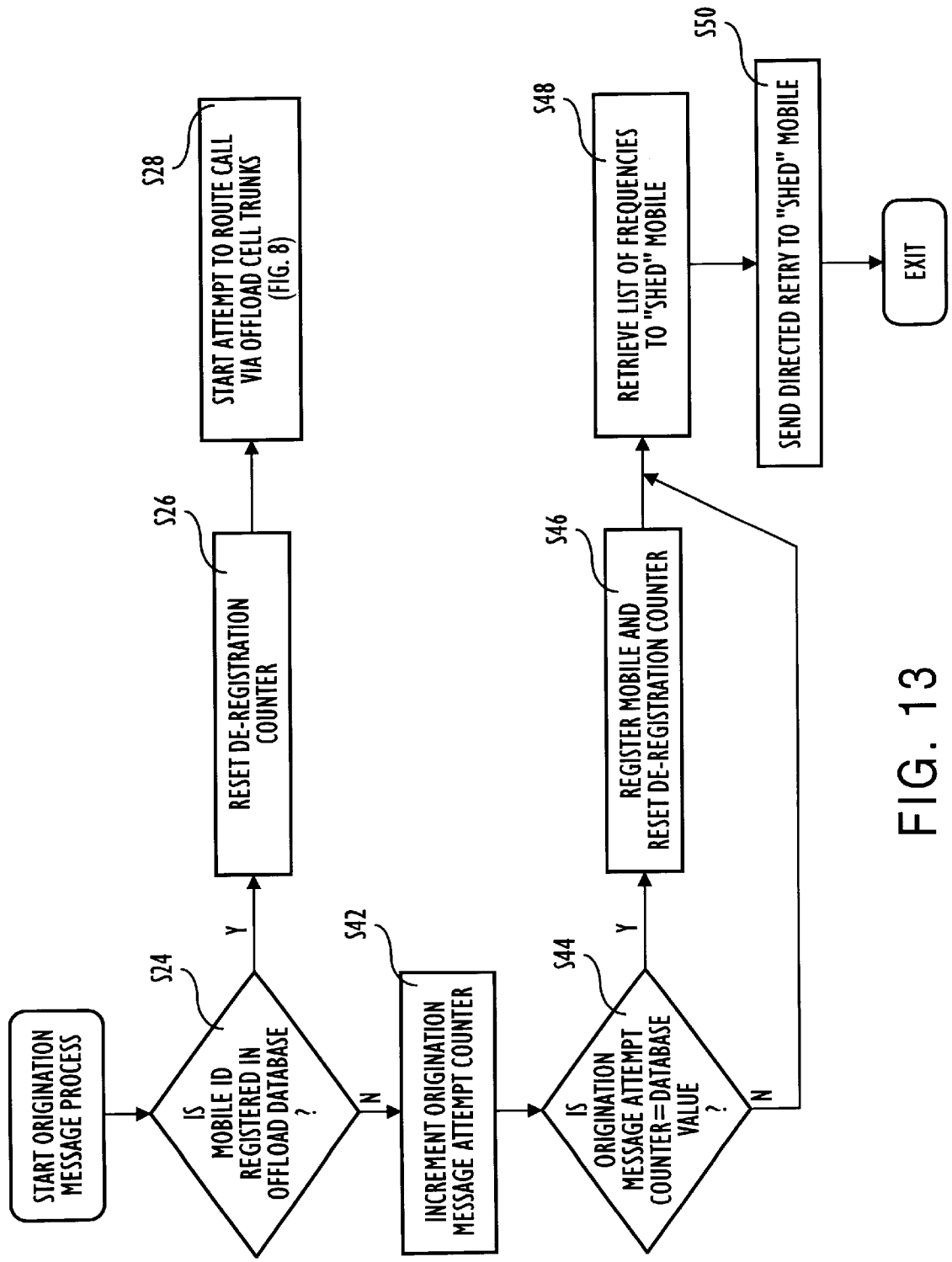
FIG. 13 is a flowchart describing the mobile origination message process of the present invention.
Figure 14:
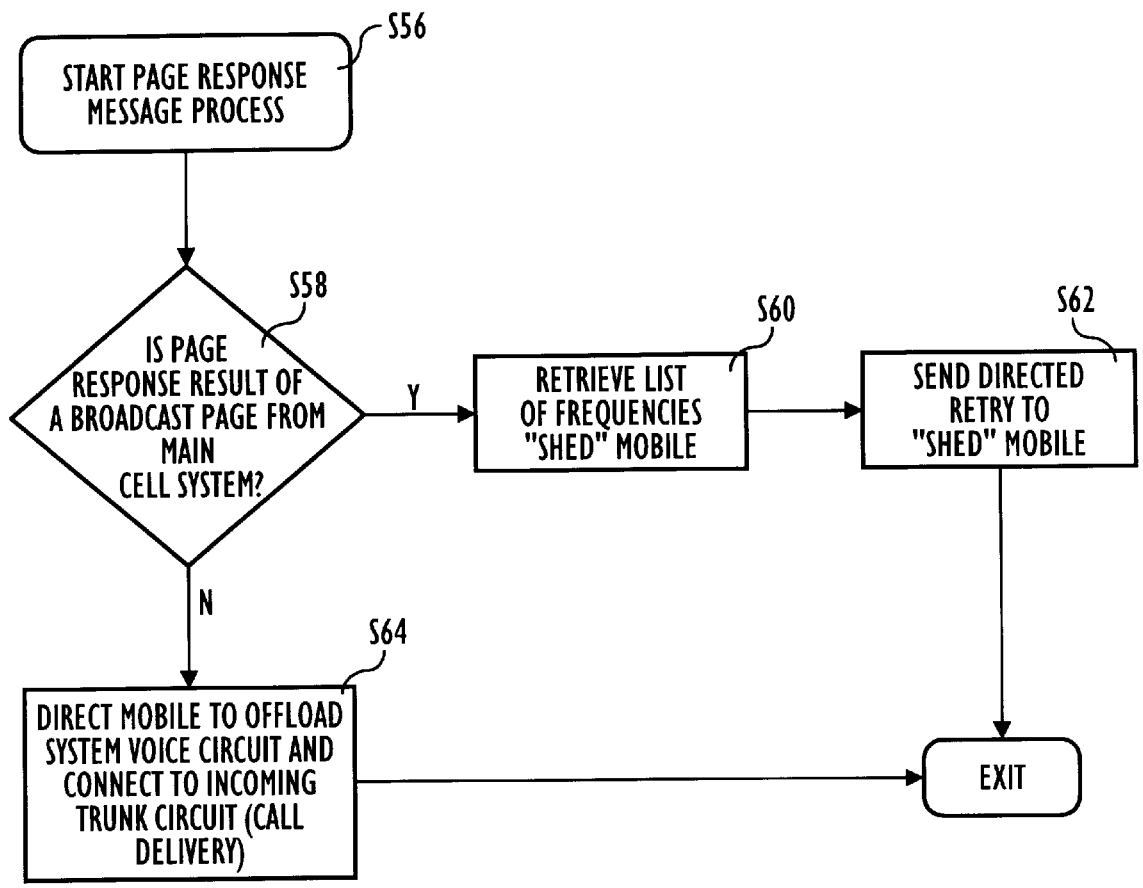
FIG. 14 is a flowchart of the mobile page response message process of the present invention.

If the system control computer 230 determines in step S18 of FIG. 11 that the mobile access attempt is an origination message, the origination message process is started in step S22 in FIG. 13 by the system control computer 230. The system control computer 230 first determines in step S24 whether the mobile identifier received from the transceiver control and interface system 228 is included in a conventional system control computer database (not shown). If the mobile identifier of the mobile telephone which has initiated the origination message is in the system control computer database, the system control computer 230 resets the de-registration counter in step S26 and then attempts to route the call using the off-load cellular trunks in step S28 which is shown in FIG. 15.

Figure 15:
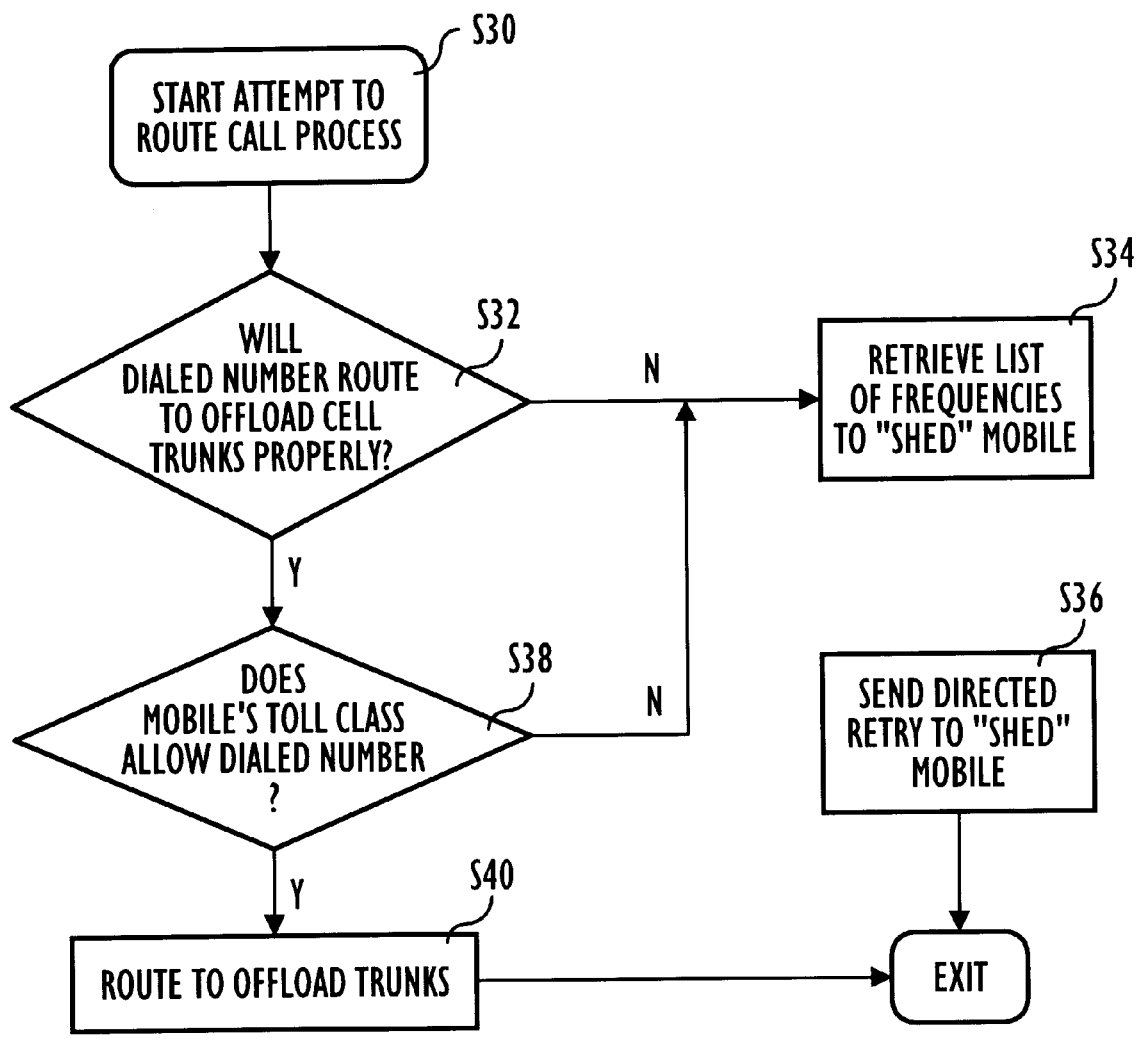
FIG. 15 is a flowchart of a route attempt process of the present invention.

The attempt to route out the mobile telephone call to the off-load cellular trunks starts in step S30 of FIG. 15. The system control computer 230 first determines whether the number dialed by the mobile telephone will route to the off-load cellular trunks in step S32. If the dialed number is not valid for the off-load cellular system, then the system control computer 230 will retrieve a list of frequencies to be used to remove or shed the mobile telephone from the off-load cellular system back to the main cellular system in step S34. These frequencies are previously determined to be compatible with the main cellular system, and therefore, the mobile telephone should be able to obtain cellular service using the main cellular system once the system control computer 230 indicates, to the transceiver control and interface system 228, to broadcast a control message preferably including a directed retry message in step S36.

The directed retry message is formulated according to existing EIA-553 interface specifications and indicates, to the mobile telephone, to tune to the specific frequencies of the main cellular system which are included in the directed retry message. After step S36 is performed, the attempt to route call process is exited until another origination message is received which includes a mobile identifier which matches the mobile identifier stored in the system control computer database.

If the dialed number will route to the off-load cellular trunks in step S32, the system control computer 230 determines whether the mobile telephone's toll class will allow the dialed number. If the mobile telephone's toll class will not allow the dialed number, then the mobile telephone is shed from the off-load cellular system in steps S34 and S36 by the system control computer 230 as described previously. If the mobile telephone's toll class will allow the dialed number, then the off-load cellular system will route the dialed number to off-load trunks in step S40 in order to connect the mobile telephone call to the telephone equipment associated with the dialed number. The attempt to route call process then exits.

If the system control computer 230 determines that the mobile identifier is not in the system control computer data base in step S24 of FIG. 13, an origination message attempt counter is incremented in step S42 and the system control computer 230 then determines whether the origination message attempt counter is equal to a predetermined database value in step S44. If the origination message attempt counter is equal to the database value, then the mobile is registered and the de-registration counter is reset by the system control computer 230 in step S46.

The mobile is then shed from the off-load cellular system in steps S48 and S50 as previously described with respect to steps S34 and S36 shown in FIG. 15. If the origination message attempt counter is not equal to the database value, then the mobile is not registered and the mobile is then shed from the off-load cellular system in steps S48 and S50. After step S50 is performed, the origination message process is then exited until the next origination message is received, as discussed above.

If the system control computer 230 determines that a page response message is received from the mobile telephone in step S52, of FIG. 11 which is in response to a page message from either the main or off-load cellular systems, then the mobile page response process is performed in step S54. The page response message process starts in step S56 of FIG. 14, and the system control computer 230 determines whether the page response which has been received from the transceiver control and interface system 228 is a result of a page message broadcast from the main cell system. If the page response is a result of a page message broadcast from the main cell system, the system control computer 230 retrieves a list of frequencies in step S60 to include in the directed retry message which is then sent to the mobile telephone via the transceiver control and interface system 228 in step S62.

A list of frequencies which are used for broadcasting the directed retry message may be obtained beforehand and stored in the system control computer based upon the off-load cellular system's location or ability to receive the control messages from the neighboring main cellular systems. For example, the system control computer 230 may store only two or three frequencies to use for broadcasting the directed retry message which represent the two or three cell sites of the main cellular system which are located near the off-load cellular system. Thus, these two or three main cellular systems will typically broadcast the strongest signal strength for the off-load cellular system region and, therefore, the mobile telephone needs only to be informed to retune to these two or three frequencies when the off-load cellular system sheds the mobile telephone.

Alternatively, the signal strength of the various main cell systems can be monitored by the main cell page monitor 34, discussed below, and the main cell page monitor 34 can inform the system control computer 230 of the frequencies which are the strongest to insure that the mobile telephone tunes to a frequency of the main cellular system which would be of the strongest signal strength thereby obtaining better reception for voice communication.

If the system control computer 230 determines that the page response is not a result of a page message broadcast from the main cellular system in step S58, then the system control computer sends a message via the transceiver control and interface circuit 228 to indicate to the mobile telephone to use a voice circuit of the off-load cellular system.

If the system control computer 230 determines that the page response is a result of a page message broadcast from the main cellular system in step S58, the main cell page monitor 34 receives the main cell page and rebroadcasts the page so that the mobile telephone located in the off-load cellular system will receive the main cell page. The system control computer 230 which implements the above processes may be a conventional IBM compatible personal computer using, for example, a conventional 386 type microprocessor chip.

The call delivery process is a standard function of the IS-41 interface specifications which allows a cellular system which receives a call attempt to one of its mobile telephones to deliver the call to another cellular system which is providing cellular service to the mobile telephone using the standard IS-41 interface protocol. Once the voice circuit is connected to the incoming trunk circuit in step S64, the page response message process ends.

The main cell page monitor 234 in FIG. 10A is used for receiving page messages of the main cellular system via receive antennas 236 and for indicating to the system control computer 230 via a standard RS-232 data interface the content of the page messages received from the main cellular system. The system control computer 230 will then transmit the page message to be rebroadcast to transceiver control and interface system 228. Transceiver control and interface system 228 then formats the message as described above to enable the mobile telephone to receive the page message in the proper format according to EIA-553 specifications. The formatted message is then transmitted to transceivers 226 for transmitting the message to the mobile telephone.

The signals which are to be transmitted may be amplified in conventional power amplifiers 238 and combined in conventional combiner 240. Alternatively, for low power implementation of the above off-load cellular system, power amplifiers 238 are not necessary. The combined signal is then filtered using conventional band pass filter 242 and then transmitted via conventional transmit antennas 244. Thus, a mobile which is currently locked on to the frequencies in the off-load cellular system will still be able to receive its pages from the main cellular system.

Once the mobile is registered (steps S16 or S46) via IS-41 procedures, the main cellular system may provide busy features such as indicating to a telephone equipment user trying to reach the mobile telephone that the mobile telephone is currently in the busy status as well as providing call forwarding and call waiting features when the mobile telephone is provided with cellular service from the off-load cellular system. In addition, the mobile telephone which is locked on to the off-load cellular system will be able to receive similar call treatment as the main cellular system such as specific dialing patterns, restrictions, activated features, etc. Additional details of the off-load cellular system or micro-cellular system are disclosed in U.S. Pat. No. 5,487101, incorporated herein by reference.

Figure 17:
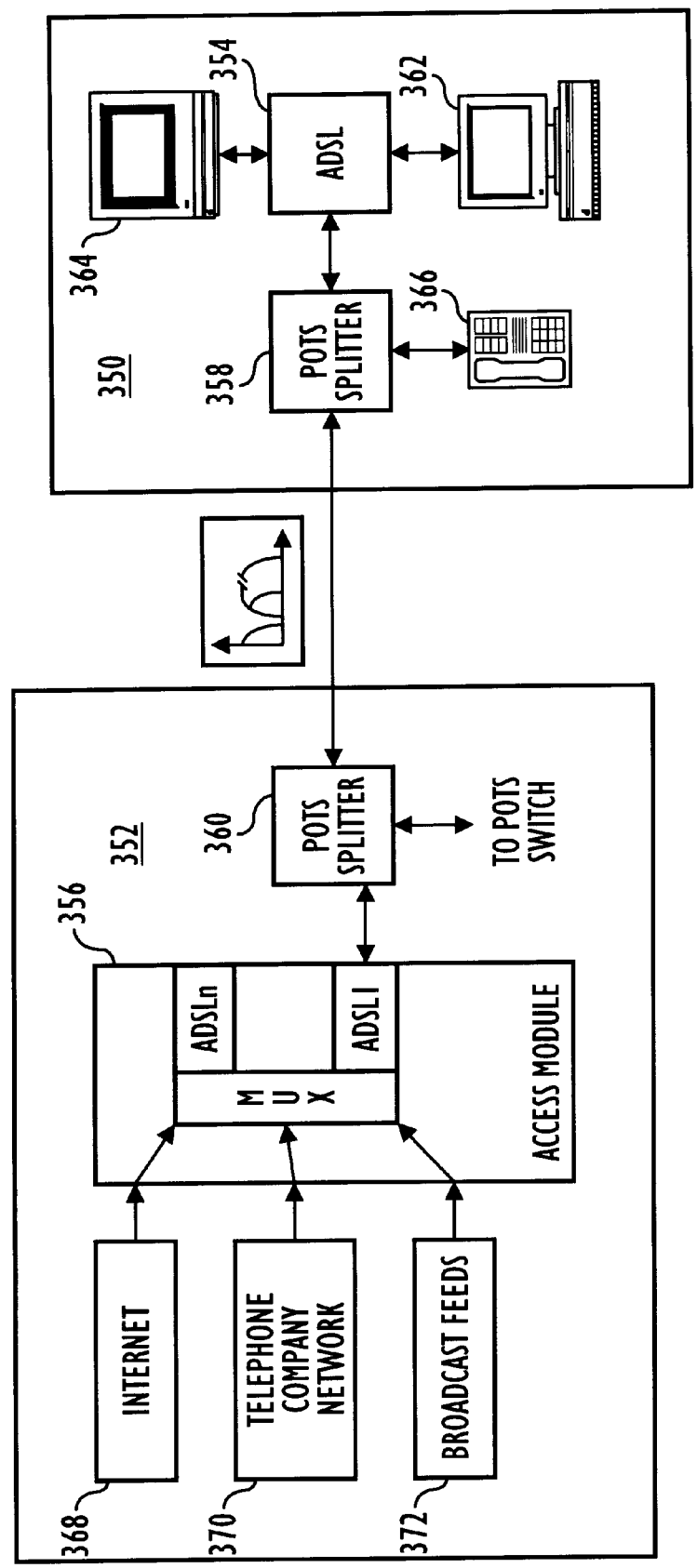
FIG. 17 is a block diagram of a standard ADSL arrangement.

FIG. 17 is a block diagram of a standard ADSL arrangement. To preserve POTS and to prevent a fault in the ADSL equipment 354, 356 from compromising analog voice traffic 366, the voice part of the spectrum (the lowest 4 kHz) is separated from the rest by a passive filter, called a POTS splitter 358, 360. The rest of the available bandwidth—from about 10 kHz to 1 MHz—carries data at rates up to 6 bits per second for every hertz of bandwidth from data equipment 362, 364. The ADSL equipment 356 then has access to a number of destinations including significantly the Internet 368, and other destinations 370, 372.

To exploit the higher frequencies, ADSL makes use of advanced modulation techniques, of which the best known is the discrete multitone (DMT) technology. DMT was pioneered by Stanford University, California, and Amati Communications Corp., San Jose, Calif., and endorsed by the American National Standards Institute (ANSI), New York City, and the European Telecommunications Standards Institute (ETSI), Sophia Antipolis, France.

DMT divides the bandwidth from about 10 kHz into a set of 265 independent subchannels, each 4 kHz wide. By measuring the quality of the subchannels and then assigning a bit-rate to each based on its quality, DMT customizes the transmit signal for every line. In doing so, it automatically avoids regions of the frequency spectrum that are too noisy or too attenuated to support reliable communications. If the quality of a subchannel degrades enough to affect a system's error performance, the data rate on that subchannel is lowered and the excess traffic moves to a subchannel capable of supporting it. The result is robust communications over single twisted pairs.

As its name implies, ADSL transmits data asymmetrically—at different rates upstream toward the central office 352 and downstream toward the subscriber 350. Such a technology makes sense for two practical reasons. For one, the typical WWW surfer is more interested in downloading large files than in uploading them, and therefore needs more capacity in the downstream (network-to-subscriber) direction.

The second reason is technical: when many wire pairs are squeezed together in a cable, cross talk is inevitable. Signals traveling downstream from the central office 352 are not much affected, because they are all of approximately the same amplitude. On the other hand, upstream traffic originates in subscriber premises 350, and these buildings may be at different distances from the points at which lines come together in a cable; accordingly, upstream signals can vary greatly in amplitude. If a wire pair carrying a strong signal shares a cable with another wire pair carrying a weak one, cross talk can be all too evident. But since cross talk increases with frequency, the problem can be made tractable by limiting the upstream data rate and keeping it near the low-frequency end of the spectrum.

Meanwhile, cable television providers are not sitting by idly. They want to provide Internet service to PC users over their TV cable systems by means of special cable modems. Such modems are capable of transmitting up to 30 Mb/s over hybrid fiber/coax systems (which use fiber to bring signals to a neighborhood and coax to distribute it to individual subscribers. Further, they are available, and they work.

Cable modems come in many forms. Most create a downstream data stream out of one of the 6-MHz TV channels that occupy spectrum above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The downstream channel is continuous, but, like Ethernet, divided into packets, with addresses in each packet indicating for which subscriber each is intended. the upstream channel has a media access control that slots user packets or cells into a single channel.

To avoid collisions, in some cable systems, upstream packets are gated onto the network via control signals embedded in the downstream information. Other approaches divide the upstream path into frequency channels and allocate a channel to each user. Still others combine these two multiplexing methods. A few modem companies are proposing techniques like spectrum spreading or code-division multiplexing to reduce susceptibility to interference from antennas and other sources of electromagnetic radiation outside the system. Called ingress noise, it is the biggest difficulty on hybrid fiber/coax networks.

Variation in the capacity of cable systems depends less on cable length than on ingress noise and on the number of users seeking simultaneous access to a shared line. (Cable data rates are not particularly sensitive to the length of the coaxial cable; amplifiers in the cable network keep signal power high enough to make length a minor consideration.)

Because cable TV systems use a shared-bus architecture, they may be less expensive to implement than ADSL. But that shared architecture is a double-edged sword. As with any shared medium, as more users go on-line, the capacity available to any one user inevitably falls.

At present, the point is somewhat academic since the top speeds of both ADSL and cable systems will not be usable for years anyway. Internet server speeds, network delays, and personal computer limitations will hold usable rates at or below 2 Mb/s for the foreseeable future. So far, ADSL offers higher security and reliability. Cable modems may offer a less expensive network solution because of the cable plant's shared architecture, but that differential is more than offset by infrastructure costs required to upgrade existing coaxial cable networks to hybrid fiber/coax. The technologies for both ADSL and cable modems are at about the same state of maturity and integration.

ADSL's greatest advantage is that it can make use of existing twisted copper pairs, which are numerous indeed compared with the number of hybrid fiver/coax lines that exist in upgraded cable systems. Today the global ratio is on the order of 600 million to 6 million, or about 100:1. In the United Sates, it is about 20:1. Even with aggressive cable upgrades, the numbers are not likely to reach parity over the next five or six years. Additional details regarding the above communication trends can be found in "Communications," IEEE Spectrum, p.27, January 1997, incorporated herein by reference.

We have also realized that there is yet another communication network and network design emerging. That is, to relieve the problem of poor performance for the Internet, about 100 U.S. researcher universities have joined forces to develop an ultrafast Internet—Internet 2 (see htpp://www.internet2.edu, incorporated herein by reference). However, Internet 2 is not designed just to create a fast network. Instead, it will also let researchers design the types of applications that could be used on fast networks.

Many universities already have network connections that will let them participate in Internet 2. Meanwhile, the North Carolina Giganet is already operating with Internet 2 architecture. This ultrafast network serves Duke University, North Carolina State University, and the University of North Carolina, Chapel Hill.

Internet 2 is decentralized. The participating institutions will decide many issues for themselves, such as the way they will connect to Internet 2 as the way they will connect to Internet 2 and who at their institutions will have access to the system. Some of the applications that will be developed on internet 2 may be ready by October 1997, although the program's target date for having applications online is October 1998.

Developers expect that Internet 2 will operate at 2.5 Gbps. Most of the current Internet runs at 45 Mbps, although some privately operated segments run at 155 Mbps. Developers will build Internet 2 on existing equipment and networks as much as possible. The single most expensive element, the core fiber-optic backbone, already exists as vBNS, the very-high-speed Backbone Network Service.

vBNS currently serves the five U.S. supercomputer centers and several universities that have recently connected to it. vBNS uses ATM networking over Sonet (the high-speed, fiber-optic switched synchronous optical network). Sonet uses gallium arsenide microelectronics to achieve high-speed, heavily loaded switching. vBNS originally was capable of 155 Mbps but since February has been capable of 2.5 Gbps.

Figure 18:
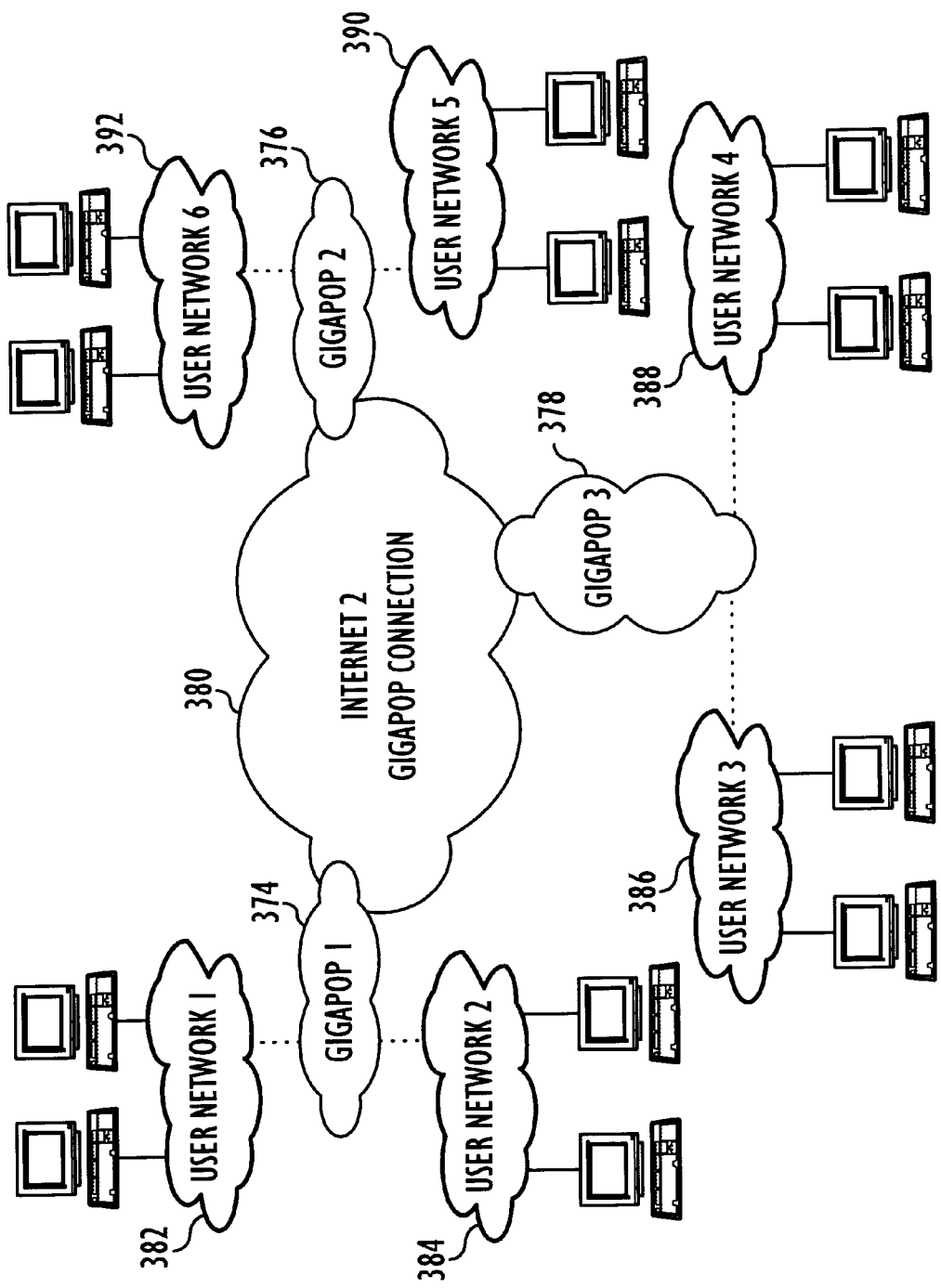
FIG. 18 is a diagram of Internet 2 architecture.

As shown in FIG. 18, Internet 2's 380 major nodes will be secure, specialized, high-speed network connection points called gigapops 374, 376, 378 (gigabit-capacity points of presence). The gigapops will provide all the equipment necessary to connect a set of universities 382, 384, 386, 388, 390, 392 to the vBNS backbone.

The set of users who hook up to each gigapop will determine exactly what form it will take, including the type of equipment it will use. Initially, the gigapops will be connected to each other by vBNS, through which they will receive fast network services. However, Internet 2 participants may develop their own central connection system in several years.

The basic network line level, ATM, will permit the broadband communication of everything from multimedia applications to TCP/IP applications. Internet 2 will use RSVP (resource reservation protocol) to manage the quality of service of real-time, data-intensive multimedia applications. At the network layer level, Internet 2 will support the current Internet Protocol version 4 and IPv6 (IP Next Generation), which is still under development. In fact, Internet 2 will be the testbed for many IPv6 concepts. Internet 2's design focuses heavily on maintaining predictable and dependable broadband, high-speed throughput by strictly controlling who uses the system, what they may use it for, and how they transmit data. For additional discussion on Internet 2, see "Tomorrow's Internet is Here Today," IEEE COMPUTER, p.22, April 1997, incorporated herein by reference.

Figure 19:
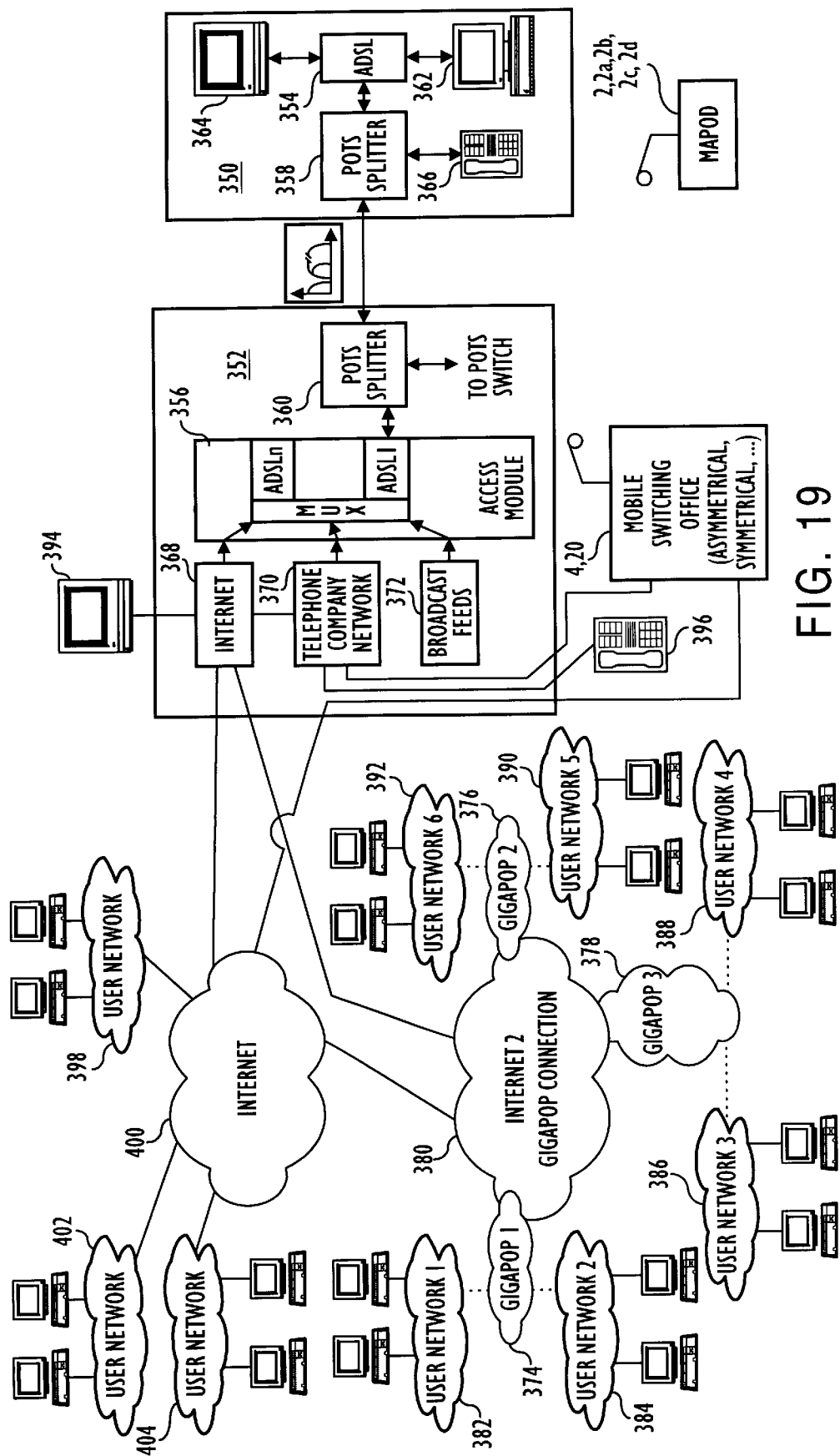
FIG. 19 is an illustration of the architecture of the combined internet, internet 2, POTS, and ADSL architecture.
Figure 20:
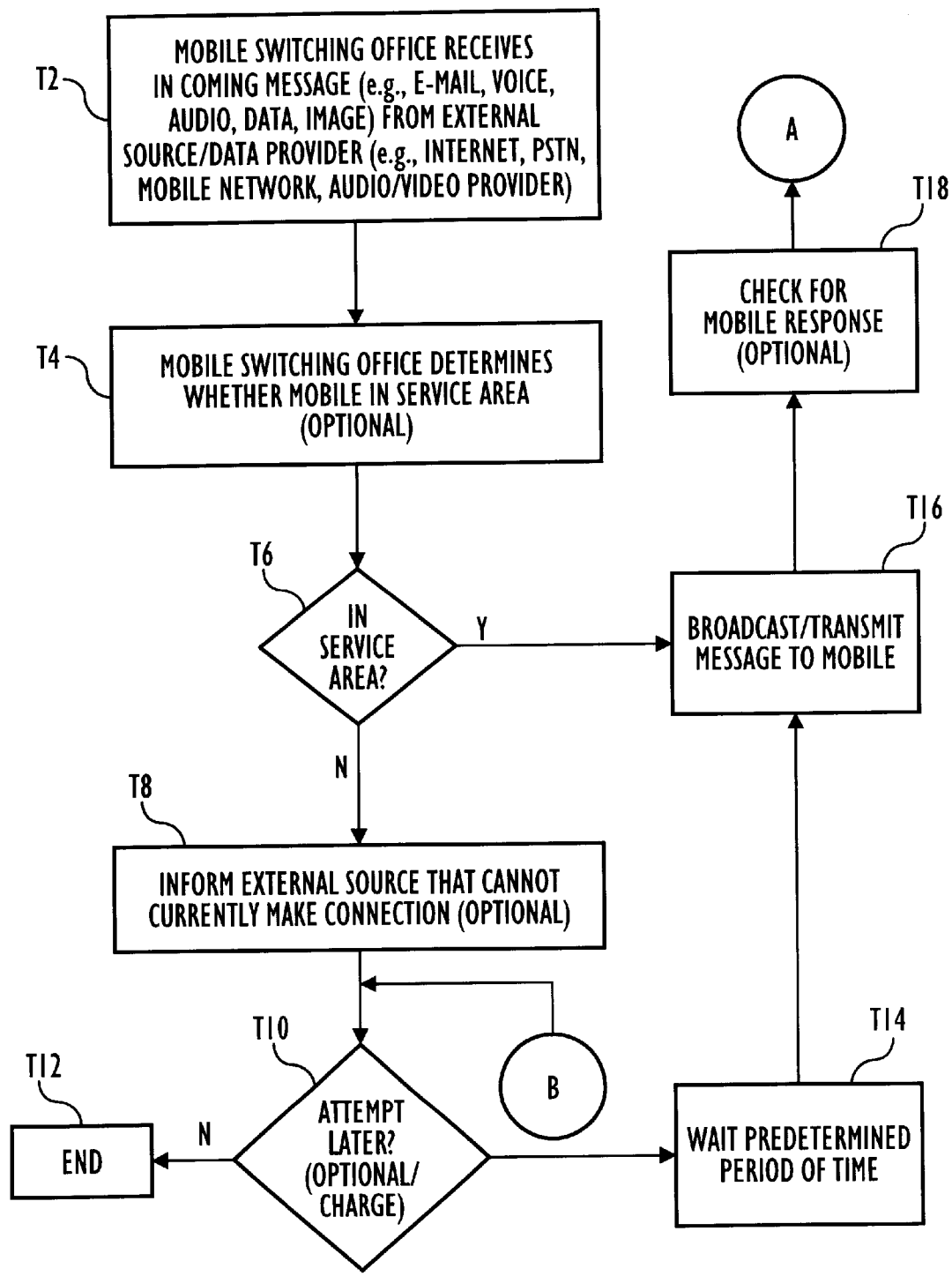
FIGS. 20–23 are flowcharts describing in detail the process flow of the mobile telephone receiving an incoming message comprising one or more of a voice message, a data message, an electronic mail message, an internet message, and/or and ADSL message for storage on the handset, and also for subsequent uploading to another destination.
Figure 21:
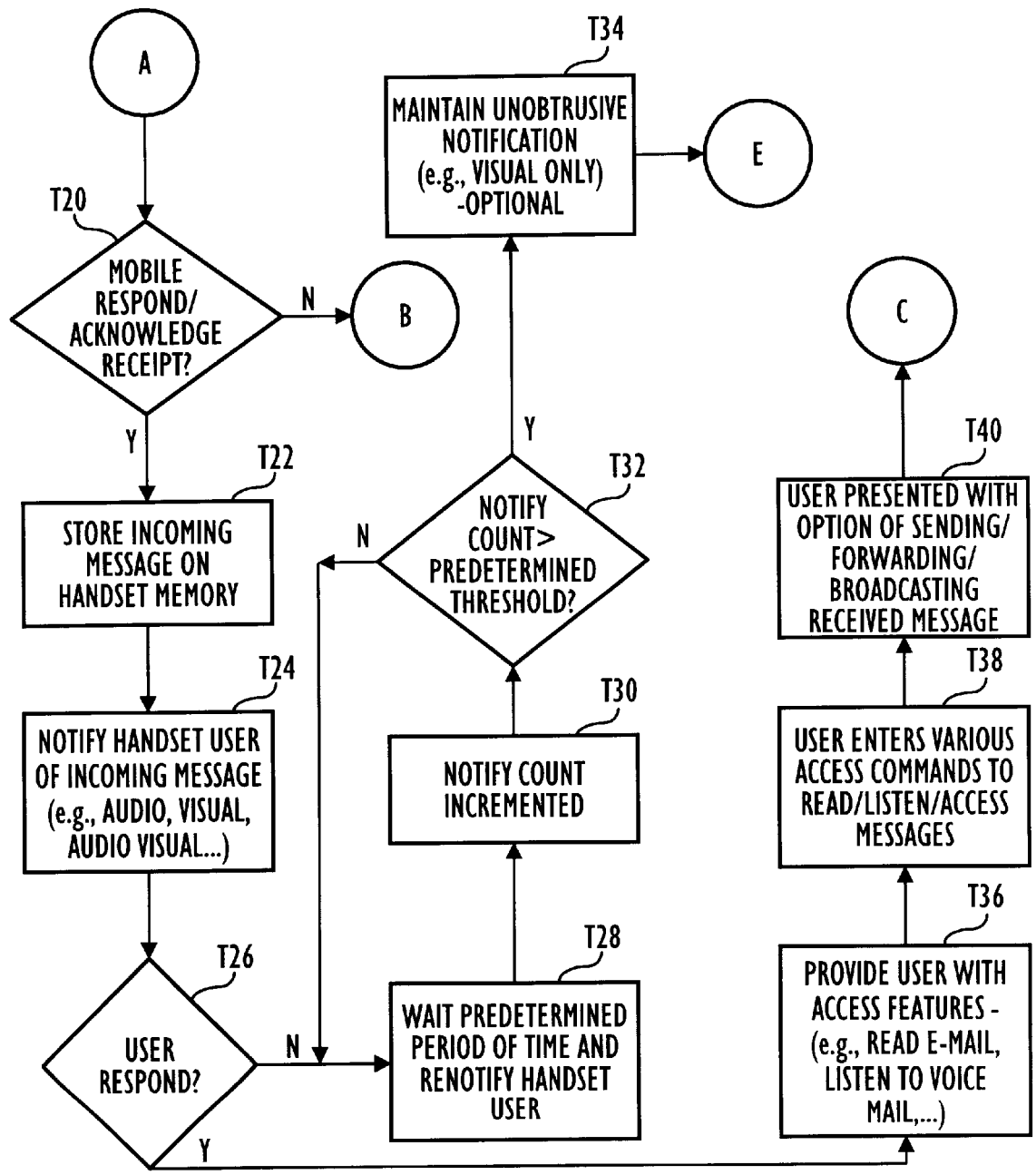
Figure 22:
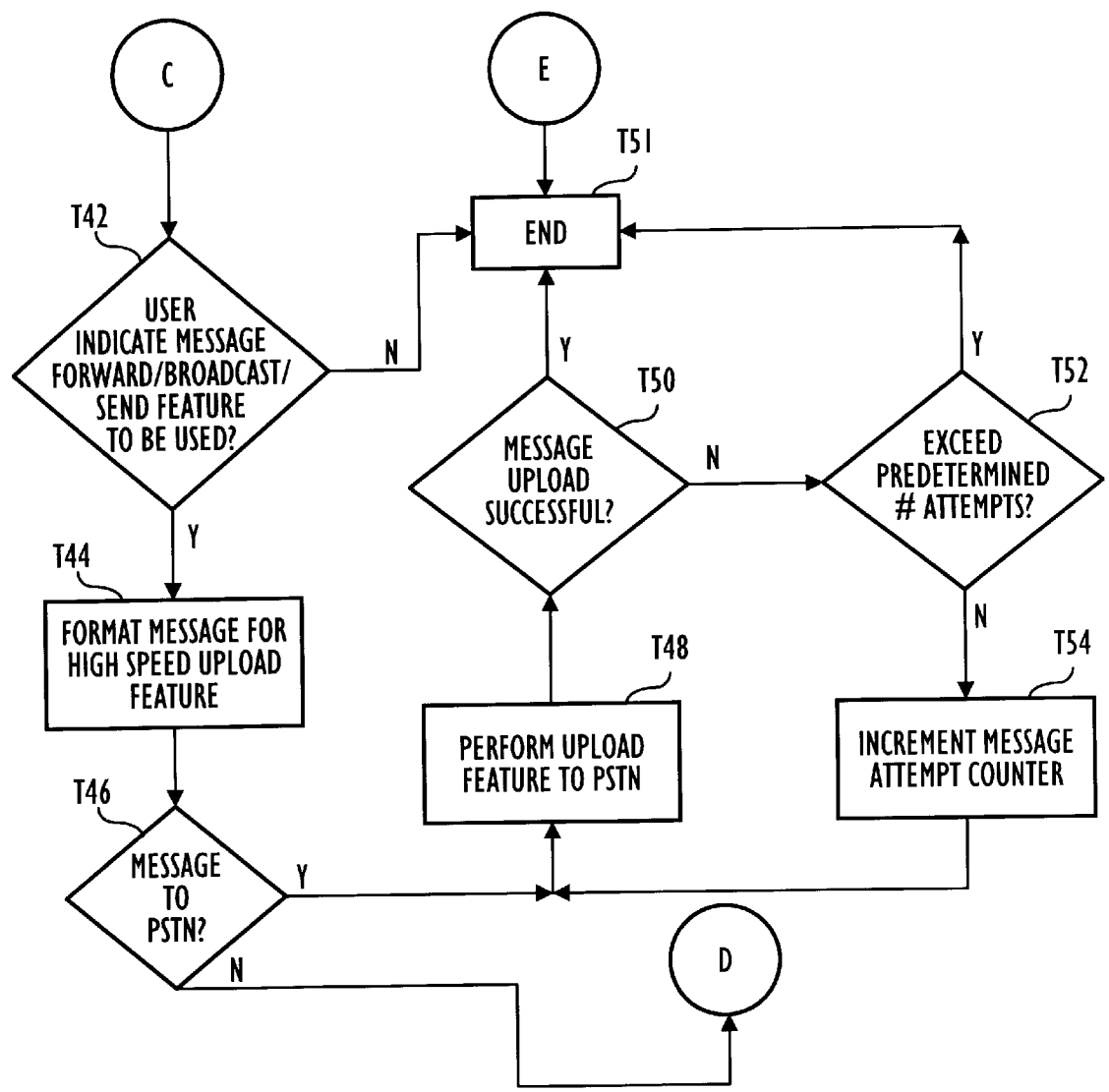
Figure 23:
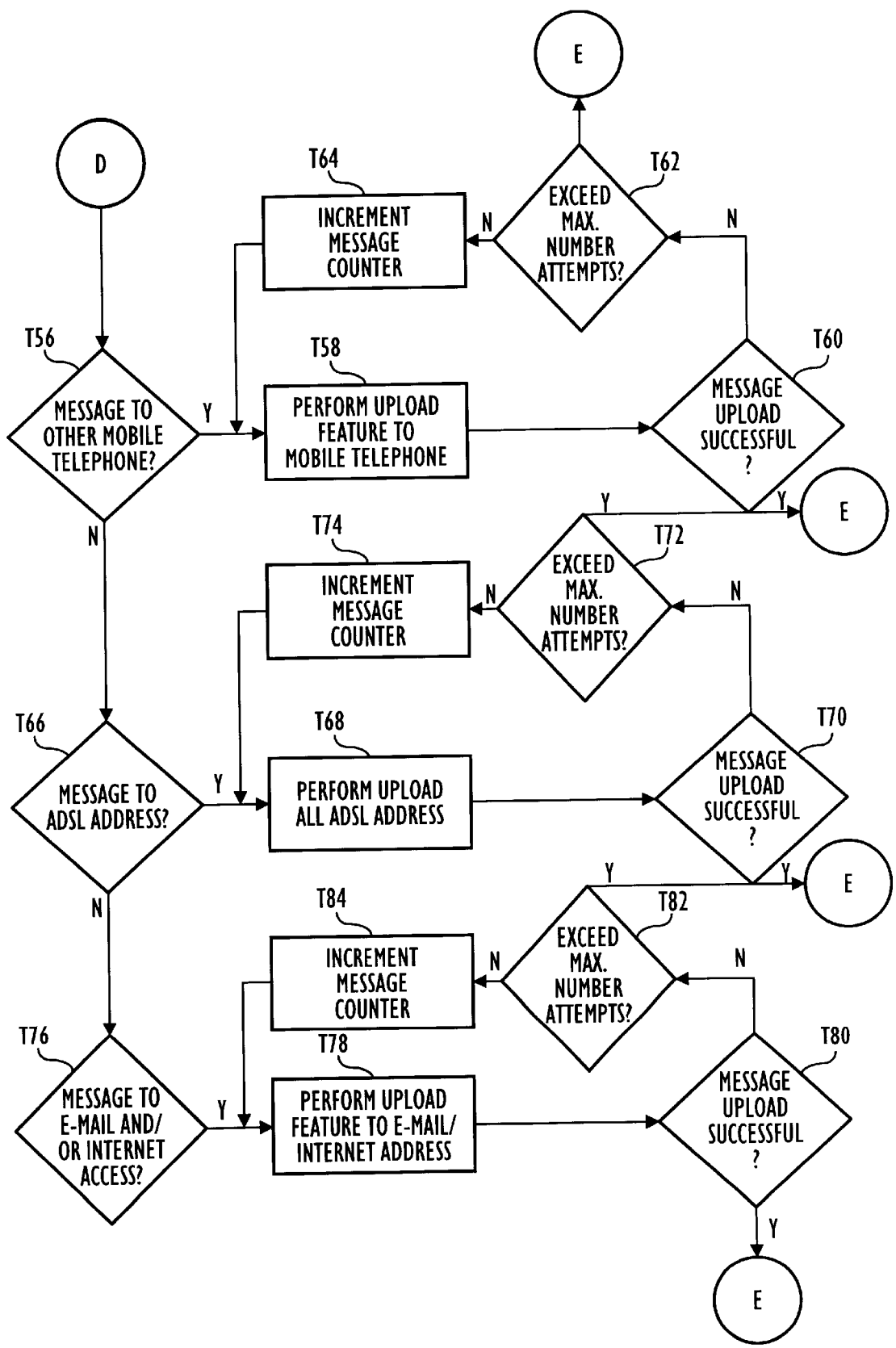

FIG. 19 is an illustration of the architecture of the combined internet, internet 2, POTS, and ADSL architecture. The internet 2 architecture 380 and ADSL architecture 354, 356 is combined with the standard internet architecture 400 with user networks 398, 402, and 404. Advantageously, mobile switching office 14 and/or 20 (asymmetric or symmetric as discussed above in detail) services or interfaces with MAPOD 2, 2a, 2b, 2c and/or 2d to transmit to, and/or receive from, data, voice mail messages, electronic mail messages, voice, audio and various other communications as discussed above in detail.

Advantageously, MAPOD 2, 2a, 2b, 2c and/or 2d is capable of receiving various different types of messages including, for example, messages transmitted from a customer ADSL 350, internet 400, internet 2 300, telephone 396, and the like. As illustrated in FIG. 19, internet access point 368 may advantageously be connected to telephone company network 370 to forward messages received from, or transmit messages to, internet related providers 400, 380. Further, telephone company network 370 is also advantageously connected to one or more ADSL access modules 356 described above. As described below in greater detail, the present invention may also advantageously be used in the context of uploading a data, voice mail and/or electronic mail message to be transmitted to another user, mobile and/or land based, either terrestrial, mobile user, internet based and/or ADSL based user.

FIGS. 20–23 are flowcharts describing in detail the process flow of the mobile telephone receiving an incoming message comprising one or more of a voice message, a data message, an electronic mail message, an internet message, and/or and ADSL message for storage on the handset, and also for subsequent uploading to another destination. In FIGS. 20–23, the mobile switching office receives an incoming message from an external source and/or data provider in Step T2. The incoming message may be, for example, an electronic mail message, a voice message, an audio message, a data message and/or an image message. The external source and/or data provider may be transmitted via, for example, the internet, public switched telephone network (PSTN), mobile network, audio and/or video provider, and the like.

The mobile switching office optionally determines whether the mobile is in the service area to be able to receive the transmission from the mobile switching office in Step T4. In Step T6, if the mobile is determined not to be in the service area, the mobile switching office optionally informs the external source or provider that it was unable to currently make the connection in Step T8. If the mobile switching office does not optionally make a later attempt in Step S10, then the process ends in Step T12.

If the mobile switching office does optionally make a later attempt, then the mobile switching office waits a predetermined period of time in Step T14, and broadcasts or transmits the message to the mobile in Step T16. If in Step T6 the mobile is determined to be in the service area, then the mobile switching office broadcasts or transmits the message to the mobile in Step T16.

The mobile switching office next optionally checks for the mobile response in Step T18. If the mobile switching office does not receive the response from the mobile in Step T20, then control of the process is reverted to Step T10. If the mobile switching office receives the response from the mobile in Step T20, then the mobile stores the incoming message in a memory on the handset in Step T22, and notifies the user of the mobile of the incoming message in Step T24, via, for example, audible, visual and/or vibration means. As discussed above, the incoming message may be, for example, an electronic mail message, a voice message, an audio message, a data message and/or an image message, or any other message.

In Step T26, the mobile telephone determines whether the user has responded, and if not, the mobile waits a predetermined period of time and optionally re-notifies the user of the mobile in Step T28. The notify count is optionally incremented in Step T30, and the mobile determines whether the notify count has exceeded a predetermined threshold in Step T32. If the notify count has not exceeded the predetermined threshold in Step T32, then control is reverted back to Step T28.

If the notify count has exceeded the predetermined threshold in Step T32, then the mobile optionally activates a less obtrusive notification process such as, for example, only vibration, a lower audible sound, and the like in Step T34. The process then ends in Step T51.

If in Step T26 the mobile telephone determines that the user has responded, the mobile provides the user with various message access features in Step T36. The various message access features include, for example, listening to the voice mail, e-mail, or other mail message; reading on the display of the mobile telephone one or more of the above messages; deleting the messages; saving the messages; date stamping the messages; and the like.

The user then enters or inputs one or more of the various access commands in Step T38 as described above. The user is then presented with the option of sending and/or forwarding and/or broadcasting the received messages in Step T40. The mobile then determines whether the user has indicated that the message is to be forwarded and/or broadcast and/or sent in Step T42. If the user indicates that the feature is not to be used in Step T42, then the process ends in Step T51.

If the user indicates that the feature is to be used in Step T42, then the mobile optionally formats and/or optionally encodes and/or optionally compresses the message for uploading to the mobile switching office in Step T44. In Step T46 it is determined by, for example, the mobile switching office, whether the message transmitted from the mobile is to be routed to a PSTN, and if so, the mobile switching office transmits the message from the mobile to the PSTN in Step T48.

The mobile switching office optionally determines, with the optional assistance of the PSTN, whether the message upload was successful in Step T50, and if so, the process ends in Step T51. If the message upload was not successful in Step T50, then the mobile switching office optionally determines whether there has been exceeded the predetermined number of attempts in Step T52, and if so, the process ends in Step T51.

If the mobile switching office optionally determines that there has not been exceeded the predetermined number of attempts in Step T52, then the message attempt counter in incremented in Step T54, and the process returns to Step T48.

If it is determined in Step T46 by, for example, the mobile switching office, that the message transmitted from the mobile is not to be routed to a PSTN, then it is determined by the mobile switching office whether the message is to be routed to another mobile in Step T56. If the message is to be routed to another mobile in Step T56, then the mobile switching office performs the upload operation to upload the message to another mobile telephone in Step T58. The mobile switching office optionally determines whether the upload was successful in Step T60, and if so, the process ends in Step T51.

If the mobile switching office optionally determines that the upload was not successful in Step T60, then the mobile switching office optionally determines whether the maximum number of attempts has been exceeded in Step T62, and if so, the process ends in Step T51. If the maximum number of attempts has not been exceeded in Step T62, then the message attempt counter is incremented in Step T64, and the process reverts to Step T58.

If it is determined in Step T56 by, for example, the mobile switching office, that the message transmitted from the mobile is not to be routed to another mobile, then it is determined by the mobile switching office whether the message is to be routed to an ADSL address in Step T66. If the message is to be routed to an ADSL address in Step T66, then the mobile switching office performs the upload operation to upload the message to an ADSL address in Step T68. The mobile switching office optionally determines whether the upload was successful in Step T70, and if so, the process ends in Step T51.

If the mobile switching office optionally determines that the upload was not successful in Step T70, then the mobile switching office optionally determines whether the maximum number of attempts has been exceeded in Step T72, and if so, the process ends in Step T51. If the maximum number of attempts has not been exceeded in Step T72, then the message attempt counter is incremented in Step T74, and the process reverts to Step T68.

If it is determined in Step T66 by, for example, the mobile switching office, that the message transmitted from the mobile is not to be routed to an ADSL address, then it is determined by the mobile switching office whether the message is to be routed to an e-mail/internet address in Step T76. If the message is to be routed to an e-mail/internet address in Step T76, then the mobile switching office performs the upload operation to upload the message to an e-mail/internet address in Step T78. The mobile switching office optionally determines whether the upload was successful in Step T80, and if so, the process ends in Step T51.

If the mobile switching office optionally determines that the upload was not successful in Step T80, then the mobile switching office optionally determines whether the maximum number of attempts has been exceeded in Step T82, and if so, the process ends in Step T51. If the maximum number of attempts has not been exceeded in Step T82, then the message attempt counter is incremented in Step 874, and the process reverts to Step T78.

As discussed above, the present invention may also advantageously be used in the context of uploading a data, voice mail and/or electronic mail message to be transmitted to another user, mobile and/or land based, either terrestrial, mobile user, internet based and/or ADSL based user. One example of modifying the present invention to provide an additional upload feature is in accordance with U.S. Pat. No. 5,121,126 to Claggett, incorporated herein by reference. In the Claggett patent, users of telepoint services seeking to locate a base station will be in need of some means of location of the base station to permit the telepoint subscriber to approach sufficiently close to complete a call. The relevant telephone or base station is provided with a radio beacon capable of broadcasting simple pulse signals or more complex signals containing a variety of information messages. In simplest terms the base station will broadcast a signal which, in one way or another, says "Here I am."

The users of the new system and service may be provided with a highly portable receiver capable of being personally carried in the pocket or purse in the form of a credit card device, electronic calculator, electronic telephone directory device, watch, wristwatch, wristwatch band attachment, telephone paging receiver, cellular receiver, mobile receiver, or in or on an automobile. The radio beacon is arranged to provide the receiver with some type of indication of the approximate direction and distance or a city address or highway map location. The service may be arranged so that the transmitter responds to prompts or inquiries from the receiver.

A public pay phone or pay station in the PSTN is located along the road (highway 193) with a beacon transmitter or transceiver. The transmitter transmits a beacon signal having a predetermined range. The pay station may be equipped to communicate with a telepoint transceiver which may be carried by a vehicle.

A subscriber carrying a receiver constructed according to the invention and adapted to receive the beacon signal. A paging transmitter which transmits a signal being detected by a paging receiver. The paging receiver is within the range of the beacon. Assuming that the customer carrying the receiver is desirous of making a pay phone call, the customer may turn the receiver on and the receiver will detect the beacon signal. The beacon signal may comprise a pulse which carries information as to the location of the pay phone. The customer using the receiver thereupon would have sufficient information to locate the nearest pay telephone for the purpose of completing his desired communication via the PSTN.

When the customer is in the location for completing the desired communication, the customer activates the mobile telephone for connection, and transmits the data, voice mail and/or electronic mail that is completely stored on the handset of the mobile telephone to the destination. Alternatively, the beacon feature need not be required, and the customer merely uploads the data, voice mail and/or electronic mail message to the destination(s) as required. A separate function/key may also be provided on the mobile telephone to initiate the transmitting and uploading of the messages stored on the handset as described above. The uploading function may be accomplished using standard queries/requests to the storage medium of the handset, and a standard voice synthesizer may optionally also be provided to convert the data, voice message, and/or electronic mail to an audible message for uploading onto another telephone message service, answering machine, service provider, and the like.

Thus, the present invention is not only able to store completely the data, voice mail and/or electronic mail messages on the handset, but is able to optionally supplement the messages received and forward the message and/or supplemental message to another destination. Thus, the present invention is able to efficiently manage and supplement messages received on a mobile telephone.

In accordance with another embodiment of the invention, an interactive data/message/electronic mail download system architecture receives data/message/electronic mail messages using a network-centric protocol such as Java from external systems, e.g., information service providers, using a mobile, wireless, digital and/or cellular telephone or transceiver system. The simplest architecture for Internet-based applications involves simple retrieval of hypertext markup language (HTML) documents from the World Wide Web (WWW). A user who interacts with a large, richly detailed Web site may well think of it as a "system" or an "application" because of its rich texture of text, graphics, multimedia, and links. But, the client-server developer knows that the Web page is generally passive, and has no executable logic. That is, the user generally retrieves nothing from a database when viewing a Web page, and, aside from a universal resource locator (URL) information, supplies no input.

A more common architecture today involves forms on a web page to acquire input from the user, display information, and provide the familiar combination of text fields, radio buttons, scroll bars and list boxes. The most significant part of such architectures is the clickable button on the data entry form that says, in effect, "Yes! Send it now!" When the user clicks on that button, the Web browser executes a "submit" command, causing all of the data that has been entered into the form data fields to be sent back to the Web server. "Submit" is one of several examples of a standard CGI command, which invokes a program to process the data.

This architecture begins to sound like a traditional application-development environment. But there are several differences between this scenario and the normal client server scenario. For example, Internet applications tend to be written in specialized languages like PERL and TCL. Only occasionally are programs written in C, and rarely (if ever) are they written in traditional client-server languages. In addition, the application programs tend to be stored on the same server as the HTML pages that contain the forms.

The Java paradigm creates a whole new ball game: Java allows developers to eliminate a lot of communications traffic between the client and the server, reduce server congestion, and eliminate much of the CCI communication with programs written in unfamiliar languages like PERL. The Java paradigm also introduces a new conundrum: If the application logic runs on the client, how to manage database interactions? Shared databases accessed by several concurrent users must be managed by a central server.

The Java paradigm also tends to ignore the presence of legacy applications. The Java paradigm is in the spirit of the Internet itself: open, free-wheeling, shareware kinds of applications will emerge and are likely to be quite popular. A development organization, however, needs something more organized and controlled. This does not make Java bad. On the contrary, even development organizations want to take advantage of distributed applets that can execute on a client platform. But a typical organization also wants an architecture that prevents access by the end user to other parts of the Web while an application is running. That is, typical organizations do not want end users to download some rogue applets that could cause some strange behavior.

On the other hand, the developer may wish to take advantage of applets and components on the Web to build an application; all of this could be stored within the organization's "database" of applications which could take the form of a private Web site. This ability to build applets is discussed below in detail.

Java's rapid acceptance in software engineering is due to its many strengths. The language's premise is that a computer can be described as having various basis capabilities—user interface, input, memory, and so on—whose functions are well known, even if the details differ from system to system. Because it embodies this concept, called a virtual machine, Java need not know a subsystem's particulars to be able to work with it.

All this makes programmers more productive. They can write and maintain a single version of an application, since an application written in Java will suit any Java—capable system regardless of its operating system. And they will work faster—writing code in Java can be as much as twice as easy as using the popular object-oriented C++. And since Java itself was designed from the beginning as an object-oriented language, the resulting code is more reusable, which increases its quality. JavaBeans, created by Sun subsidiary JavaSoft, for example, defines a standard application program interface for Java that makes it much easier to reuse.

Java is an object-oriented programming language with syntax similar to C and C++, only simpler. Because Java is an interpreted language, the typical C or C++ compile-link-load-test-debug cycle is reduced. Java development environments actually let the entire software-development life cycle take place within a Web browser.

Java applications are also arguably more robust than corresponding C or C++ applications, because the Java runtime system manages all memory. The same features that provide robustness also provide safety. Users are assured that applications are safe, even if downloaded over the Internet, because the Java runtime system has security mechanisms that protect against tampering. Finally, applications with concurrent threads run faster because Java has built-in support for multithreading.

None of these are the primary reason there is so much interest in Java. Rather, the main attraction is the fact that Java applications are completely portable. Write your code once and you never need to port or even recompile it. Rather than producing machine-specific instructions, the java compiler produces vendor-neutral bytecode. The Java runtime environment, or virtual machine, then translates the bytecode into actual machine-specific instructions. The Java virtual machine described below is installed on the user's machine, either as part of a Web browser or as part of the underlying operating system.

Simplicity is one of the overriding design goals of Java. Many of C++'s more complicated features-such as pointers, multiple inheritance, overloaded operators, typedefs, and #define- have been removed. Java is thus instantly familiar to any C or C++ programmer. Consider the classic "Hello World" program. Here's a Hello World program implemented in Java:

```
class HelloWorld {
  static public void main (String
      args [])
      System.out.println ("Hello Java world!");
  }
}
```

Like most object-oriented programs, all variables and functionality in a Java program are contained within objects, and objects are defined via classes. Unlike traditional structured languages, there are no stand-alone functions or subroutines. A class contains both variables (data structures) and the methods (functions) that operate on these variables.

The HelloWorld class contains a single method called main. The main method makes use of the System class by calling the printin method of the out object. The out object is an object in the System class that deals with output operations.

Figure 24:
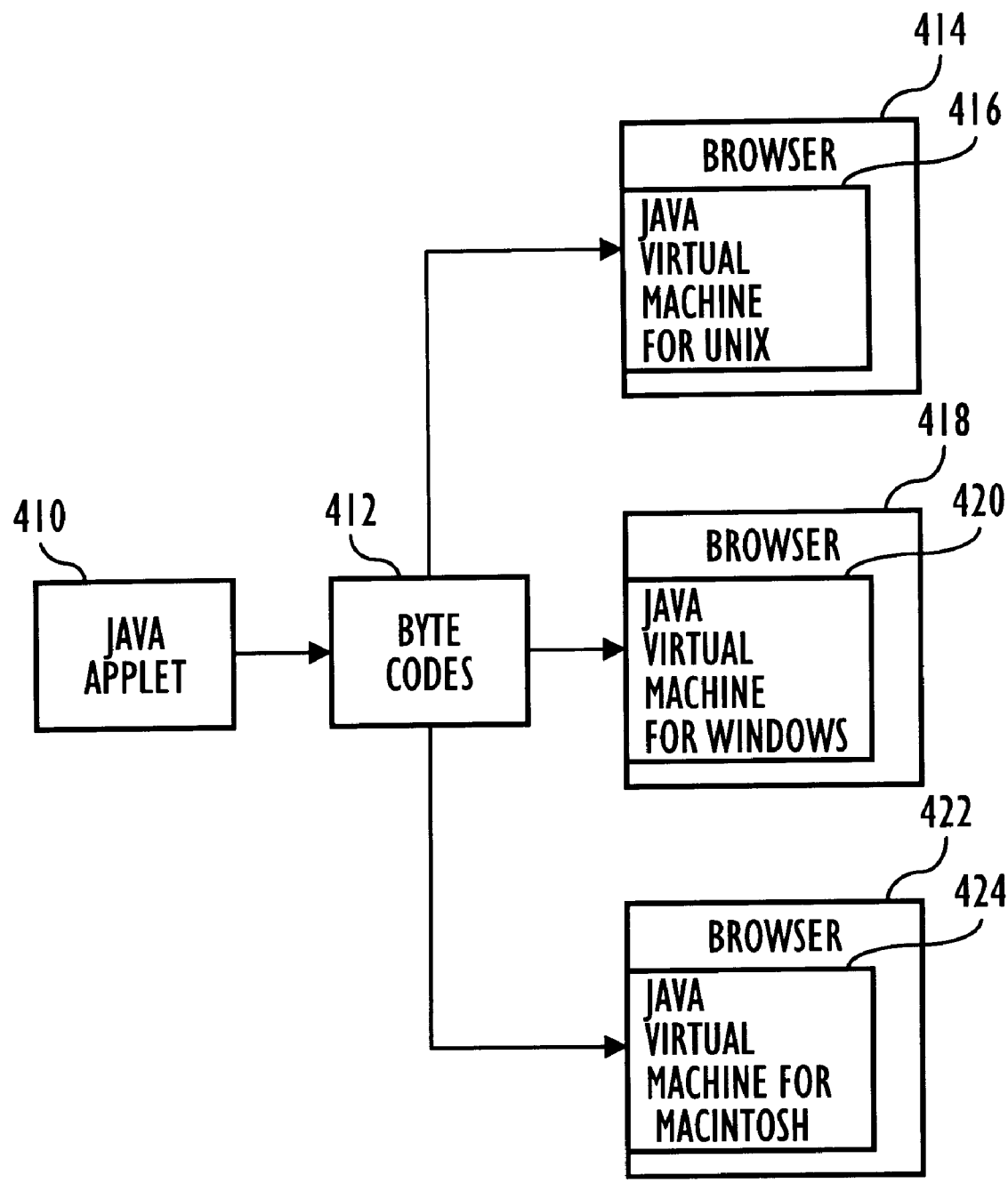
FIG. 24 is an illustration of the software implementation architecture for the Java language.

FIG. 24 is an illustration of the software implementation architecture for the Java language. As illustrated in FIG. 24, programs or applets 410 written in Java are compiled to an intermediary form called a byte code 412, and this byte code 412 is translated by a Java interpreter, e.g., 416, 420, 424, also called a virtual machine, into code that is used by the Web browser, e.g., 414, 418, 422, to perform system functions. While the interpreted code does run fairly fast, the interpreter 416, 420, 424 must be designed to run on a particular machine, and the browser 414, 418, 422 must be tailored to a specific machine.

So, even though Java was initially heralded as a secure language—that is, it would not allow programs to do to a system what the system's owner did not want done—experience has shown that this is not always the case. Microsoft is using these shortcomings to open the doors of those who want to use Java with the standard Active X protocol approach as illustrated in FIG. 25.

Figure 25:
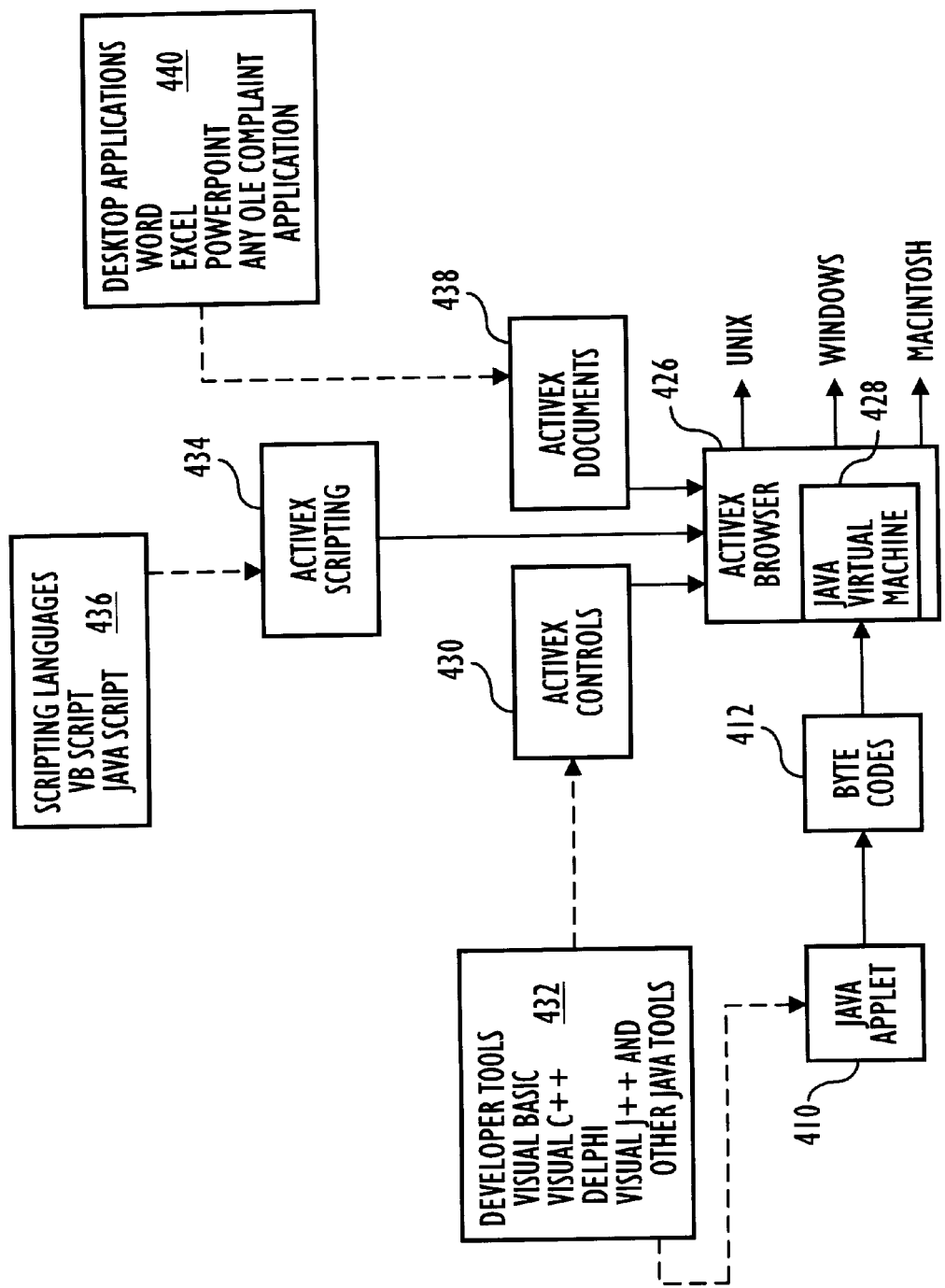
FIG. 25 is an illustration of an open architecture software implementation architecture for the Java language using the standard Active X protocol approach.

As illustrated in FIG. 25, when surrounded with an ActiveX-based browser 426, the Java interpreter 428 need not be specific to a particular system to translate Byte codes 412 compiled via Java applet 410. As the latest implementation of Microsoft's OLE technology, ActiveX is compatible with other object-oriented/scripting tools 436, via ActiveX scripting 434, developed by Microsoft, and therefore, lets programmers use tools with which they are already familiar.

ActiveX will work with existing popular applications 440, such as Word and Excel, via ActiveX documents 438, so that it has an installed base that it can leverage to gain quick acceptance. And having created several popular visual programming environments 432, such as Visual Basic and Visual C++, via ActiveX controls 430, Microsoft was well qualified to create Visual J++, a visual programming tool that produces Java code.

So, in a respectably short time, Microsoft has countered the lead held by Java's developers. The battle for Java will be played out quickly this year, and Microsoft will be hard to beat. If it succeeds it will once again have won the top position in the world of software.

Figure 26:
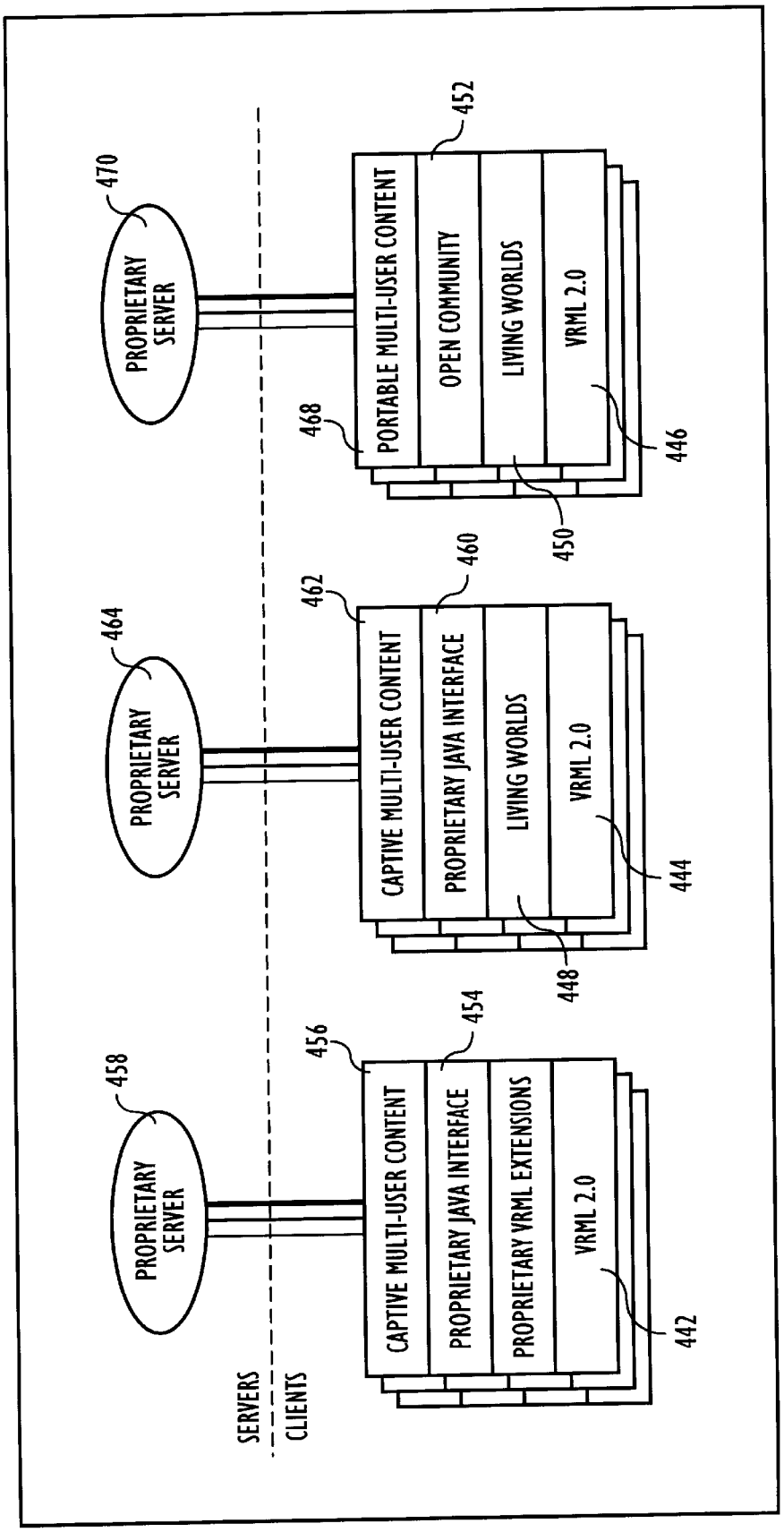
FIG. 26 is an illustration of conceptual framework for the virtual reality modeling language (VRML)

The next step in Web programming revolves around virtual reality and is a whole new way for people to interact. The basis for contriving three-dimensional environments on the Web is the virtual reality modeling language (VRML) illustrated conceptually in FIG. 26. In the improved form, VRML 2.0, e.g., 442, 444, 446 the language can insert new types of time-dependent content—audio, animation, and other types of streamed data—into 3-D environments.

The latest additions to the language adds features that will coordinate the position and status of shared objects and avatars—cyberspace stand-ins for actual people. The Living Worlds standard 448, 450 also deals with non-VRML elements and interactions among objects. With its aid programmers will be able to identify and integrate run-time interaction capabilities that are implemented outside VRML and its scripts, e.g., 454–470, to effect information exchange between objects in 3-D environment, and to define the rules and the roles for interaction. The standard will also handle some system security issues. The upshot will be to give avatars greater freedom to both share and interact in a virtual reality environment.

With another standard called Open Community 452, the 3-D worlds themselves will be able to interact and individuals will readily travel between those worlds.

Java Virtual Machine

The Java virtual machine is a software emulation of an idealistic hardware architecture of rexecuting Java bytecodes. A Java instruction consists of a one-byte opcode specifying the operation to be performed and zero or more operands supplying parameters used by the operation. The inner loop of the Java virtual machine looks like:

```
do {
    fetch an opcode byte
    execute an action depending on the value of the
opcode
} while (there is more to do);
```

The specification of the virtual machine architecture includes a basic set of supported data types but does not require any particular internal structure for objects. The virtual machine implementation treats an object reference as a handle with a pair of pointers, one to the object's method tale and the other to the data allocated by the object. Another implementation technique uses in-line caching rather than method table dispatch for implementing objects. The use of pointers in the Java virtual machine, which is written in C and assembler, is not inconsistent with Java's security model and Java's lack of pointers at the language level. There is no way to access virtual machine pointed directly either from Java source code or from compiled Java bytecode.

The Java virtual machine executes Java by bytecodes, much like a simple RISC microprocessor. A program counter keeps track of the address of the currently executing bytecode. While Java supports multithreading through its built-in threads library, the virtual machine executes only a single Java method at a time. This makes sense, since multithreading is a software construct and is not dependent on specific hardware(or virtual hardware) support. Besides the program counter, the virtual machine contains additional registers containing information associated with the currently executing method, including:

stack manipulation (loading, storing, moving)
array management,
arithmetic (integer and floating point),
logical,
control transfer,
method invocation and return,
exception handling, and
monitors (used to implement locking mechanisms and provide exclusive access).

This stack organization was selected because it is easy to emulate efficiently on machines with limited number of registers, such as the Intel 486.

Java Features

Like C, Java contains common numeric data types such as short, int, long, float, and double. Unlike some implementations of C, however, Java data types are independent of the underlying hardware and operating system. For example, an int data type is always 32 bits, regardless of whether the Java code is executing on a 32 bit or a 64-bit CPU. Other departures from C's primitive data types include the use of a true character type based on 16-bit Unicode characters and the implementation of a true Boolean data type.

In contrast to C, Java arrays are true objects. This implies that all arrays have a length associated with them and are bounds checked both at compile and runtime. In addition to its resemblance to C/C++, Java incorporates many features found in other modern programming languages, such as garbage collection and dynamic linking (Lisp) interfaces (Objective-C), packages (Modula), concurrence (Mesa), and exceptions (Modula-3). Some of these advanced features are described below.

The Java software platform contains a core set of application programming interfaces required in all Java implementations, along with a extended set of APIs covering a much broader set of functionality. Java includes class libraries for five APIs:

Java.lang: the basic language types, always imported into any compilation unit. This includes the declarations of Object and Class, as well as threads, exceptions, and a variety of other fundamental types.

Java.io: file and stream I/O. This is the rough equivalent of the standard I/O. This is the rough equivalent of the standard I/O library available on most Unix platforms.

Java.net: network I/O. This library provides support for HTTP, FTP, telnet, sockets, and other networking protocols.

Java.util: container and utility classes. This library includes classes such as date, time, hashtable, and stack.

Java.awt: the Abstract Windowing Toolkit. This library provides an abstract layer with classes such as buttons, scrollbars, fonts, colors, and event. This library is used by developers to build graphical user interfaces that execute across X Windows, Microsoft Windows, and Mac desktops.

Java2D: a comprehensive 2D-rendering API, similar to Postscript and developed in conjunction with Adobe.

Java3D: a 3D-programming model similar to, although a higher level than, Silicon Graphics' OpenGL.

JavaTel: a telephony API.

JavaAnim: a 2D-animation API for video games and similar applications.

JavaMedia: an API for time-critical audio, video, and data.

JavaShare: shared whiteboard and other collaborative applications.

JavaManagement: for network and systems management.

JavaEC: for electronic commerce.

JavaSecurity: for encryption and authentication.

Java and the Web

Early users of Java focused on applets, or mini-applications, downloaded as part of a Web page. To understand how this works, the components in a Web page containing a java applet are to be examined. The Web consists of browsers and servers connected over TCP/IP networks. When a browser is instructed to fetch a particular URL, it starts by formatting a request to get the specified resource from the specified host. The typical home page returned to the browser is formatted using Hypertext Markup Language (HTML). While HTML does not contain any native graphics formats, many home pages include graphics by using the img tag. When a browser encounters an img tag, it sends another request to the server to download the named image.

In the same fashion, when a Java-enabled browser encounters an applet tag, it sends another request to the server to download the named Java applet. The Java code for a simple applet that draws a sine wave is illustrated below:

```
import java.awt.*;
import java.applet.*;
public class Wave extends Applet
{ int n = 1
```

```
        public void paint (Graphics g)
        { double y=0.0. oy=0.0;
            for (int x=0; x < size ( ).width; oy=y, y=0, x++)
            { for (int j=o; j<n; j++)
                y += Math.sin((2 * j+1) * x / 15.0)/(2*j+1);
                y = 0.47 * y + 0.5;
                if (x<0) g.drawLine (x, (int) (oy*size( ).
height).
                x+1, (int) (y*size( ).height));
            }
        }
        public boolean mouseDown (java.awt.Event evt, int
x, int y)
            { n = n < 15 ? n+1 : 1; repaint ( ); return true;
}
```

After compiling the file Wave.java, the compiled version for embedding a Java applet in a Web page is shown below:

```
<html>
This simple applet example draws a sine wave.
<hr>
<applet codebase="classes"
    code="Wave.class"
    width=600 height=100>
</applet>
</html>
```

Java applets and browser plug-ins are both ways to add new functionality to browsers that support them. There are major differences, however, between the two technologies. For starters, Java applets are automatically downloaded to a Java-enabled browser whenever you visit a Web page containing them. To take advantage of a Web page that uses a "plug-in" application, you must first install the plug-in and configure it to work with your browser. Secondly, since a plug-in is compliled code, it is inherently not cross-platform or standard. For instance, there is no standard way for a bar graph plug-in from vendor X to send its output to a spreadsheet plug-in from vendor Y on the same Web page. One of Java's strengths is that it can be easily extended to handle as-yet unspecified file formats. When the browser encounters an unknown resource, it simply requests that the appropriate protocol handler from the server.

Application Safety

The Java compiler and runtime system impose four security layers within the application to keep programmers from creating subversive code.

Layer 1: Language and Compiler. The Java compiler's first line of defense is memory allocation, or lack thereof. Traditional C and C++ compilers make memory allocation decisions at compile time. Compile-time memory allocation provides a wealth of information to potential hackers. In Java, memory allocation and layout decisions are deferred to runtime, so having access to Java source code does not provide a hacker any information that could be used maliciously.

The lack of early memory allocation is even more helpful, however, because Java does not use pointers. All memory references are via symbolic handles, which are resolved to real memory addresses at runtime. it is thus impossible to infer the physical memory layout of a Java class by referring to its declaration. Besides the security benefits obtained by removing pointers from the Java language, the lack of pointers also leads to fewer software bugs. Pointer-related errors are a major cause of bugs in C and C++ software.

Layer 2: Bytecode Verifier. Because Java code can potentially be loaded over an untrusted network, the Java environment must also take into account the possibility of hostile Java compilers. The Java runtime system does this by subjecting all code to a simple theorem prover to verify that the code:

does not forge pointers to illegally manipulate objects outside the virtual machine,
 does not violate access restrictions,
 does access objects according to the correct type,
 does use correct types for all instruction parameters, and
 does use legal object field accesses according to their private, public, or protected definition.

These checks are possible because of the underlying Java language model, memory allocation scheme, and inclusion of runtime type information. A positive side effect of the bytecode verification process is that the resulting code can be run without worrying about further type checking and stack overflow checks. This means the Java interpreter can execute much faster than traditional interpretive systems.

Layer 3: Classloader. A Java applet may call a number of different classes, including built-in classes loaded from the local file system, classes from the same server, or classes loaded from elsewhere in the network. For further security, each imported class (one loaded from the network) executes within its own separate name space. There is a single name space for all classes loaded from the local file system, since the security of these can be locally maintained. When a class references another class, it first looks for it in the name space of classes loaded from the local file system (the built-in classes) and then in the name space of the referencing class. There is thus no way any Java code loaded over the network can "spoof" a built-in class or a class loaded from another network site. In a similar fashion, the built-in classes can never accidentally reference classes in imported name spaces.

Layer 4: Interface-Specific Security. Java's networking package provides interfaces to standard networking protocols such as HTTP, FTP, and so on. The networking package can be configured to provide different levels of security. These are:

1. Disallow all network accesses.
 2. Allow network accesses to only the hosts from which the code was imported.
 3. Allow network accesses only outside the firewall if the code came from outside.
 4. Allow all network accesses.

Together, these four layers of security provide a greater level of safety to Java code than is possible with other existing languages.

Java is already being used to liven Web pages of such diverse sites as Pepsi (http:/www.pepsi.com) and the White House (http://www.whitehouse.gov). Office automation software vendors such as Corel are rewriting their product suites, including WordPerfect, in Java. But beyond fancy animations and office productivity tools, Java is also suitable for large distributed systems development. For example, Dun and Bradstreet is selling an entire purchase requisition system developed in Java.

Many of today's large, enterprise-wide distributed systems include one or more relational databases such as those sold by Oracle, Sybase, and Informix. Web developers discovered early on the simplicity of using a browser as a front-end to a database.

Figure 27:
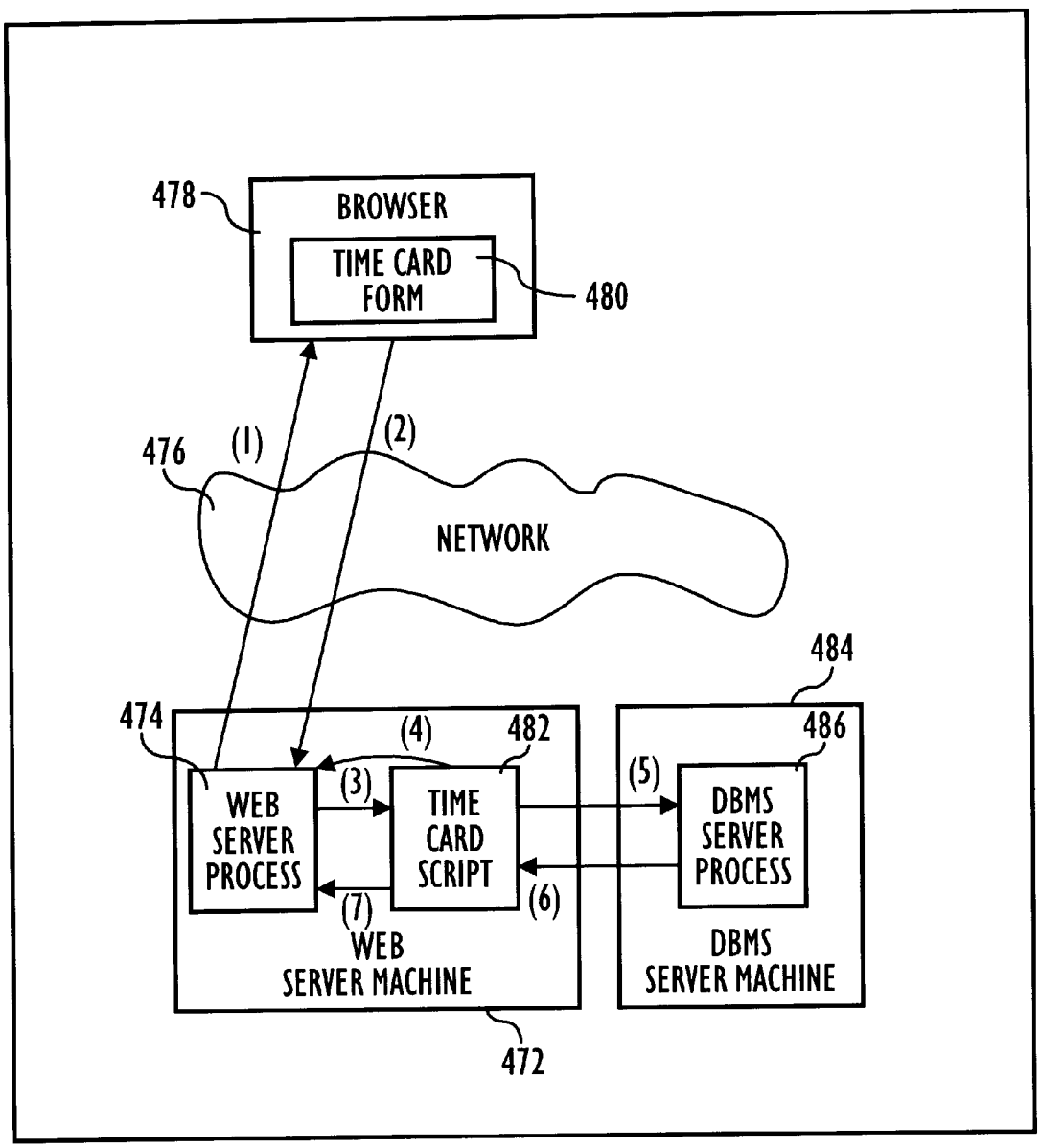
FIG. 27 illustrates a sample application using a browser as a front-end to a database.

FIG. 27 illustrates a sample application using a browser as a front-end to a database. The developer of an electronic time card system that uses a relational database as the underlying storage model would much rather use an HTML form as the data-entry screen than port the data-entry application to multiple platforms. An employee enters data into the HTML form such as employee number and hours worked, and clicks a "submit" button. The data is buffered and returned to the Web server, which then uses standard CGI to launch a separate application program that validates the data and inserts the records into the database.

As illustrated in FIG. 27, the Web server process 474 of the Web machine 472 transmits at (1) the time and card form via network 476 to browser 478. Browswer 478 loads the time card form 480 and transmits same to the Web server machine 472 and Web server process 474 and the user inputs data at (2). Web server process 474 submits the form to the time card script 482 at (3), and the script parses the form and returns any error messages to the Web server process 474 at (4). The script 482 then inputs the time card data to the standard DBMS server machine 484 and the DBMS server process 486 running therein at (5). The DBMS server machine 484 inputs the data and returns acknowledgement to the time card script 482 at (6). The time card script 482 returns acknowledgement to the Web server process 474 at (7).

This approach is considered to have three problems. The first problem is that HTML incorporates no field level validation capability. Form validation can only be done on the server side. This means simple data-entry errors cannot be corrected until the form is processed by the Web server, leading to nonresponsive user interfaces. The second problem is that this application can consume significant server capacity to do form validation, depending on the complexity of the form and the number of simultaneous users.

The third, and perhaps more serious, problem with this scenario is the potential for server bottlenecks. Database vendors have spent many years developing effective client-server communication; imposing a Web server in the middle adds significant overhead. To further simplify development of large distributed systems using Java, Sun has developed various middleware packages that connect Java to the rest of the enterprise. One of these middleware products is the Java DataBase connectivity specification (JDBC).

Figure 28:
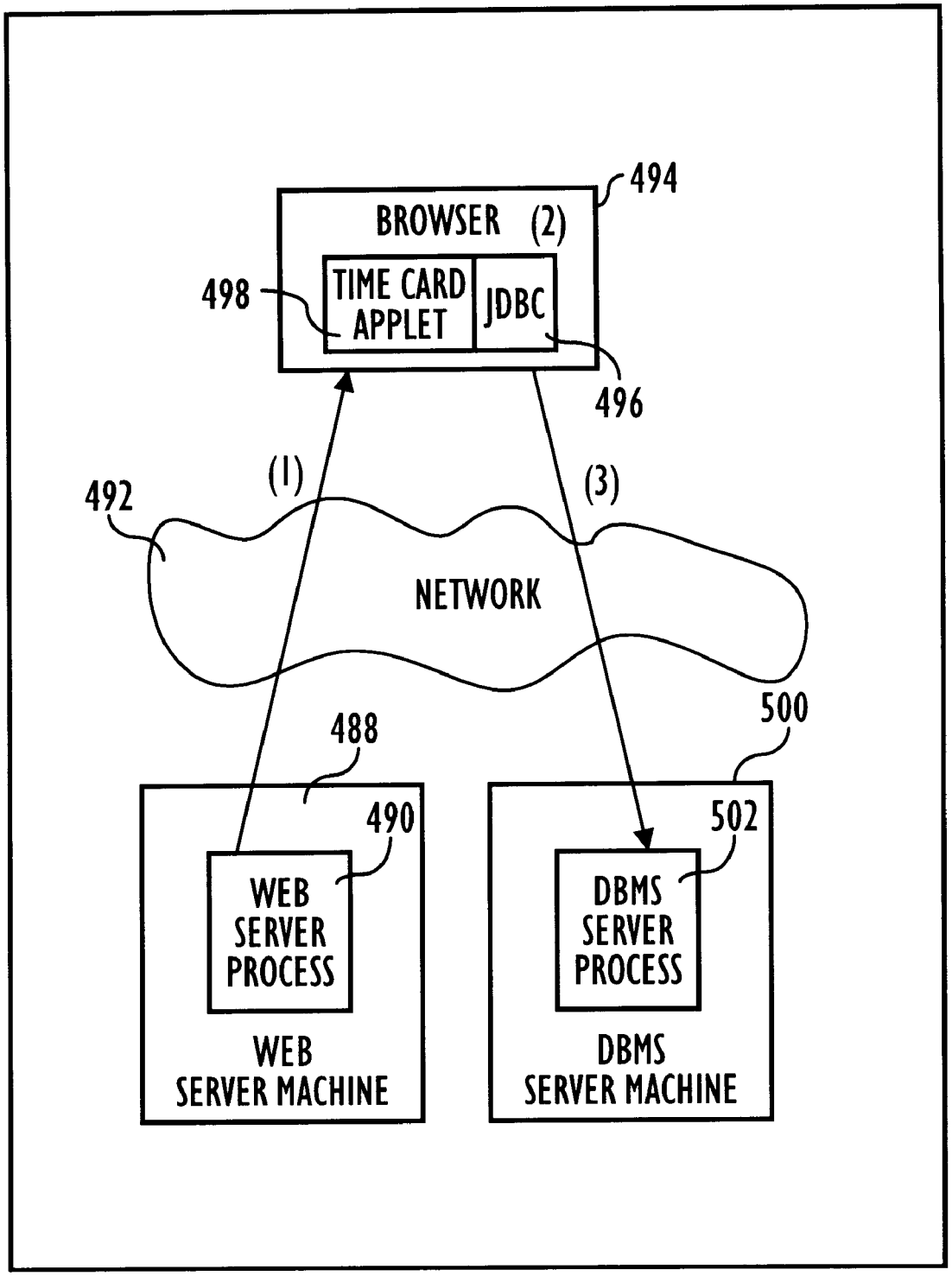
FIG. 28 shows how the Java JDBC Application Programmer Interface (API) allows the time card application to communicate directly with the DBMS, eliminating many of the problems of a traditional Web-based system.

FIG. 28 shows how the Java JDBC Application Programmer Interface (API) allows the time card application to communicate directly with the DBMS, eliminating many of the problems of a traditional Web-based system. In this case, the browser loads the time card applet, the user enters the data, and the applet validates the fields locally before sending the data directly to the DBMS via JDBC.

As illustrated in FIG. 28, the Web server process 490 of the Web machine 488 transmits at (1) the time and card form via network 492 to browser 494. Browser 494 loads the Java time card applet 498 and the user enters data, and the applet validates the form fields locally at (2). Data is then sent directly by JDBC 496 to the DBMS server machine 500 and the DBMS server process 502 via network 492 at (3).

Figure 29:
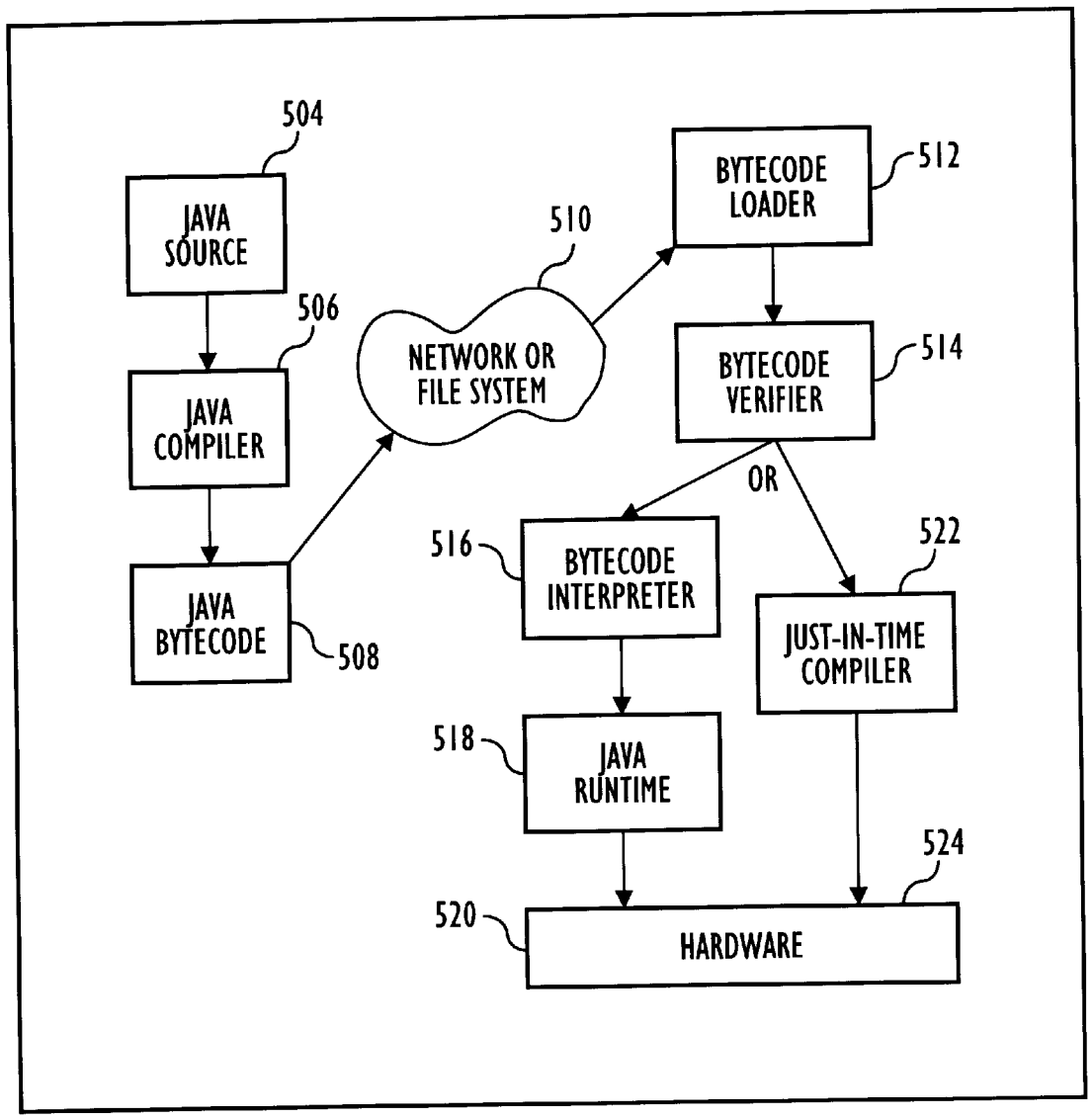
FIG. 29 is an illustration of the software execution of a Java applet for the Java language.
Figure 30:
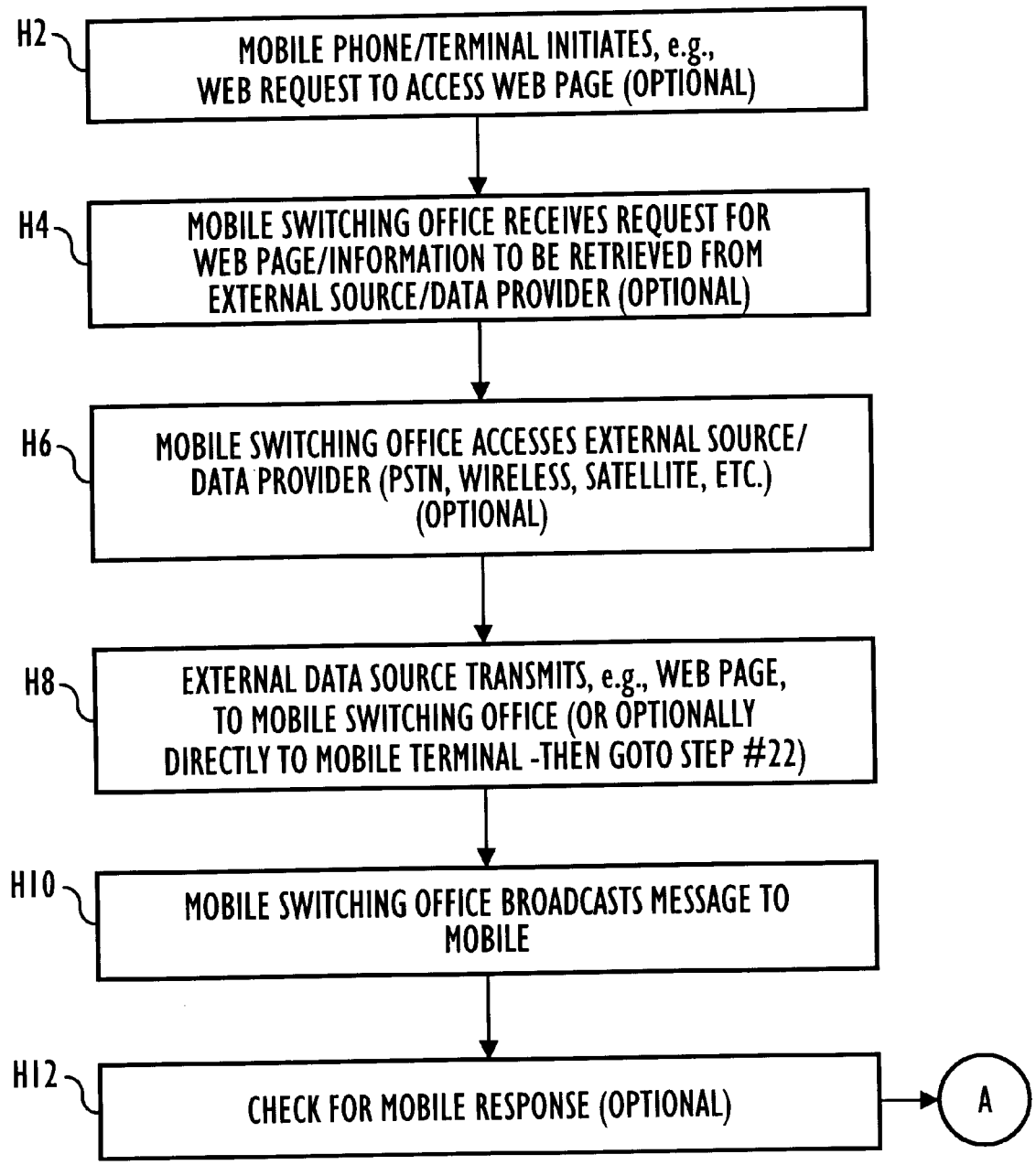
FIGS. 30–34 are flowcharts describing in detail the process flow of the mobile telephone interactively receiving information comprising one or more of data, a voice message, a data message, an electronic mail message, an internet message, and/or and ADSL message for storage on the handset of the wireless device, and also for optional subsequent uploading to another destination.
Figure 31:
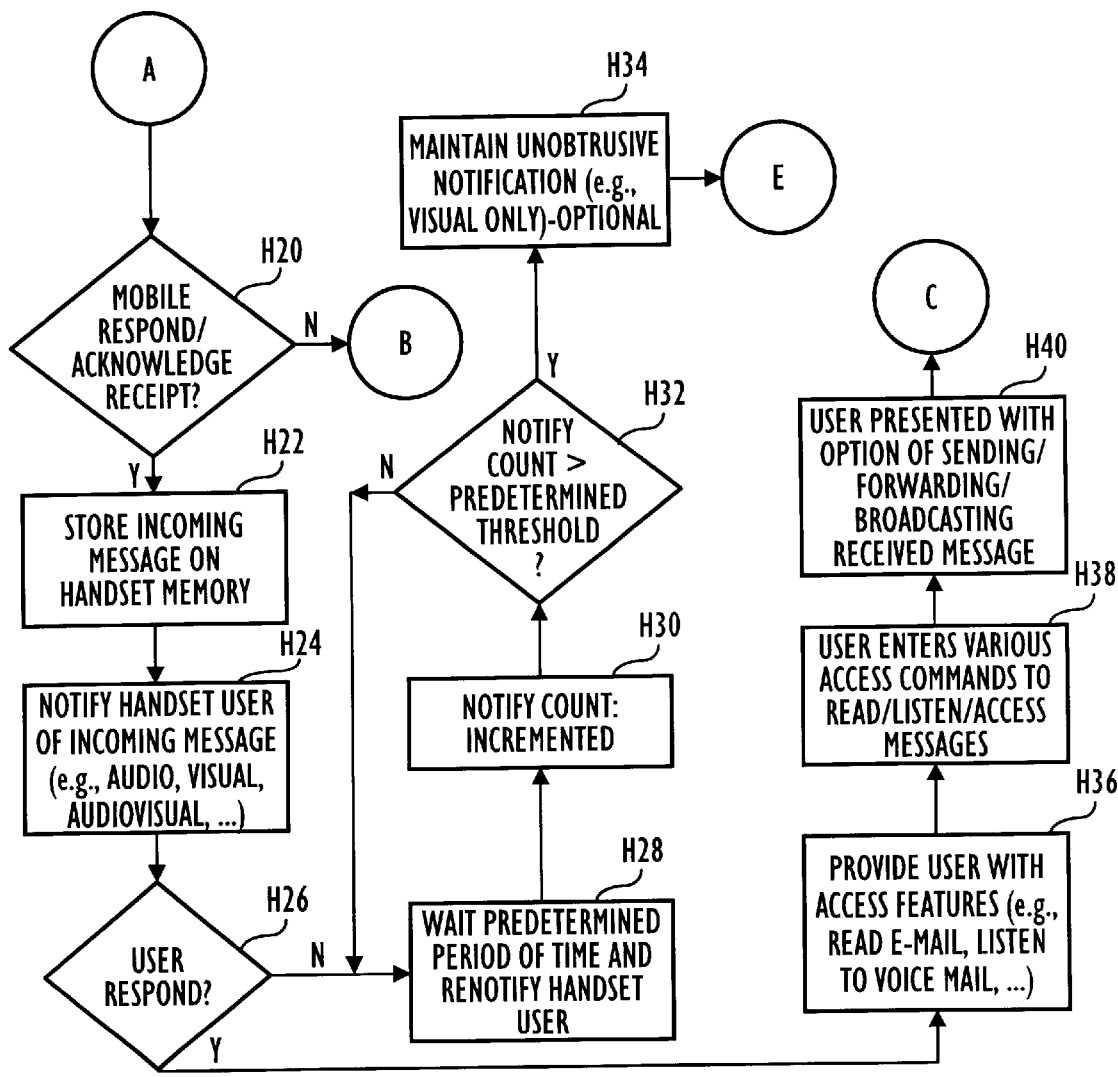
Figure 32:
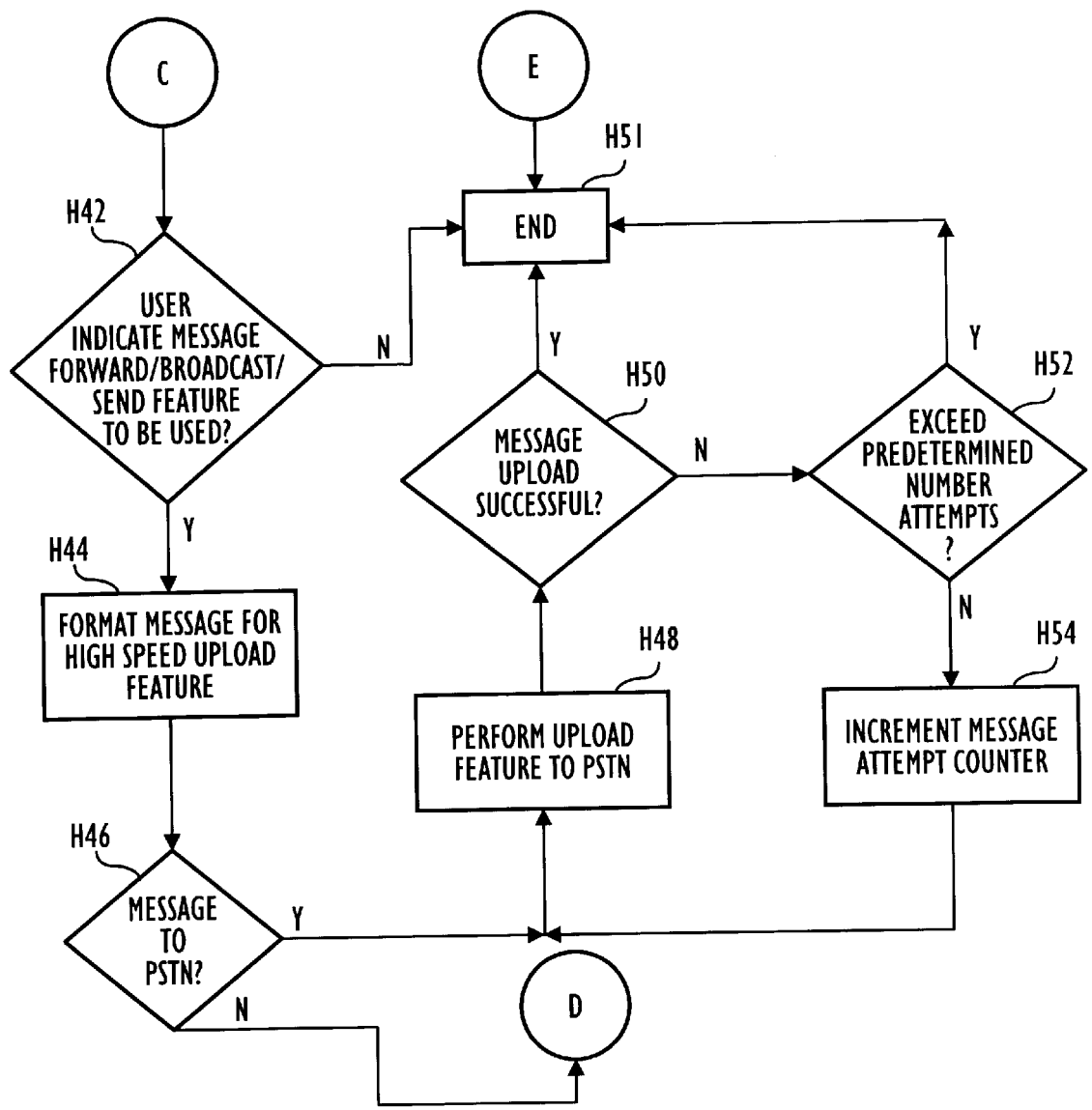
Figure 33:
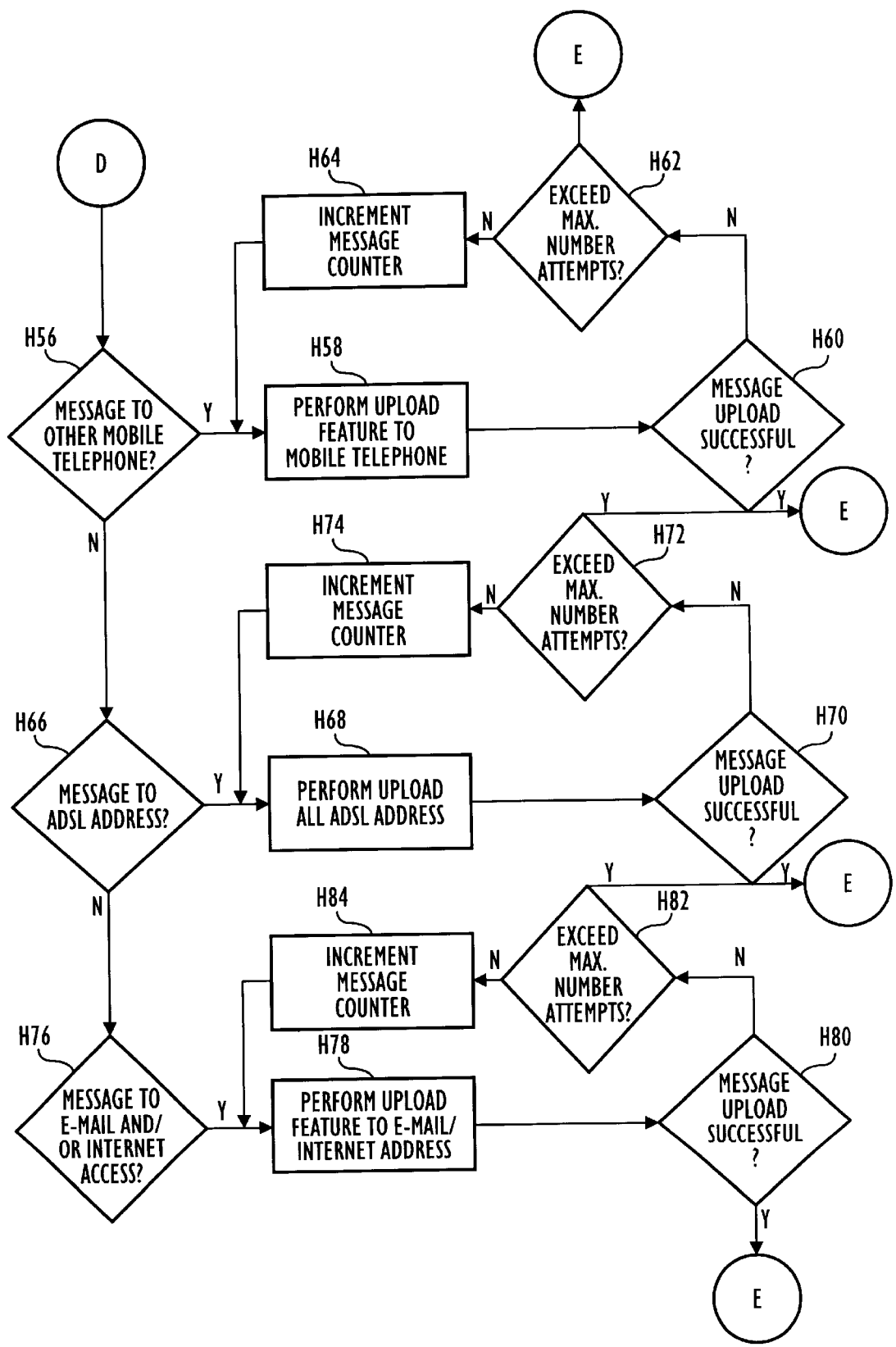
Figure 34:
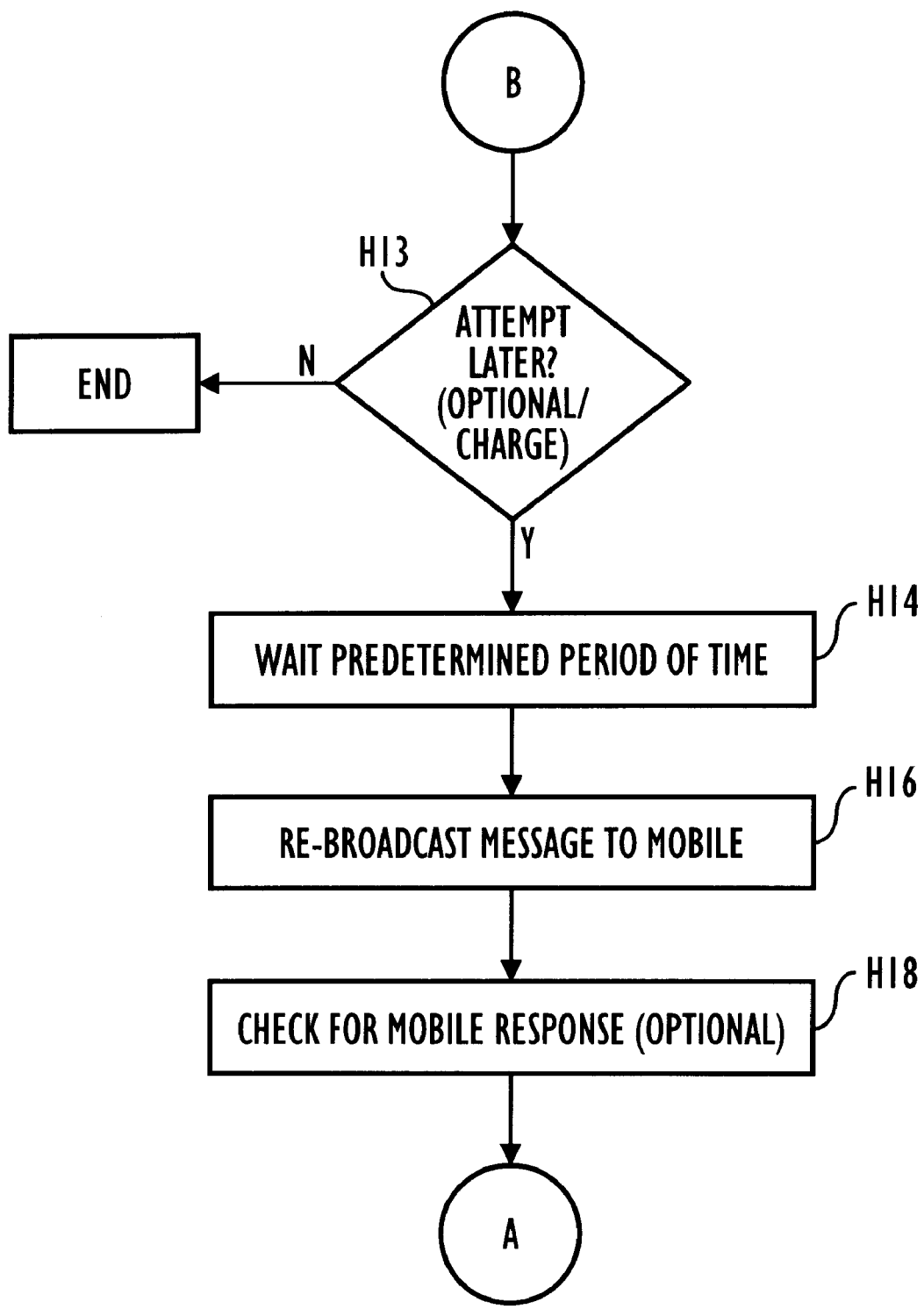

FIG. 29 is an illustration of the software execution of a Java applet for the Java language. In FIG. 29, Java source programs or applets 504 are compiled at 506 to an intermediary form called a bytecode or Java bytecode 508, and this byte code 508 is transmitted to Bytecode loader 512 via network 510 where it is loaded into the machine. The compiled applet is then verified by Bytecode verifier 514 that the Bytecode corresponds to Java code and does not contain any viruses.

The Bytecode is then translated or interpreted by Bytecode interpreter 516 into Java runtime code 518 which is then submitted to the hardware 520 for execution. Alternatively, once the Bytecode is verified, the verified Bytecode is transmitted to, for example, standard Just-in-time compiler 522 for compilation and the compiled Bytecode/applet is submitted to the hardware 520 for execution.

The above description of Java can also be found in the following publications, all of which are hereby incorporated by reference: "The Java Virtual Machine Specification," Technical Report, Sun Microsystems, Mountain View, Calif., 1995; http://java.sun.com; J. Gosling, "The Java Language Environment," White Paper, Sun Microsystems, Mountain View, Calif., 1995; http://java.sun.com; M. Hamilton, "Java and the Shift to Net-Centric Computing," IEEE COMPUTER pp.31–39 (August 1996); K. Srinivas, et al., "Java and Beyond: Executable Content," IEEE COMPUTER pp.49–52 (June 1997); E. Yourdon, "Java, the Web, and Software Development," IEEE COMPUTER pp.25–30 (August 1996); "Software Engineering," IEEE SPECTRUM pp.65–69 (January 1997).

FIGS. 30–34 are flowcharts describing in detail the process flow of the mobile telephone interactively receiving information comprising one or more of data, a voice message, a data message, an electronic mail message, an internet message, and/or and ADSL message for storage on the handset of the wireless device, and also for optional subsequent uploading to another destination.

In FIGS. 30–34, the mobile telephone (wireless, digital cellular, and the like) optionally initiates a request for data, such as interactive data, a web page, and the like in Step H2. The mobile switching office optionally receives the incoming message/request for information from the nobile terminal/telephone to be retrieved from an external data provider in Step H4. The initiating by the mobile terminal in Step H2 and receiving by the mobile switching office in Step H4 may be, as described, optional where the mobile user has a standing request to receive specific information on a predetermined time basis, e.g., a specific Web such as stock market every 15 minutes, and the mobile user might interactively respond to such information such as to sell or buy additional stocks.

The incoming message may be, for example, an electronic mail message, a voice message, an audio message, a data message and/or an image message. The external source and/or data provider may be transmitted via, for example, the internet, public switched telephone network (PSTN), mobile network, audio and/or video provider, server architecture, Web server architecture, and the like.

The mobile switching office optionally determines whether the mobile is in the service area to be able to receive the transmission from the mobile switching office generally only when the mobile terminal/telephone has a standing order to receive certain information from an external data source. The information that is to be received by the mobile terminal may be active utilizing, for example, the Java architecture, or non-interactive.

In Step H6, the mobile switching office optionally accesses the external data source or provider. The external data source may be one or more of a wireless data source, a satellite communication data source, a public switched telephone network (PSTN) and the like. The external data source transmits, for example, the requested information such as the Web page, to the mobile switching office or optionally directly to the mobile terminal. If the information is transmitted directly to the mobile terminal, then the process resumes at Step H22.

When the requested information, or information to be transmitted to the mobile terminal with a standing request is transmitted to the mobile switching office in Step H8, the mobile switching office broadcasts the message to the mobile in Step H10. The mobile switching office subsequently and optionally checks for the mobile response on Step H12. If the mobile switching office does not receive the response from the mobile in Step H20, then control of the process is described below. If the mobile switching office receives the response from the mobile in Step H20, then the mobile stores the incoming message, e.g., Web page, in a memory on the handset in Step H22, and notifies the user of the mobile of the incoming message in Step H24, via, for example, audible, visual and/or vibration means. As discussed above, the incoming message may be, for example, an electronic mail message, a voice message, an audio message, a data message, Web page and/or an image message, or any other message.

In Step H26, the mobile telephone determines whether the user has responded, and if not, the mobile waits a predetermined period of time and optionally re-notifies the user of the mobile in Step H28. The notify count is optionally incremented in Step H30, and the mobile determines whether the notify count has exceeded a predetermined threshold in Step H32. If the notify count has not exceeded the predetermined threshold in Step H32, then control is reverted back to Step H28.

If the notify count has exceeded the predetermined threshold in Step H32, then the mobile optionally activates a less obtrusive notification process such as, for example, only vibration, a lower audible sound, and the like in Step H34. The process then ends in Step H51.

If in Step H26 the mobile telephone determines that the user has responded, the mobile provides the user with various message access features in Step H36. The various message access features include, for example, listening to the voice mail, e-mail, or other mail message; reading on the display of the mobile telephone one or more of the above messages, Web pages, and the like; deleting the messages; saving the messages; date stamping the messages; and the like.

The user then enters or inputs one or more of the various access commands in Step H38 as described above. The user is then presented with the option of sending and/or forwarding and/or broadcasting the received messages in Step H40. The mobile then determines whether the user has indicated that the message is to be forwarded and/or broadcast and/or sent in Step H42. If the user indicates that the feature is not to be used in Step H42, then the process ends in Step H51.

If the user indicates that the feature is to be used in Step H42, then the mobile optionally formats and/or optionally encodes and/or optionally compresses the message for uploading to the mobile switching office in Step H44. In Step H46 it is determined by, for example, the mobile switching office, whether the message transmitted from the mobile is to be routed to a PSTN, and if so, the mobile switching office transmits the message from the mobile to the PSTN in Step H48.

The mobile switching office optionally determines, with the optional assistance of the PSTN, whether the message upload was successful in Step H50, and if so, the process ends in Step H51. If the message upload was not successful in Step H50, then the mobile switching office optionally determines whether there has been exceeded the predetermined number of attempts in Step H52, and if so, the process ends in Step H51.

If the mobile switching office optionally determines that there has not been exceeded the predetermined number of attempts in Step H52, then the message attempt counter in incremented in Step H54, and the process returns to Step H48.

If it is determined in Step H46 by, for example, the mobile switching office, that the message transmitted from the mobile is not to be routed to a PSTN, then it is determined by the mobile switching office whether the message is to be routed to another mobile in Step H56. If the message is to be routed to another mobile in Step H56, then the mobile switching office performs the upload operation to upload the message, including, for example, interactive information from the user such as a response to the Web page ("message"), to another mobile telephone in Step H58. The mobile switching office optionally determines whether the upload was successful in Step H60, and if so, the process ends in Step H51.

If the mobile switching office optionally determines that the upload was not successful in Step H60, then the mobile switching office optionally determines whether the maximum number of attempts has been exceeded in Step H62, and if so, the process ends in Step H51. If the maximum number of attempts has not been exceeded in Step H62, then the message attempt counter is incremented in Step H64, and the process reverts to Step H58.

If it is determined in Step H56 by, for example, the mobile switching office, that the message transmitted from the mobile is not to be routed to another mobile, then it is determined by the mobile switching office whether the message is to be routed to an ADSL address in Step H66. If the message is to be routed to an ADSL address in Step H66, then the mobile switching office performs the upload operation to upload the message to an ADSL address in Step H68. The mobile switching office optionally determines whether the upload was successful in Step H70, and if so, the process ends in Step H51.

If the mobile switching office optionally determines that the upload was not successful in Step H70, then the mobile switching office optionally determines whether the maximum number of attempts has been exceeded in Step H72, and if so, the process ends in Step H51. If the maximum number of attempts has not been exceeded in Step H72, then the message attempt counter is incremented in Step H74, and the process reverts to Step H68.

If it is determined in Step H66 by, for example, the mobile switching office, that the message transmitted from the mobile is not to be routed to an ADSL address, then it is determined by the mobile switching office whether the message is to be routed to an e-mail/internet address in Step H76. If the message is to be routed to an e-mail/internet address in Step H76, then the mobile switching office performs the upload operation to upload the message to an e-mail/internet address in Step H78. The mobile switching office optionally determines whether the upload was successful in Step H80, and if so, the process ends in Step H51.

If the mobile switching office optionally determines that the upload was not successful in Step H80, then the mobile switching office optionally determines whether the maximum number of attempts has been exceeded in Step H82, and if so, the process ends in Step H51. If the maximum number of attempts has not been exceeded in Step H82, then the message attempt counter is incremented in Step H74, and the process reverts to Step H78.

If the mobile switching office does not receive the response from the mobile in Step H20, then control of the process is reverted to Step H13. If the mobile switching office does not optionally make a later attempt in Step H13, then the process ends. If the mobile switching office does optionally make a later attempt, then the mobile switching office waits a predetermined period of time in Step H14, and re-broadcasts or re-transmits the message to the mobile in Step H16. If the mobile is determined to be in the service area, then the mobile switching office broadcasts or transmits the message to the mobile in Step H16. The mobile switching office next optionally checks for the mobile response in Step H18. The process then continues with Step H20.

As discussed above, the present invention may also advantageously be used in the context of uploading a data, voice mail and/or electronic mail message to be transmitted to another user, mobile and/or land based, either terrestrial, mobile user, internet based and/or ADSL based user. Thus, the present invention is not only able to store completely the data, voice mail and/or electronic mail messages on the handset, but is able to optionally supplement the messages received and forward the message and/or supplemental message to another destination. Thus, the present invention is able to efficiently manage and supplement messages received on a mobile telephone.

GLOSSARY OF JAVA APPLICATION PROGRAMMER INTERFACES (APIs)

Java Enterprise

Support for Java applications to interact with data and applications that may be distributed across the entire enterprise. Currently comprises three APIs; Jave IDL (Interface Definition Language), Java RMI and JND1.

Java Database Connectivity (JDBC).

Provides classes that enable Java clients to interact with relational databases compliant with Microsoft's Open Database Connectivity. Includes facilities to open and close database connections, query metadata information, issues SQL statements, and get result sets and other database-related operations. The JDBC driver manager can support multiple ODBC drivers.

Java IDL

Provides a seamless way for Java clients and servers to interact with other CORBA-compliant services and clients. This provides a mechanism through which Java programs can interact with other services in a language-neutral manner.

Java RMI

Provides capabilities for writing distributed applications in Java. Java RMI is similar to the idea of remote procedure call, which is a popular way for building distributed applications. Adequate for building homogenous distributed applications written entirely in Java, but most environments are fairly heterogeneous and so a CORBA based solution may be more predominant.

Java Naming and Directory Interface (JNDI).

Provides mechanisms for Java programs to interact with heterogeneous enterprise-wide directory and naming services.

Java Security.

Provides a framework for writing secure Java programs that use authentication, digital signatures, encryption, and other cryptographic techniques.

Java Media

Facilitates the creation of Java programs that extensively use graphics and multimedia. Comprises Jave 2D, Jave Media, Java Management, Java Collaboration, Java Telephony, Java Speech, Java Animation, and Java 3D.

Fava Telephony (JTAPI)

A framework for achieving computer telephony integration. Provides mechanisms for accessing telephony functions from Java programs. A simple portable model that also facilitates access to existing telephony frameworks such as TAPI (telephony API) from Microsoft.

Java Speech

Provides mechanisms for integration of speech recognition, speechprocessing, text-to-speech conversion, and other speech-related functionality.

Java Management API (JMAPI)

Provides mechanisms to maintain and service enterprise-wide networks, systems, and other resources. Provides a framework for troubleshooting and maintaining hardware and software protocols across a network.

Java Commerce

Supports electronic-commerce applications. Currently comprises Java Wallet, which provides support for credit-card, debit-card and other electronic cash transactions in a secure fashion.

Java Embedded

Intended for small devices that cannot support the entire Java Core API. Designed to enable the creation and execution of Java applications on consumer electronic devices, microcontrollers, and so on.

Java Aglet Application Programming Interface (J-AAPI)

Supports the creation of aglets (agent-applet). Supports the notion of an Agent Transfer Protocol (to handle shipping and transferring aglets), object passing, autonomous asynchronous execution, and disconnected operations. J-APPI specification allows for interfacing aglets and the environment in which they are allowed to execute. J-APPI supports the creation of aglets, dispatching them to remote locations, retracting them from remote locations, activating and deactivating aglets, cloning them and disposing of them. Aglets execute in an aglet context and they can have an itinerary as to where they intend to migrate and execute.

Java Collaboration

Provides a framework for writing collaboration-aware applications as well as using collaborative unaware applications for collaborative work. It provides mechanisms through which shared whiteboards, application-sharing systems, and the like can be built in Java.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An information distribution system having mobile users, comprising:

a mobile switching office selectively connecting the mobile users of the information distribution system;

information service providers, operatively connected to said mobile switching office, at least one of the information service providers receiving signal inputs, and transmitting selected information including at least one of Web related information and at least one Web page to the mobile switching office responsive to the signal inputs; and at least one mobile terminal, comprising:

a receiver, operatively coupling the at least one mobile terminal to the mobile switching office, receiving the selected information from the at least one of the information service providers via said mobile switching office;

a control processor controlling operations of the at least one mobile terminal;

signal format means for formatting the selected information for broadcasting, and for outputting formatted selected information; and broadcast means for broadcasting the formatted selected information, wherein the at least one of the information service providers include:

programming servers storing programs;

speech recognition means for receiving the audio selection via said mobile switching office, and for generating data selection signals; and a gateway for receiving the data selection signals from said speech recognition means, said gateway selecting at least one of the programs stored in at least one of the programming servers responsive to the data selection signals, wherein said at least one mobile terminal further comprises a memory operatively connected to said receiver, and wherein said receiver receives the at least one of the programs corresponding to the data selection signals and stores the at least one of the programs entirely in said memory before broadcasting to the mobile user, thereby minimizing connection between said at least one mobile terminal and said mobile switching office.

2. An information distribution system as in claim 1, wherein the at least one of the information service providers further includes audio menu means for presenting program selections audibly to the mobile user, and wherein the mobile user selects at least one of the program selections using the audio selection.

3. An information distribution system as in claim 2, wherein said at least one mobile terminal further includes a picture display, wherein the at least one of the information service providers further includes picture transmitting means for presenting picture program selections visually to the mobile user while substantially simultaneously presenting the program selections audibly to the mobile user, and wherein the mobile user selects the at least one of the program selections using the audio selection responsive to the program selections presented audibly and the picture program selections presented visually.

4. An information distribution system as in claim 1, wherein said receiver comprises two-line receiver means for receiving the selected information from the at least one of the information service providers via said mobile switching office using at least one communication channels, and for receiving a voice telephone call for connection with the mobile user.

5. An information distribution system as in claim 1, wherein the signal inputs are transmitted to the mobile switching office using a first communication channel which operates using a first communication speed, and wherein said receiver receives the at least one of the programs corresponding to the data selection signals and stores the at least one of the programs entirely in said memory using a second communication channel which operates using a second communication speed substantially greater than the first communication speed of the first communications channel.

6. An information distribution system as in claim 1, wherein the information distribution system further comprises:

at least one of digital, wireless, and cellular equipment transmitting and receiving digital, wireless, and cellular calls respectively for voice connection; and switching means for selectively switching between said at least one of digital, wireless, and cellular equipment and said at least one mobile terminal, and wherein said control processor monitors the activity of said at least one of digital, wireless, and cellular equipment and said at least one mobile terminal for selective transmission and reception between said mobile switching office and either said at least one mobile terminal or said at least one of digital, wireless, and cellular equipment.

7. An information distribution system as in claim 6, wherein when said control processor determines that both said at least one of digital, wireless, and cellular equipment and said at least one mobile terminal are active, said control processor controls transmission and reception between said mobile switching office and said at least one mobile terminal, denying transmission and reception access to said at least one of digital, wireless, and cellular equipment.

8. An information distribution system as in claim 1, wherein the at least one of the information service providers includes:

voice mail servers storing voice mail;

speech recognition means for receiving the communications via said mobile switching office, and for generating communication selection signals; and a gateway for receiving the communication selection signals from said speech recognition means, said gateway selecting at least one of the voice mails stored in at least one of the voice mail servers responsive to the communication selection signals.

9. In an information distribution system having mobile users, a method of distributing communication channels to mobile users, said method comprising the steps of:

(a) receiving information signals including at least one of Web related information and at least one Web page, broadcast from an external source, in a receiver of at least one mobile terminal and storing the information signals in its entirety in the at least one mobile terminal, prior to broadcasting same to a mobile user, wherein the step of receiving comprises receiving the information signals from at least one information service provider via a mobile switching office using at least one communication channel;

(b) controlling operations of the at least one mobile terminal;

(c) formatting the information signals for at least one of broadcasting and displaying after being stored in the at least one mobile terminal;

(d) at least one of broadcasting and displaying the formatted information signals to the mobile user of the at least one mobile terminal; and receiving a voice telephone call for connection with the mobile user.

10. In an information distribution system having mobile users, a method of distributing communication channels to mobile users, said method comprising the steps of:

(a) receiving information signals including at least one of Web related information and at least one Web page, broadcast from an external source, in a receiver of at least one mobile terminal, and storing the information signals in its entirety in the at least one mobile terminal prior to broadcasting same to a mobile user;

(b) controlling operations of the at least one mobile terminal;

(c) formatting the information signals for at least one of broadcasting and displaying after being stored in the at least one mobile terminal;

(d) at least one of broadcasting and displaying the formatted information signals to the mobile user of the at least one mobile terminal; and transmitting data selection signals to the mobile switching office using a first communication channel which operates using a first communication speed;

wherein the receiving step comprises receiving information signals corresponding to the data selection signals and storing the received signals entirely in the memory, using a second communication channel which operates using a second communication speed substantially greater than the first communication speed of the first communication channel.

11. In an information distribution system having mobile users, a method of distributing communication channels to mobile users, said method comprising the steps of:

(a) receiving information signals including at least one of Web related information and at least one Web page, broadcast from an external source, in a receiver of at least one mobile terminal, and storing the information signals in its entirety in the at least one mobile terminal prior to broadcasting same to a mobile user;

(b) controlling operations of the at least one mobile terminal;

(c) formatting the information signals for at least one of broadcasting and displaying after being stored in the at least one mobile terminal; and (d) at least one of broadcasting and displaying the formatted information signals to the mobile user of the at least one mobile terminal, wherein the information distribution system comprises:
at least one of digital, wireless, and cellular equipment transmitting and receiving cellular calls for voice connection; and
at least one switch selectively switching between the at least one of digital, wireless, and cellular equipment and the at least one mobile terminal, and wherein said method further comprises the steps of monitoring the activity of the at least one of digital, wireless, and cellular equipment and the at least one mobile terminal for selective transmission and reception between a mobile switching office and either the at least one mobile terminal or the at least one of digital, wireless, and cellular equipment.

12. In an information distribution system having mobile users, a method of distributing communication channels to mobile users, said method comprising the steps of:

(a) transmitting at least one of voice, data, and electronic mail signals, and information signals including at least one of Web related information and at least one Web page received via at least one of internet, ADSL, another mobile, a land-based user, and the at least one information service provider;

(b) receiving the at least one of voice, data, electronic mail, and information signals from the at least one information service provider in the receiver of the at least one mobile terminal, and storing the at least one of voice, data, electronic mail, and information signals in its entirety in the at least one mobile terminal prior to broadcasting same to the mobile user; and (c) formatting and at least one of broadcasting and displaying the at least one of voice, data, electronic mail, and information signals after being stored in the at least one mobile terminal.

13. An asymmetrical data signal delivery system having mobile users, comprising:

at least one mobile terminal, comprising:
a receiver receiving data signals including at least one of Web related information and at least one Web page for at least one of broadcasting and displaying to a mobile user;
a control processor controlling operations of the at least one mobile terminal; and
transmit means for transmitting communications initiated by the mobile user;

a first mobile switching office receiving the communications initiated by the mobile user which operates under a first communication speed;

information service providers, operatively connected to said first mobile switching office, at least one of the information service providers transmitting the data signals; and a second mobile switching office, operatively connected to said at least one of the information service providers, devoted to receiving the data signals transmitted by said at least one of the information service providers using a communication channel which operates under a second communication speed, and devoted to transmitting the data signals to said at least one mobile terminal, wherein the second communication speed of the communication channel of said second mobile switching office is substantially greater than the first communication speed of the first communications channel of said second mobile switching office.

14. An asymmetrical data signal delivery system as in claim 13, wherein the at least one of the information service providers includes:

voice mail servers storing voice mail;

speech recognition means for receiving the communications via said mobile switching office, and for generating communication selection signals; and a gateway for receiving the communication selection signals from said speech recognition means, said gateway selecting at least one of the voice mails stored in at least one of the voice mail servers responsive to the communication selection signals.

15. An asymmetrical data signal delivery system as in claim 14, wherein the at least one of the information service providers further includes audio menu means for presenting at least one of program selections and instructions audibly to the mobile user, and wherein the mobile user selects at least one of the program selections and the instructions using the audio selection.

16. An asymmetrical data signal delivery system as in claim 15, wherein said at least one mobile terminal further includes a picture display, wherein the at least one of the information service providers further includes picture transmitting means for presenting picture program selections visually to the mobile user while substantially simultaneously presenting the program selections audibly to the mobile user, and wherein the mobile user selects the at least one of the program selections using the audio selection responsive to the program selections presented audibly and the picture program selections presented visually.

17. An asymmetrical audio message delivery system having mobile users, comprising:
at least one mobile terminal, comprising:
a receiver receiving message data signals including at least one of Web related information and at least one Web page received via at least one of internet, ADSL, another mobile, a land-based user, and at least one information service provider for broadcasting to a mobile user;
a control processor controlling operations of the at least one mobile terminal;
means for generating user signals and for transmitting the user signals;
signal format means for formatting the message data signals for broadcasting, and for outputting formatted information; and
broadcast means for broadcasting the formatted information;
a first mobile switching office receiving the user signals;
information service providers, operatively connected to said first mobile switching office, at least one of the information service providers transmitting at least one message; and
a second mobile switching office, operatively connected to said at least one of the information service providers, devoted to receiving the at least one message transmitted by said at least one of the information service providers, and devoted to transmitting the at least one message to said at least one mobile terminal.

18. A message download distribution system having mobile users, comprising:
a mobile switching office selectively connecting the mobile users of the message download system;
message service providers, operatively connected to said mobile switching office, at least one of the message service providers transmitting at least one message to the mobile switching office; and
at least one mobile terminal, operatively coupled to the mobile switching office, receiving the message from the at least one of the message service providers via said mobile switching office, formatting the message for at least one of broadcasting and displaying, and at least one of broadcasting and displaying the formatted message, said at least one mobile terminal including a memory, and
wherein the message comprises at least one of Web related information and at least one Web page received via at least one of internet, ADSL, another mobile, a land-based user, and at least one message service provider for broadcasting to the mobile user, and
wherein said receiver receives the message and stores the message entirely in said memory before broadcasting to the mobile user, thereby minimizing connection between said at least one mobile terminal and said mobile switching office.

19. A message distribution system having mobile users, comprising:
a mobile switching office selectively connecting the mobile users of the message distribution system;
message service providers, operatively connected to said mobile switching office, at least one of the message service providers receiving signal inputs, and transmitting a selected message to the mobile switching office responsive to the signal inputs; and
at least one mobile terminal, comprising:
a receiver, operatively coupling the at least one mobile terminal to the mobile switching office, receiving the selected message from the at least one of the message service providers via said mobile switching office;
a control processor controlling operations of the at least one mobile terminal;
signal format means for formatting the selected message for at least one of broadcasting and displaying, and for outputting formatted selected message; and
at least one of broadcast and displaying means for at least one of broadcasting and displaying the formatted selected message,
wherein the formatted selected message comprises at least one of Web related information and at least one Web page received via at least one of internet, ADSL, another mobile, a land-based user, and at least one message service provider for at least one of broadcasting and displaying to the mobile user,
wherein the at least one of the message service providers include:
programming servers storing programs;
speech recognition means for receiving at least one selection via said mobile switching office, and for generating data selection signals; and
a gateway for receiving the data selection signals from said speech recognition means, said gateway selecting at least one of the programs stored in at least one of the programming servers responsive to the data selection signals,
wherein said at least one mobile terminal further comprises a memory operatively connected to said receiver, and
wherein said receiver receives the at least one of the programs corresponding to the data selection signals and stores the at least one of the programs entirely in said memory before at least one of broadcasting and displaying to the mobile user, thereby minimizing connection between said at least one mobile terminal and said mobile switching office.

20. A message distribution system as in claim 19,
wherein the at least one of the message service providers further includes at least one of audio and display menu means for presenting program selections at least one of audibly and visually to the mobile user, and
wherein the mobile user selects at least one of the program selections using the at least one of the audio and visual selection.

21. A message distribution system as in claim 20,
wherein said at least one mobile terminal further includes a picture display,
wherein the at least one of the message service providers further includes picture transmitting means for presenting picture program selections visually to the mobile user while substantially simultaneously presenting the program selections audibly to the mobile user, and
wherein the mobile user selects the at least one of the program selections using the audio selection responsive to the program selections presented audibly and the picture program selections presented visually.

22. A message distribution system as in claim 19, wherein said receiver comprises two-line receiver means for receiving the selected message from the at least one of the message service providers via said mobile switching office using at least one communication channel, and for receiving a voice telephone call for connection with the mobile user.

23. A message distribution system as in claim 19,
wherein the signal inputs are transmitted to the mobile switching office using a first communication channel which operates using a first communication speed, and
wherein said receiver receives the at least one of the programs corresponding to the data selection signals and stores the at least one of the programs entirely in said memory using a second communication channel which operates using a second communication speed substantially greater than the first communication speed of the first communications channel.

24. A message distribution system as in claim 19,
wherein the message distribution system further comprises:
at least one of digital, wireless, and cellular equipment transmitting and receiving cellular calls for voice connection; and
switching means for selectively switching between said at least one of digital, wireless, and cellular equipment and said at least one mobile terminal, and
wherein said control processor monitors the activity of said at least one of digital, wireless, and cellular equipment and said at least one mobile terminal for selective transmission and reception between said mobile switching office and either said at least one mobile terminal or said at least one of digital, wireless, and cellular equipment.

25. A message distribution system as in claim 19, wherein the at least one of the message service providers includes:
voice mail servers storing voice mail;
speech recognition means for receiving the communications via said mobile switching office, and for generating communication selection signals; and
a gateway for receiving the communication selection signals from said speech recognition means, said gateway selecting at least one of the voice mails stored in at least one of the voice mail servers responsive to the communication selection signals.

26. An information distribution system having mobile users, comprising:
a mobile switching office selectively connecting the mobile users of the information distribution system;
information service providers, operatively connected to said mobile switching office, at least one of the information service providers receiving signal inputs, and transmitting selected information including at least one of Web related information and at least one Web page to the mobile switching office responsive to the signal inputs; and
at least one mobile terminal, comprising:
a receiver, operatively coupling the at least one mobile terminal to the mobile switching office, receiving the selected information from the at least one of the information service providers via said mobile switching office;
a control processor controlling operations of the at least one mobile terminal;
signal format means for formatting the selected information for at least one of broadcasting and displaying, and for outputting formatted selected information; and
information supplement means for receiving supplemental information including destination information and optionally additional information from the mobile user, and for associating the formatted information with the supplemental information, the destination information including at least one of internet address, an ADSL address, another mobile, a land-based user, and a message service provider;
at least one of broadcast and display means for at least one of broadcasting and displaying the formatted selected information to the mobile user, and at least one of broadcasting and displaying the formatted and supplemental information to the at least one of internet address, an ADSL address, another mobile, a land-based user, and a message service provider,
wherein the at least one of the information service providers include:
programming servers storing programs;
speech recognition means for receiving the audio selection via said mobile switching office, and for generating data selection signals; and
a gateway for receiving the data selection signals from said speech recognition means, said gateway selecting at least one of the programs stored in at least one of the programming servers responsive to the data selection signals, wherein said at least one mobile terminal further comprises a memory operatively connected to said receiver, and
wherein said receiver receives the at least one of the programs corresponding to the data selection signals and stores the at least one of the programs entirely in said memory before broadcasting to the mobile user, thereby minimizing connection between said at least one mobile terminal and said mobile switching office.

27. An information distribution system as in claim 26,
wherein the at least one of the information service providers further includes audio menu means for presenting program selections audibly to the mobile user, and
wherein the mobile user selects at least one of the program selections using the audio selection.

28. An information distribution system as in claim 27,
wherein said at least one mobile terminal further includes a picture display,
wherein the at least one of the information service providers further includes picture transmitting means for presenting picture program selections visually to the mobile user while substantially simultaneously presenting the program selections audibly to the mobile user, and
wherein the mobile user selects the at least one of the program selections using the audio selection responsive to the program selections presented audibly and the picture program selections presented visually.

29. An information distribution system as in claim 26, wherein said receiver comprises two-line receiver means for receiving the selected information from the at least one of the information service providers via said mobile switching office using one of two communication channels, and for receiving a voice telephone call for connection with the mobile user.

30. An information distribution system as in claim 26,
wherein the signal inputs are transmitted to the mobile switching office using a first communication channel which operates using a first communication speed, and
wherein said receiver receives the at least one of the programs corresponding to the data selection signals and stores the at least one of the programs entirely in said memory using a second communication channel which operates using a second communication speed substantially greater than the first communication speed of the first communications channel.

31. An information distribution system as in claim 26, wherein the information distribution system further comprises:
at least one of digital, wireless, and cellular equipment transmitting and receiving at least one of digital, wireless, and cellular calls respectively; and
switching means for selectively switching between said at least one of digital, wireless, and cellular equipment and said at least one mobile terminal, and
wherein said control processor monitors the activity of said at least one of digital, wireless, and cellular equipment and said at least one mobile terminal for selective transmission and reception between said mobile switching office and either said at least one mobile terminal or said at least one of digital, wireless, and cellular equipment.

32. An information distribution system as in claim 26, wherein the at least one of the information service providers includes:
voice mail servers storing voice mail;
speech recognition means for receiving the communications via said mobile switching office, and for generating communication selection signals; and
a gateway for receiving the communication selection signals from said speech recognition means, said gateway selecting at least one of the voice mails stored in at least one of the voice mail servers responsive to the communication selection signals.

33. In an information distribution system having mobile users, a method of distributing communication channels to mobile users, said method comprising the steps of:
(a) receiving information signals including at least one of Web related information and at least one Web page transmitted from an external source in the receiver of the at least one mobile terminal, and storing the information signals in its entirety in at least one mobile terminal prior to at least one of broadcasting and displaying same to a mobile user;
(b) controlling operations of the at least one mobile terminal;
(c) formatting the information signals for the at least one of broadcasting and displaying after being stored in the at least one mobile terminal;
(d) receiving supplemental information including destination information and optionally additional information from the mobile user, and associating the formatted information with the supplemental information, the destination information including at least one of internet address, an ADSL address, another mobile, a land-based user, and a message service provider; and
(e) at least one of broadcasting and displaying the formatted selected information to the mobile user, and at least one of broadcasting and displaying the formatted and supplemental information to the at least one of the internet address, the ADSL address, the another mobile, the land-based user, and the message service provider.

34. A method as in claim 33, further comprising the step of presenting other program selections audibly to the mobile user for selection.

35. A method as in claim 33, further comprising the step of presenting picture program selections visually to the mobile user while substantially simultaneously presenting the other program selections audibly to the mobile user for selection.

36. A method as in claim 33, further comprising the steps of receiving the selected information from the at least one of the information service providers via the mobile switching office using at least one communication channel, and receiving a voice telephone call for connection with the mobile user.

37. A method as in claim 33, further comprising the steps of transmitting the signal inputs to the mobile switching office using a first communication channel which operates using a first communication speed, and receiving the at least one of the programs corresponding to the data selection signals and stores the at least one of the programs entirely in the memory using a second communication channel which operates using a second communication speed substantially greater than the first communication speed of the first communications channel.

38. A method as in claim 33,
wherein the information distribution system further comprises:
at least one of digital, wireless, and cellular equipment transmitting and receiving at least one of digital, wireless, and cellular calls for voice connection; and
at least one switch selectively switching between the at least one of digital, wireless, and cellular equipment and the at least one mobile terminal, and
wherein said method further comprises the steps of monitoring the activity of the at least one of digital, wireless, and cellular equipment and the at least one mobile terminal for selective transmission and reception between the mobile switching office and either the at least one mobile terminal or the at least one of digital, wireless, and cellular equipment.

39. In an information distribution system having mobile users, a method of distributing communication channels to mobile users, said method comprising the steps of:
(a) transmitting at least one of Web related information and at least one Web page signals via at least one of internet, ADSL, another mobile, a land-based user, and the at least one information service provider;
(b) receiving the at least one of Web related information and at least one Web page signals from the at least one information service provider in the receiver of the at least one mobile terminal, and storing the at least one of Web related information and at least one Web page signals in its entirety in the at least one mobile terminal prior to broadcasting same to the mobile user;
(c) receiving supplemental information including destination information and optionally additional information from the mobile user, and associating the formatted information with the supplemental information, the destination information including at least one of the internet address, the ADSL address, the another mobile, the land-based user, and the message service provider; and
(d) at least one of broadcasting and displaying the formatted selected information to the mobile user, and at least one of broadcasting and displaying the formatted and supplemental information to the at least one of the internet address, the ADSL address, the another mobile, the land-based user, and the message service provider.

40. An asymmetrical data signal delivery system having mobile users, comprising:

at least one mobile terminal, comprising:
- a receiver receiving data signals including at least one of Web related information and at least one Web page signals for broadcasting to a mobile user;
- a control processor controlling operations of the at least one mobile terminal;
- information supplement means for receiving supplemental information including destination information and optionally additional information from the mobile user, and for associating the formatted information with the supplemental information, the destination information including at least one of internet address, an ADSL address, another mobile, a land-based user, and a message service provider;

at least one of broadcast and display means for at least one of broadcasting and displaying the formatted selected information to the mobile user, and at least one of broadcasting and displaying the formatted and supplemental information to the at least one of the internet address, the ADSL address, the another mobile, the land-based user, and the message service provider; and transmit means for transmitting communications initiated by the mobile user;

a first mobile switching office receiving the communications initiated by the mobile user which operates under a first communication speed;

information service providers, operatively connected to said first mobile switching office, at least one of the information service providers transmitting the data signals; and a second mobile switching office, operatively connected to said at least one of the information service providers, devoted to receiving the data signals transmitted by said at least one of the information service providers using a communication channel which operates under a second communication speed, and devoted to transmitting the data signals to said at least one mobile terminal.

41. An asymmetrical data signal delivery cellular system as in claim 40, wherein the at least one of the information service providers includes:

voice mail servers storing voice mail;

speech recognition means for receiving the communications via said mobile switching office, and for generating communication selection signals; and a gateway for receiving the communication selection signals from said speech recognition means, said gateway selecting at least one of the voice mails stored in at least one of the voice mail servers responsive to the communication selection signals.

42. An asymmetrical data signal delivery cellular systems in claim 41, wherein the at least one of the information service providers further includes audio menu means for presenting at least one of program selections and instructions audibly to the mobile user, and wherein the mobile user selects at least one of the program selections and the instructions using the audio selection.

43. An asymmetrical data signal delivery cellular systems in claim 42, wherein said at least one mobile terminal further includes a picture display, wherein the at least one of the information service providers further includes picture transmitting means for presenting picture program selections visually to the mobile user while substantially simultaneously presenting the program selections audibly to the mobile user, and wherein the mobile user selects the at least one of the program selections using the audio selection responsive to the program selections presented audibly and the picture program selections presented visually.

44. An asymmetrical data signal delivery cellular system as in claim 40, wherein the second communication speed of the communication channel of said second mobile switching office is substantially greater than the first communication speed of the first communications channel of said second mobile switching office.

45. A message download distribution system having mobile users, comprising:

a mobile switching office selectively connecting the mobile users of the message download distribution system;

message service providers, operatively connected to said mobile switching office, at least one of the message service providers transmitting at least one message to the mobile switching office; and at least one mobile terminal, operatively coupled to the mobile switching office, receiving the message from the at least one of the message service providers via said mobile switching office, formatting the message for broadcasting, and broadcasting the formatted message, said at least one mobile terminal including a memory, wherein the message comprises at least one of at least one of Web related information and at least one Web page signals received via at least one of internet, ADSL, another mobile, a land-based user, and at least one message service provider for broadcasting to the mobile user, wherein said receiver receives the message and stores the message entirely in said memory before broadcasting to the mobile user, thereby minimizing connection between said at least one mobile terminal and said mobile switching office, and wherein said broadcast means at least one of broadcasts the formatted message to the mobile user, and broadcasts the formatted message and supplemental information to at least one of an internet address, an ADSL address, another mobile, a land-based user, and at least one of the message service providers.

46. In an information distribution system having mobile users, a method of distributing communication channels to mobile users, said method comprising the steps of:

(a) transmitting information signals including at least one of Web related information and Internet related information received via at least one of internet, ADSL, another mobile, a land-based user, and at least one information service provider;

(b) receiving the information signals from the at least one of internet, ADSL, another mobile, a land-based user, and the at least one information service provider in the receiver of the at least one mobile terminal, and storing the information signals in its entirety in the at least one mobile terminal prior to at least one of broadcasting and displaying same to the mobile user; and (c) formatting and at least one of broadcasting and displaying the information signals after being stored in the at least one mobile terminal.

47. In an information distribution system, a method of distributing communication channels to mobile users, said method comprising the steps of:

(a) receiving information signals including at least one of Web related information and Internet related information transmitted from an external source in the receiver of the at least one mobile terminal, and storing the information signals in its entirety in at least one mobile terminal prior to at least one of broadcasting and displaying same to a mobile user;

(b) formatting the information signals for the at least one of broadcasting and displaying after being stored in the at least one mobile terminal;

(c) receiving supplemental information including destination information and optionally additional information from the mobile user, and associating the formatted information with the supplemental information, the destination information including at least one of internet address, an ADSL address, another mobile, a land-based user, and a message service provider; and (d) at least one of broadcasting and displaying the formatted information to the mobile user, and at least one of broadcasting and displaying the formatted and supplemental information to the at least one of the internet address, the ADSL address, the another mobile, the land-based user, and the message service provider.

* * * * *